United States Patent [19]
Wiley

[11] Patent Number: 5,674,144
[45] Date of Patent: Oct. 7, 1997

[54] CONTINUOUSLY VARIABLE RATIO TRANSMISSION AND METHOD

[75] Inventor: Robert J. Wiley, Wichita, Kans.

[73] Assignee: Varatran, Inc., Wichita, Kans.

[21] Appl. No.: 422,223

[22] Filed: Jun. 15, 1995

Related U.S. Application Data

[63] Continuation-in-part of Ser. No. 328,010, Oct. 24, 1994.

[51] Int. Cl.⁶ .......................... F16H 29/06; F16H 29/18; F16H 1/32; F16C 3/00
[52] U.S. Cl. .......................... 475/170; 74/117; 74/120; 464/39; 464/180; 464/182
[58] Field of Search ............... 74/116, 117; 475/120, 475/169, 170; 464/39, 40, 180, 182

[56] References Cited

U.S. PATENT DOCUMENTS

| | | | |
|---|---|---|---|
| 741,904 | 10/1903 | Green | 74/117 |
| 968,482 | 8/1910 | Kraeger . | |
| 977,449 | 12/1910 | Hayden | 74/117 |
| 1,912,917 | 6/1933 | Prout . | |
| 2,023,579 | 12/1935 | Dodge | 74/116 X |
| 2,062,241 | 11/1936 | Viberg . | |
| 2,140,295 | 12/1938 | Mallard | 464/182 X |
| 2,579,085 | 12/1951 | Morgan | 74/117 |
| 2,691,896 | 10/1954 | Stageberg . | |
| 3,321,984 | 5/1967 | Nittka . | |
| 3,327,544 | 6/1967 | Colinet . | |
| 4,047,589 | 9/1977 | Jansen . | |
| 4,114,466 | 9/1978 | Meucci | 74/117 |
| 4,711,139 | 12/1987 | Desousa . | |
| 4,983,151 | 1/1991 | Pires . | |
| 5,226,859 | 7/1993 | Pires . | |
| 5,334,115 | 8/1994 | Pires . | |
| 5,454,766 | 10/1995 | Mills | 74/117 X |

FOREIGN PATENT DOCUMENTS

| | | | |
|---|---|---|---|
| 181505 | 4/1951 | Australia | 74/117 |
| 575026 | 7/1924 | France | 74/117 |
| 781439 | 11/1980 | U.S.S.R. | 464/180 |
| 329811 | 6/1930 | United Kingdom | 74/117 |
| 2259741 | 3/1993 | United Kingdom | 475/169 |

OTHER PUBLICATIONS

Speed Gear Regulated Through Variable Throw Crank. Product Engineering, Aug. 1947, p. 105.

Primary Examiner—Charles A. Marmor
Assistant Examiner—Nathan O. Jensen
Attorney, Agent, or Firm—Chase & Yakimo

[57] ABSTRACT

A transmission having ratios from 0:1 to 1:1 is disclosed; the transmission comprises a plurality of clutches for producing a partial rotational output from a reciprocating input, an output gear for collecting the partial output of the clutches, an input gear for providing rotational input to a varicrank (i.e. an index plate/web shaft slidably and rotably disposed in a rotatable cylindrical block), and a varicrank (i.e. an index plate/web shaft slidably and rotatably disposed in a rotatable cylindrical block) for producing reciprocal motion on the clutches. The varicrank has a variably offset center web member having a plurality of connecting rods secured thereto corresponding to the number of clutches and a plurality of crank arms pivotally secured to the connecting rods. The ratio of the transmission is adjusted by moving a ratio control rod which increases or decreases the amount of offset of the center web, and accordingly the amount of reciprocating motion applied to the crank arms by the connecting rods.

10 Claims, 26 Drawing Sheets

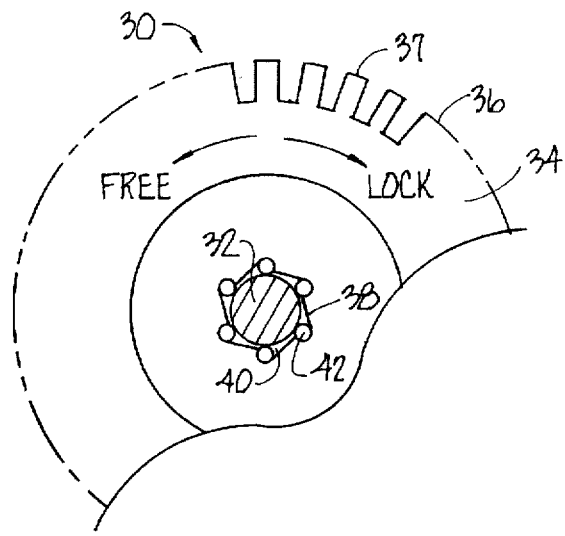
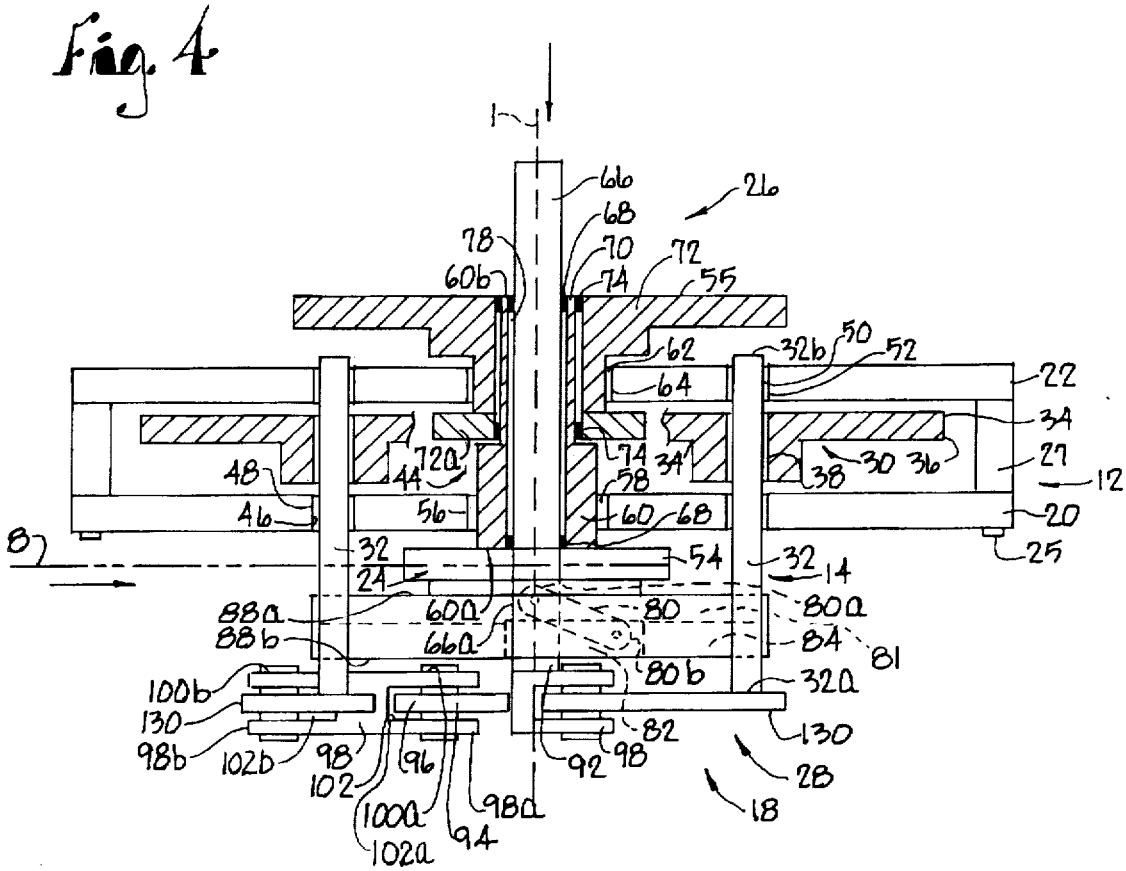

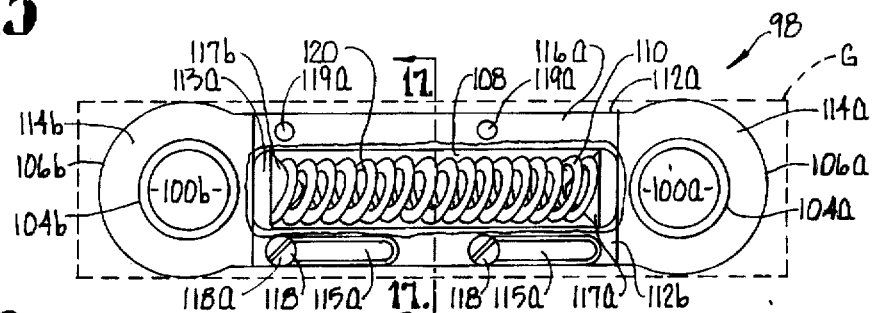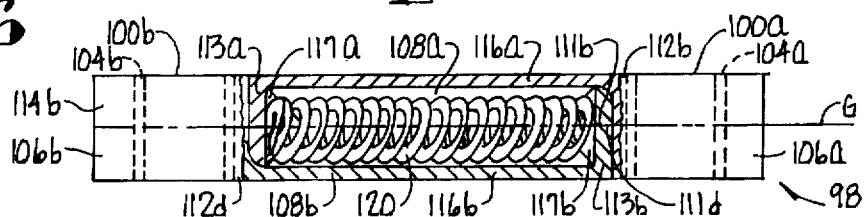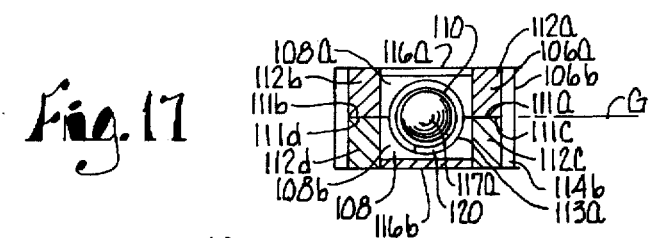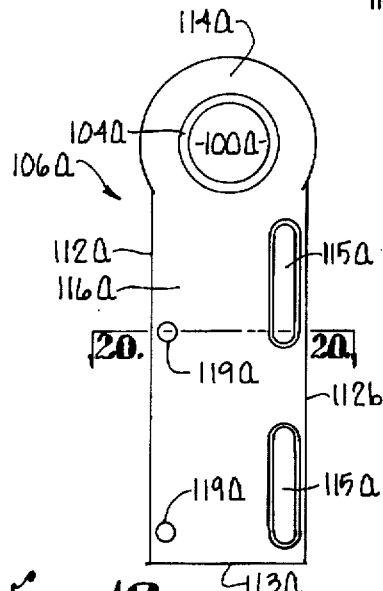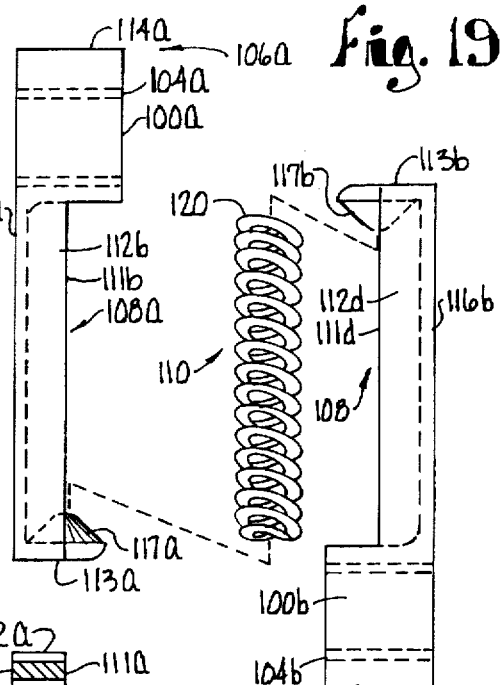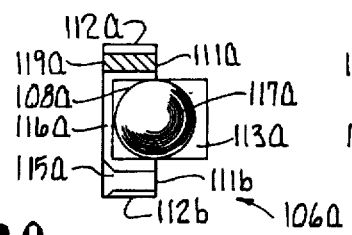

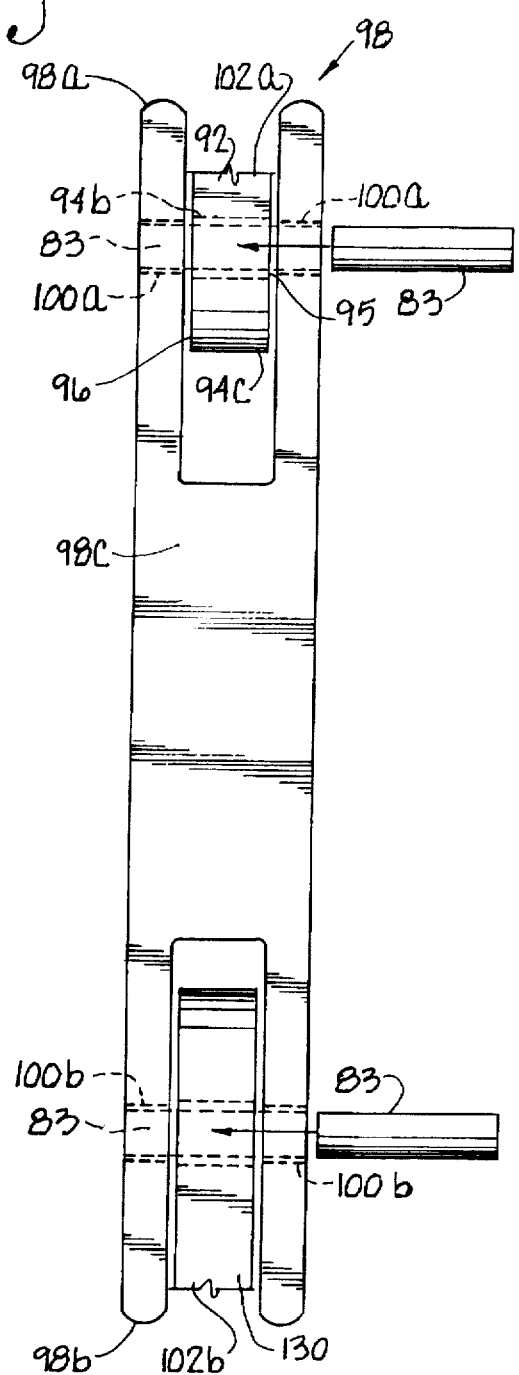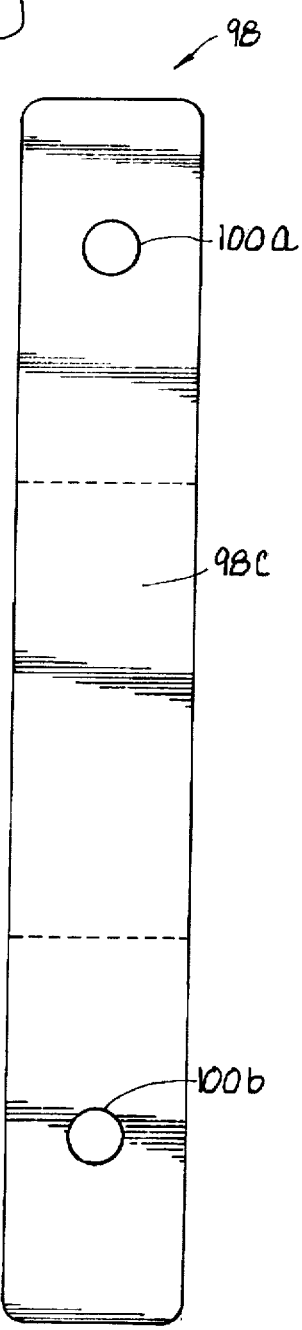

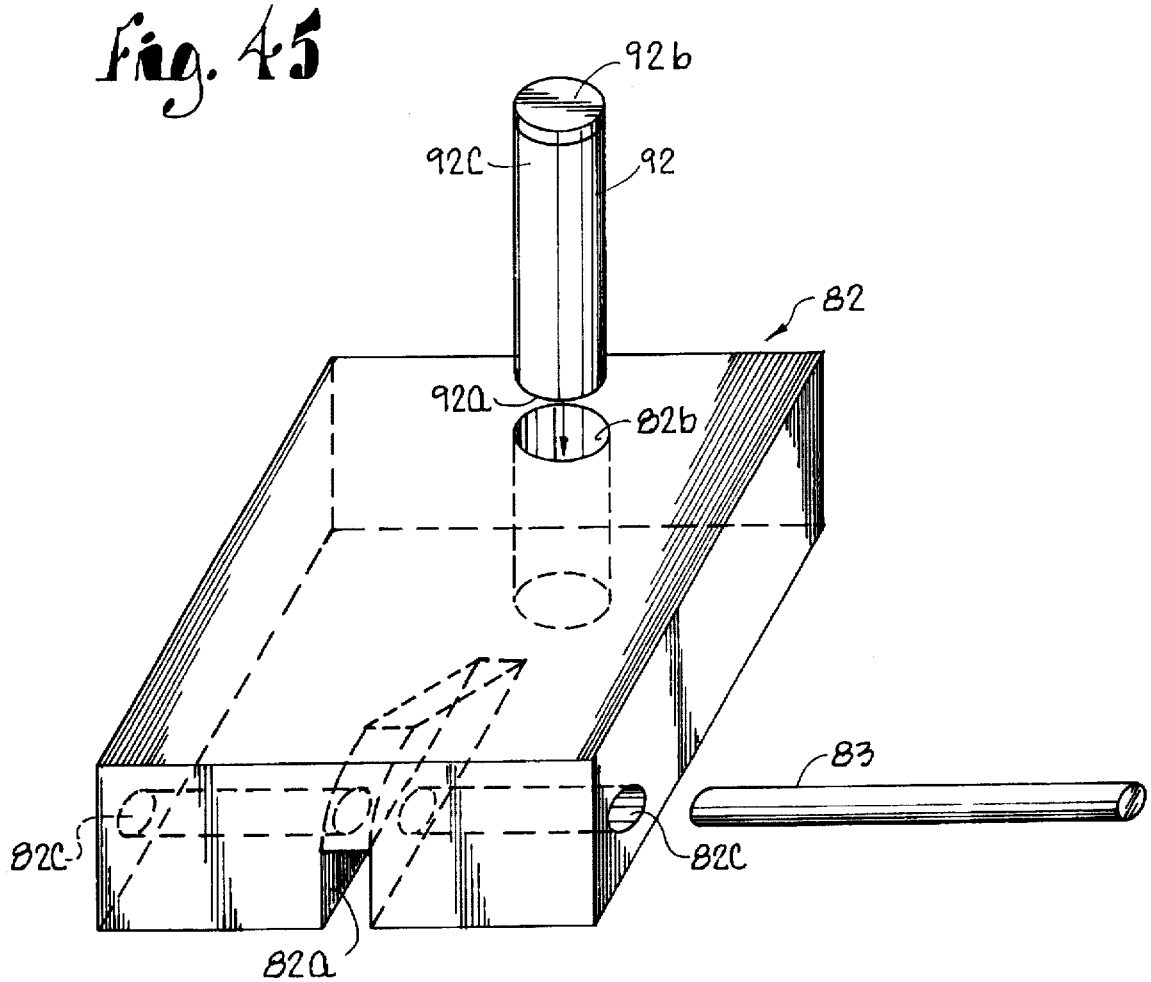

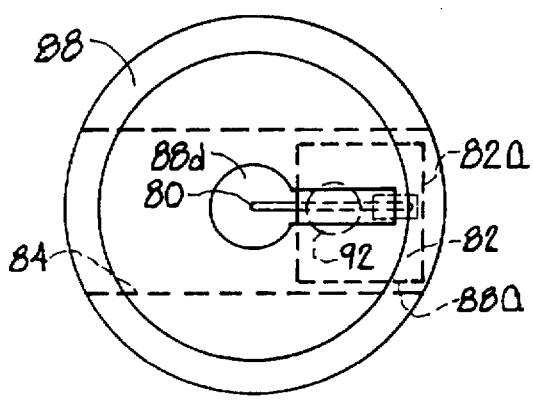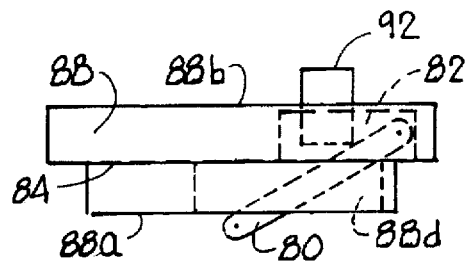
Fig. 46
Fig. 47
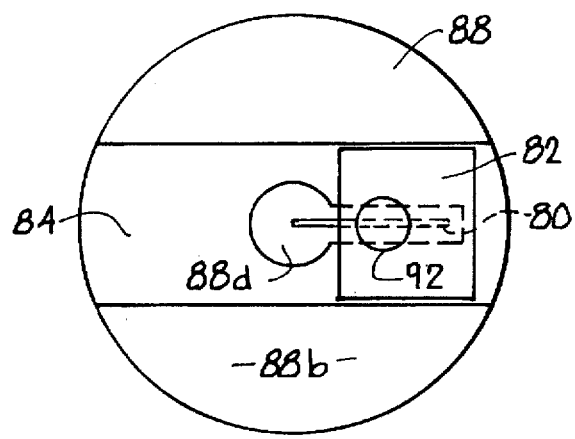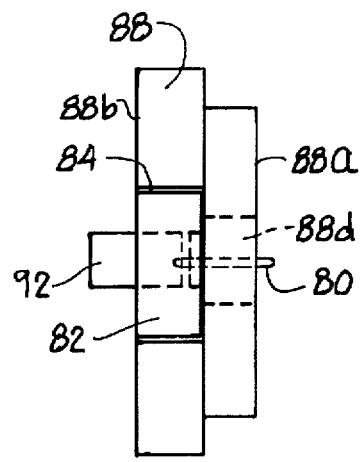
Fig. 48
Fig. 49

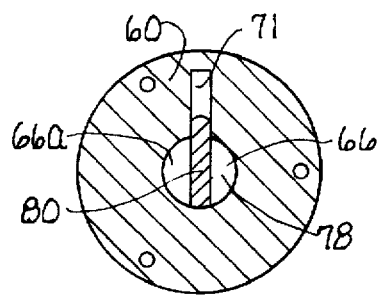
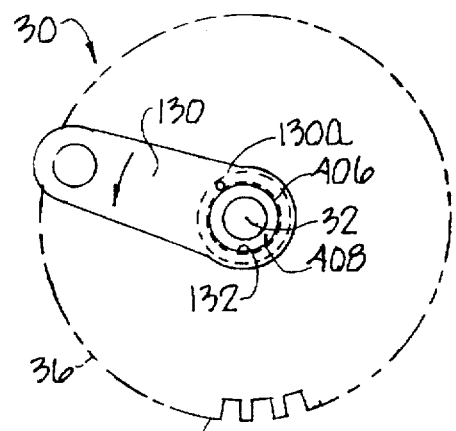
Fig. 62
Fig. 63
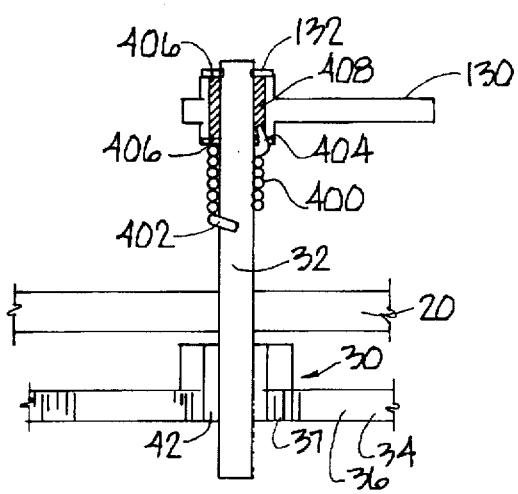
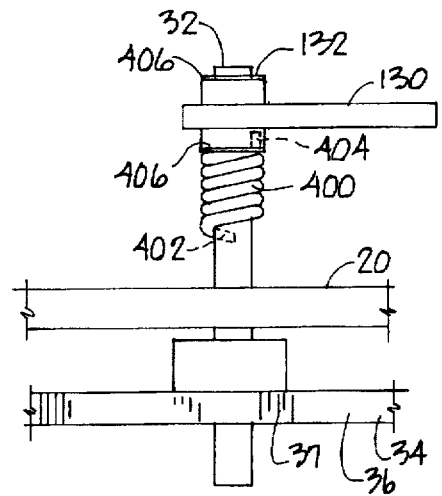
Fig. 64
Fig. 65

CONTINUOUSLY VARIABLE RATIO TRANSMISSION AND METHOD

This is a continuation-in-part application of copending application having Ser. No. 08/328,010, filed Oct. 24, 1994.

FIELD OF THE INVENTION

The present invention is related to method and/or apparatus for a transmission. More specifically, the current invention is related to a novel transmission apparatus and method that provides continuously variable output to input ratio.

BACKGROUND OF INVENTION

A patentability search was conducted and the following U.S. Patents were found: U.S. Pat. No. 968,482 to Kraeger; U.S. Pat. No. 1,912,917 to Prout; U.S. Pat. No. 2,062,241 to Viberg; U.S. Pat. No. 2,691,896 to Stageberg; U.S. Pat. No. 3,321,984 to Nittka; U.S. Pat. No. 3,327,544 to Colinet; U.S. Pat. No. 4,047,589 to Jansen; U.S. Pat. No. 4,711,139 to Desousa; and U.S. Pat. Nos. 4,983,151, 5,226,859, and 5,334,115, all to Pires.

The U.S. Pat. No. 968,482 to Kraeger teaches a drive wheel assembly consisting of a pawl and rachet to adjust an amount of rotational output from the device.

The U.S. Pat. No. 1,912,917 to Prout teaches a variable speed transmission which utilizes a pair of opposedly rotating off-set cams for driving a one-way clutch. Adjustment is achieved by rotating the off-set cams along their axes.

The U.S. Pat. No. 2,062,241 to Viberg teaches a continuously variable change speed mechanism using linkage arms, reciprocating members, and a one-way clutch assembly wherein the one-way clutch shaft is the output shaft.

The U.S. Pat. No. 2,691,896 to Stageberg discloses a variable speed transmission which utilizes a plurality of one way clutch assemblies situated on a common output shaft to derive output rotation from input rotation translated into oscillating movement through off-set cams situated on a splined shaft.

The U.S. Pat. No. 3,321,984 to Nittka teaches a torque converter formed of a pair of parallel opposed pitmans secured to a corresponding pair of geared racks for translating linear reciprocal motion to rotary motion through one-way clutches.

The U.S. Pat. No. 3,327,544 to Colinet discloses a variable speed transmission utilizing roller and cam structures to achieve reciprocal movement on a plurality of one-way clutches situated on a common output shaft.

The U.S. Pat. No. 4,047,589 to Jansen teaches a control apparatus and method for governing application power to an actuator, which actuator in turn regulates a transmission assembly. The actuator is regulated by a combination of elements including throttle position, transmission output speed, drive wheel thrust, and a sensing device for measuring the thrust.

The U.S. Pat. No. 4,711,139 to Desousa teaches an infinitely variable rotary drive transmission having a pair of articulated shafts rotatively coupled by a pair of rods to a pair of cooperating overrunning clutch assemblies mounted on an intermediate shaft which supplies output rotation.

The U.S. Pat. No. 4,983,151 to Pires teaches a technique for modifying an input rotation in continuously variable increments to produce a controlled rotational output. The technique disclosed by Pires combines epicyclic motion of a series of planetary shafts in a parallel fashion in order to produce continuous, controlled, intermediate output in the same direction and at the same speed or a greater speed than the input rotation. This intermediate output is then modified to produce a continuous, controlled, final rotational output only when the intermediate output is greater in speed than the input. The final output can be in the same direction as the rotational input and at a speed which is proportionate to the excess speed of intermediate output.

U.S. Pat. Nos. 5,226,859 and 5,334,115, both to Pires, disclose a continuously or infinitely variable transmission free of over-running clutches. More specifically, an oscialating rachet style continuously or infinitely varable transmission is disclosed in U.S. Pat. Nos. 5,226,859 and 5,334,115, that is, one which, in its operation, relies on a plurality of different successive intermediate rotations that vary in speed and direction in accordance with their own respective oscillatory waveform, each waveform being out of phase with one another in a predetermined way. These intermediate roatations are used to convert the rotational input to a plurality of uni-directional output rotations, without the aid of any over-running clutches, these later output vary in speed in accordance with their own respective waveforms and are used to produce a modified rotational output.

The foregoing U.S. prior art patents are all fully incorporated herein by reference thereto as if repeated verbatim hereafter, and teach or suggest transmissions and/or techniques which may be employed for many-diverse applications, such as, by way of example only, manufacturing devices, washing machines, automobiles, farming equipment, conveyors, motorcycles, and various sundry apparatuses. Simple mechanical devices such as bicycles incorporate rudimentary apparatus or elements which perform the duty of converting an input power source (in this case rotary motion from pedaling) to an appropriate output (in this case modified rotary motion), thereby performing the work of a transmission device (i.e. the converting one form of power to another form of power). In the most common embodiment of a transmission apparatus or power delivery or converting apparatus, vehicle (e.g. automobile) transmissions are employed to convert rotational motion created by an engine into a more usable rotational energy for delivery to the automobile differential, which causes the axles to rotate and in turn propel the vehicle.

As transmissions are well known, a detailed treatise on transmissions and their function would be redundant, except to point out that the range of rotational speed of the engine is used to increasingly propel a vehicle (e.g. an automobile, truck, tractor, etc) by selecting a ratio of the output from the transmission relative to the input to the transmission, wherein the input has a limited top rotational speed. Such designs are conventional and well-known to those artisans possessing the ordinary skill in the art. One drawback of typical transmission designs is that there is no allowance for a zero output state regardless of the input. For example, in automobile transmissions, the output of the engine to a manual transmission may be interrupted by a clutch to prevent the transmission from turning. In an automatic transmission, the transmission continues to 'creep' even when it is brought or braked to a complete halt.

Continuously variable transmissions, or CVT's, have received considerable attention of late. Typical CVT's may consist of a V-belt situated on two pulleys. The drive ratio of the output relative to the input is varied by changing the position of the belt on the two pulleys. Such CVTs are limited by the friction they create and are subject to protracted wear, which could cause the CVTs to exhibit varying characteristics over a useful period. Additionally, such CVTs typically do not have a zero output state without a disengaging assembly or the like. Another form of CVT utilizes epicyclic motion which is generated and modified with gears to produce a desired object. Several such motion generators are used to generate partial outputs from an input and are summed to generate an output. Typical disadvantages arising from this type of design result from a pulsed or sinusoidal output that is generated from changing velocities of each epicyclic generator as they are being summed. Therefore, what is needed and what has been invented by me is a continuously variable ratio transmission and method which overcomes the foregoing disadvantages and deficiencies of the prior art.

SUMMARY OF THE INVENTION

The present invention accomplishes its desired objects by broadly providing an apparatus (or transmission) for producing a modified output rotation relative to an input rotation. The apparatus broadly comprises a support assembly; an input means supported by the support assembly for establishing an input rotation to the apparatus (or transmission); an output means supported by the support assembly for establishing an output rotation relative to and proportional to the input rotation; and a regulating means supported by the supporting assembly and coupled to the input means and to the output means for regulating or controlling an amount of input rotation removed from the input means and imparted to the output means. The regulating assembly comprises a ratio control rod which slidably passes into the input means. A block member and an index member are coupled to the ratio control rod and the index member is slidably disposed in the block member. A web member is coupled to the index member and a connecting rod is pivotally coupled to the web member. A crank shaft is supported by the support assembly and a crank arm is secured to the crank shaft and is pivotally coupled to the connecting rod. A gear member is mounted on the crank shaft and meshes with a summing gear member. The input means comprises an input shaft rotatably supported by the support assembly, and the output means comprises an output shaft rotatably supported by the support assembly and generally coaxial with respect to the input shaft. The input shaft includes an input shaft bore wherein the ratio control rod slidably passes and the output shaft is rotatably disposed around the input shaft. The input shaft is rotatably supported by the support assembly, and the output shaft is rotatably supported by the support assembly such that the input shaft is rotatably supported by a first portion of the support assembly and the output shaft is rotatably supported by a second portion of the support assembly. The connecting rod comprises a dampening means for dampening or biasing a length of a slidably moving portion of the connecting rod.

The present invention further accomplishes its desired objects by providing an apparatus for modifying an input rotation to produce a modified rotational output, comprising: an input means for establishing an input rotation; an output means for establishing an output rotation relative to the input rotation and being proportional to the input rotation; and a regulating means for controlling a first partial output, a second partial output, and a third partial output responsive to and coupled to a first assembly, a second assembly, and a third assembly of the output means. The input means is rotatively disposed within a chassis or supporting assembly of the transmission and supported thereby for being rotatively coupled to a power source, such as an engine, and rotatively coupled further to the regulating means. The regulating means comprises an epicyclic motion generator for establishing and modifying a degree of epicyclic motion or revolution. The output means preferably comprises at least three partial rotation generators (i.e. overrunning clutch assemblies) which are rotatively supported by the supporting assembly or chassis and radially spaced about a centrally located output shaft which is rotatively supported or disposed in the supporting assembly or chassis. The epicyclic motion generator is preferably coupled to the least three partial rotation generators so as to utilize epicyclic motion generated to cause the partial motion generators to oscillate or reciprocate in symphony with the epicyclic motion generator.

The present invention further accomplishes its desired objects by providing a method of modifying an input rotation to produce a modified rotational output. The method comprises the steps of:

(a) establishing an input rotation;

(b) producing from the input rotation an epicyclic rotation that varies directly with the input rotation;

(c) providing a centrally located output shaft;

(d) providing at least three partial motion generators radially spaced and meshed with the centrally located output shaft;

(e) coupling a first partial motion generator to the epicyclic rotation so as to cause the first partial motion generator to oscillate;

(f) relaying a first partial rotation from the first partial motion generator onto the output shaft;

(g) coupling a second partial motion generator to the epicyclic rotation so as to cause the second partial motion generator to oscillate;

(h) relaying a second partial rotation from the second partial motion generator onto the output shaft;

(i) coupling a third partial motion generator to the epicyclic rotation so as to cause the third partial motion generator to oscillate;

(i) relaying a third partial rotation from the third partial motion generator onto the output shaft; and (j) combining the first, second, and third partial rotations with the output shaft to produce a modified rotational output.

In an improved embodiment of the present invention, an improved apparatus is provided for producing a modified output rotation relative to an input rotation, comprising: an input means for establishing an input rotation; an output means for establishing an output rotation relative to the input rotation and being proportional to the input rotation; a regulating means for controlling a first partial output, a second partial output, and a third partial output responsive to and being coupled to a first assembly, a second assembly, and a third assembly of the output means; and the output means comprising a first assembly for generating a first partial output rotation proportional to the input rotation, a second assembly for generating a second partial output rotation proportional to the input rotation, a third assembly for generating a third partial output rotation proportional to the input rotation, and a coupling means for producing a modified output rotation relative to the input rotation and for coupling the first partial output rotation, the second partial output rotation, and the third partial output rotation. For this improved embodiment of the invention, the first assembly comprises a first overrunning clutch member having a first gear rotatively disposed on a first cylindrical shaft. The second assembly comprises a second overrunning clutch member having a second gear rotatively disposed on a second cylindrical shaft; and the third assembly comprises a third overrunning clutch member having a third gear rotatively disposed on a third cylindrical shaft. The first cylindrical shaft is rotatively disposed in the chassis, as well as the second cylindrical shaft and third cylindrical shaft. The coupling means comprises a coupling gear member secured to a coupling shaft member. The coupling shaft is rotatively disposed in the chassis, and the coupling gear member collectively couples the first gear, the second gear and the third gear.

The input means in the improved apparatus comprises a generally hollow cylindrical input shaft member rotatively disposed in the chassis; and an engine member engaged to the generally hollow cylindrical input shaft member. The regulating means in this improved embodiment of the invention comprises a regulating gear assembly secured to the cylindrical input shaft member of the input means. The regulating gear assembly includes a generally circular plate member having a ratio lever aperture disposed therein for receiving a ratio control lever such that the ratio lever aperture is generally concentric with the circular plate member. The circular plate member has a pair of opposed guide member secured thereto and defines a longitudinal channel therebetween for slidably receiving an index plate member. An index plate member is slidably disposed in the longitudinal channel and has an index top and an index bottom. The index plate member further includes a ratio control lever hingeably secured to the index bottom such that the ratio control lever passes through the ratio lever aperture and a cylindrical cranking shaft member secured to the index top for coupling to a center plate member. A generally circular center plate member is rotatively engaged to the cranking shaft member and has a center plate perimeter. The circular plate member has a first lug member secured to the center plate perimeter and is co-planar therewith for engaging a first connecting rod. A second lug member is secured to the center plate perimeter and is co-planar therewith for engaging a second connecting rod. A third lug member is secured to the center plate perimeter and is co-planar therewith for engaging a third connecting rod.

The improved apparatus also includes it associated first assembly comprising a first cylindrical shaft member having a first gear member rotatively disposed thereon with the first gear member including a generally cylindrical structure having an outer face and an inner face. The inner face has a multiplicity of triangularly shaped cutouts such that with the first assembly additionally including a plurality of bearings disposed in the plurality of cutouts one bearing corresponds to one cutout. The associated second assembly comprises a second cylindrical shaft member having a second gear member rotatively disposed thereon. The second gear member includes a generally cylindrical structure having an outer face and an inner face. The inner face has a multiplicity of triangularly shaped cutouts such that with the second assembly additionally including a plurality of bearings disposed in the plurality of cutouts, one bearing corresponds to one cutout. The third assembly associated with the improved apparatus comprises a third cylindrical shaft member having a third gear member rotatively disposed thereon, with the third gear member including a generally cylindrical structure having an outer face and an inner face. The inner face has a multiplicity of triangularly shaped cutouts such that with the third assembly additionally including a plurality of bearings disposed in the plurality of cutouts, one bearing corresponds to one cutout.

The improved apparatus in this preferred embodiment of the invention additionally comprises a first arm member interconnecting the first cylindrical shaft with the first connecting rod; a second arm member interconnecting the second cylindrical shaft with the second connecting rod; and a third arm member interconnecting the third cylindrical shaft with the third connecting rod. The first arm member is pivotally secured to the first connecting rod and is pivotally secured to the first cylindrical shaft; the first cylindrical shaft includes a first helical spring member circumferentially disposed around the first cylindrical shaft and has a first end secured to the first cylindrical shaft and a second end secured to the first arm member for sympathetically intercoupling the first cylindrical shaft to the first arm member through the first helical spring member. The second arm member is pivotally secured to the second connecting rod and pivotally secured to the second cylindrical shaft. The second cylindrical shaft includes a second helical spring member circumferentially disposed around the second cylindrical shaft and has a first end secured to the second cylindrical shaft and a second end secured to the second arm member for sympathetically intercoupling the second cylindrical shaft to the second arm member through the second helical spring member. Similarly, the third arm member is pivotally secured to the third connecting rod and pivotally secured to the third cylindrical shaft. The third cylindrical shaft includes a third helical spring member circumferentially disposed around the third cylindrical shaft with a first end secured to the third cylindrical shaft and a second end secured to the third arm member for sympathetically intercoupling the third cylindrical shaft to the third arm member through the third helical spring member.

Therefore, it is an object of the present invention to provide a transmission and a method for generating output from a transmission to produce rotational output from rotational input.

It is further still an object of the present invention to provide an epicyclic motion generating arrangement comprising: an input shaft assembly for establishing an input rotation and for coupling to an indexing assembly; and an indexing assembly coupled to the input shaft for sliding along a plane perpendicular to an axis of rotation of the input shaft having an index shaft protruding therefrom generally parallel to the axis of rotation of the input shaft. The indexing assembly additionally comprises means for moving the indexing assembly along the plane perpendicular to the axis of rotation of the input shaft assembly to effect an adjustment of a magnitude of epicyclicity, while the input shaft is rotating.

It is another an object of the present invention to provide a transmission with continuously variable ratios of output rotation relative to the input rotation.

It is yet another object of the present invention to provide a transmission and method utilizing epicyclic motion to produce overlappingly sequentially produced strokes on an output shaft which exhibits a substantially sinusoid-free output character.

It is still yet another object of the present invention to provide a transmission and a method for changing a ratio of output rotation while under load of the input rotation.

Other objects of the present invention will become apparent to those artisans skilled in the art as the following description proceeds. For example, those artisans possessing the ordinary skill in the art will readily detect and discern that the transmission of the present invention has torque limiting capabilities (e.g. gear reducing capabilities) in that if the transmission of the present invention is not capable of delivering or transmitting a required output power or torque at a time that an excessive load is placed on the output (i.e.

anything that would prevent an output assembly from performing, such as an output shaft not turning, due to improper gearing), the transmission of the present invention is capable of automatically reducing its gear ratio (i.e. reduces the magnitude of output relative to input) by diverting or channeling input power that was intended for the output assembly to a regulating assembly and/or by absorbing the intended input power with a spring, hydraulic piston, or the like (i.e. a dampening means). The transmission of the present invention is also capable of pulse removal in that an input rotation exhibiting a waveform that is characterized by sinusoid or similar pulsed intervals which is supplied to the input shaft of the transmission of the present invention is smoothed by the action of the dampening devices (i.e. springs, hydraulic pistons, or the like) installed in connecting assemblies (i.e. connecting rods and/or clutch arms that are spring biased and/or hydraulically biased) of the regulating assemblies. As a sinusoid nature input rotation or similar input rotation is supplied to the transmission of the present invention, pulses or excessive rotation components of the input rotation (i.e. "peaks" of the input rotation waveform) are absorbed by spring members located in the regulating assembly of the transmission of the present invention. Further, as those artisans possessing ordinary skill in the art will readily ascertain, output rotation derived from the transmission of the present invention are substantially free of sinusoid character waveforms when a load or resistance is applied to the output rotation. The springs in the regulating assembly of the transmission are capable of absorbing peaks associated with the arcs of travel of the clutch arms to substantially absorb the same peaks and to assist in generating substantially pulse-free output rotation without the use of a differential device.

These, together with the various ancillary objects and features which will become apparent to those skilled in the art as the following description proceeds, are attained by the novel transmission and method of the present invention, with preferred embodiments being shown with reference to the accompanying drawings, by way of example only, wherein:

BRIEF DESCRIPTION OF THE DRAWINGS

FIG. 3 is a partial sectional front elevational view of an overrunning clutch assembly (i.e. a portion of the output means as indicated) disclosing gear teeth, cylindrical bearings and wedging cutouts for receiving and mating with the cylindrical bearings;

FIG. 4 is a horizontal cross-sectional view of the embodiment of the transmission of FIG. 1, disclosing the regulating assembly being coupled to an input shaft (i.e. input means) and to an output shaft (i.e. output means);

FIG. 15 is a top plan view of a pair of mating shells or housings forming the dampened dynamically adjusting connecting rods from the embodiment of the invention depicted in FIG. 10, with a cutaway portion within the pair of mating shells or housings revealing a spring member (i.e. the dampening means);

FIG. 16 is a side elevational view of the dampened dynamically adjusting connecting rod of FIG. 15 with a cut-away portion disclosing the spring member (i.e. the dampening means);

FIG. 17 is a vertical sectional view of the dampened dynamically adjusting connecting rod of FIG. 15 taken in direction of the arrows and along the plane of line 17—17 in FIG. 15;

FIG. 18 is a side elevational view of one of the shells (or housings) for one of the dampened dynamically adjusting connecting rods illustrated in FIG. 15 with the spring member (i.e. the dampening means) removed therefrom, and with the shell (or housing) having a cutaway section indicating a cavity where the spring member (i.e. dampening means) resides;

FIG. 19 is a side elevational exploded segmented view of the shells of the dampened dynamically adjusting connecting rod of FIG. 15 disclosing the spring member (i.e. the dampening means);

FIG. 20 is a vertical sectional view of the shell (or housing) for the adjusting connecting rod of FIG. 18 taken in direction of the arrows and along the plane of line 20—20 in FIG. 18;

FIG. 43 is a top plan view of a fixed length connecting rod of the transmission of the present invention;

FIG. 44 is a side elevational view of the connecting rod of FIG. 43;

FIG. 45 is a perspective view of the index plate member disclosing an index lever cutout, a center web shaft bore, and a retaining pin aperture;

FIG. 46 is a bottom plan view of the cylindrical block member having an index lever cutout and disclosing in dotted line configuration the index plate member, an index plate lever, and an index plate guide;

FIG. 47 is a side elevational view of the cylindrical block of FIG. 46;

FIG. 48 is a top plan view of the cylindrical block member of FIG. 46;

FIG. 49 is another side elevational view of the cylindrical block member of FIG. 46 having the index plate member in solid lines;

FIG. 57A is a cross sectional view of the transmission of FIG. 9A with the index plate member in a position corresponding to a near maximum output position (i.e. an off-centered or eccentric position);

FIG. 62 is a partial vertical sectional view taken in direction of the arrows and along the plane of line 62—62 in FIG. 56.

FIG. 63 is a top plan view of an alternative embodiment of the crank arm of the transmission of the present invention which is rotatably coupled to the clutch shaft and biased with a biasing member (i.e. a spring member);

FIG. 64 is a cross sectional view of the crank arm of FIG. 63 depicting a bearing or bushing member interposed between an aperture of the crank arm and the clutch shaft and showing a helical compression spring biasing the crank arm;

FIG. 65 is a side elevational view of the crank arm of FIG. 63.

DETAILED DESCRIPTION OF THE DRAWINGS

Figure 1:
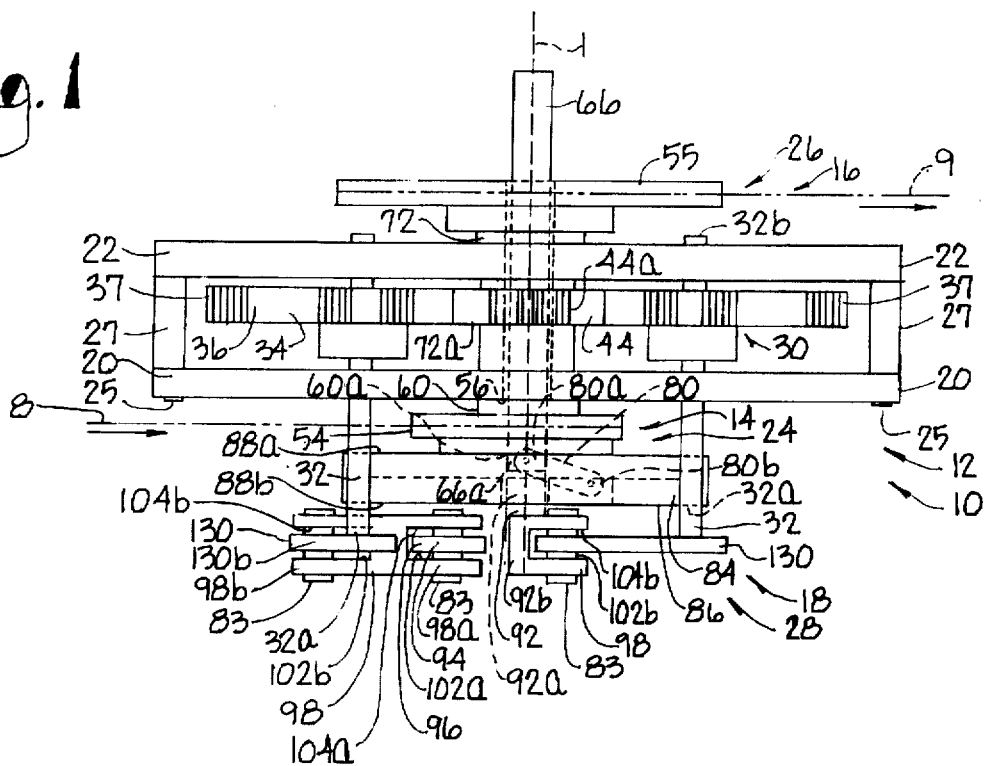
FIG. 1 is a top plan view of one embodiment of the transmission of the present invention disclosing a chassis or support assembly for supporting the internal particulars or workings of the present invention, with the dashed lines representing a portion of a regulating assembly (i.e. regulating means)

Referring in detail now to the drawings wherein similar parts of the invention are identified by like reference numerals, there is seen a preferred embodiment of the transmission of the present invention, generally illustrated as 10 in FIG. 1 and FIG. 4. Broadly, the transmission 10 of the present invention is capable of transmitting energy or force or power for application to work; that is, the transfer of energy or force from at least one body, system or assembly to at least one other body, system or assembly. More specifically, the transmission 10 of the present invention is capable or receiving energy or force or power (preferably mechanical energy, mechanical force or mechanical power, more preferably rotational mechanical energy, force, or power) from at least one (i.e. one or more) assembly or assemblies or system(s), and transferring or transmitting the received energy or force or power to at least one (i.e. one or more) other assembly or assemblies or system(s). Whenever "power" is used or stated in the specification and in the claims, it is to be understood that such use or statement is to broadly also or alternatively mean "energy" and/or "force".

The transmission 10 is capable of receiving rotational mechanical energy, force, or power) and transferring or transmitting the received energy or force or power to at least one (i.e. one or more) assembly or assemblies or system(s) in any dynamically adjustable ratio which may range from about 0:1 (i.e. a zero output state for any amount of input energy, force, or power) to at least about 1:1. It may be appreciated that the final output (i.e. rotational mechanical energy, force, or power) from the transmission may be geared or modified so as to produce any suitable or desired output ratio.

In a preferred embodiment of the present invention, the transmission 10 includes a suitable support frame or supporting assembly or supporting chassis, generally illustrated as 12 in FIG. 1 and FIG. 4; a means, generally illustrated as 14 and hereinafter referred to as "input means 14", supported by the suitable support frame or supporting assembly or supporting chassis 12, for receiving and/or establishing and/or assisting in the supplying of power (preferably input power such as rotary power or an input rotary power or an input rotation or any of the like) to and/or for the transmission 10; a means, generally illustrated as 16 and hereinafter referred to as "output means 16", supported by the suitable support frame or supporting assembly or supporting chassis 12, for producing and/or for establishing and/or for assisting in supplying power (preferably output power, such as rotary power or an output rotary power or an output rotation or any of the like) from the transmission 10; and a means, generally illustrated as 18 and hereinafter referred to as "regulating means 18", supported by the suitable support frame or supporting assembly or supporting chassis 12, and coupled to and/or engaged to and/or otherwise connected and/or secured to the input means 14 and to the output means 16 for regulating and/or controlling a quantity or an amount of power (i.e. output power, such as rotary power or output rotary power or an output rotation or any of the like) removed from and/or taken from and/or otherwise obtained from the input means 14 and imparted to and/or conferred upon and/or bestowed upon and/or into the output means 16.

The input means 14 may comprise any suitable means for generating a rotational input and may comprise, such as by way of example only, an engine member 15 which supplies rotational input to the transmission 10 (see FIG. 22), a bicycle pedaling assembly, or any other suitable power source that typically generates rotary power. As will be further set forth below, the input means 14 may include a sprocket (identified as 54 below) which is trained with a chain 8 that is in communication with a power source which generates a rotary motion or power (e.g. engine 15).

In one preferred embodiment of the transmission 10 for the present invention, the input means 14 comprises an input assembly, generally illustrated as 24 in FIG. 1 and FIG. 4, for establishing the input rotation within the transmission 10. The output means 16 of the transmission 10 for the present invention may be any suitable means for generating a rotational output, but preferably comprises an output assembly, generally illustrated as 26 in FIG. 1 and FIG. 4, for supplying and/or for establishing and/or for producing power or output rotation which varies sympathetically according to the power (i.e. input rotation) supplied by the input assembly 24 (i.e. input means 14). The regulating means 18 of the transmission 10 for the present invention may be any suitable means for regulating to perform and/or for accomplishing the function of the regulating means 18 in the transmission 10 of the present invention, but preferably the regulating means 18 comprises a regulating assembly, generally illustrated as 28 in FIG. 1 and FIG. 4, for regulating and/or for controlling a quantity or an amount of power taken from the input assembly 24 (i.e. input means 14) and imparted to the output assembly 26 (i.e. output means 16) through the regulating assembly 28 (i.e. regulating means 18).

In a preferred embodiment of the transmission 10, as shown in FIGS. 1 and 4, the chassis 12 or support assembly of the transmission 10 comprises a pair of opposed, generally circular plate members 20-22 which are generally parallel (see FIG. 4). The circular plate members 20-22 are offset with and/or by a plurality of generally tubular or hollow cylindrical spacer members 27-27 adapted for receiving bolt members 25-25 passing therethrough and generally for being held against the circular plate members 20-22 with and/or by same. Typically, the bolt members 25-25 are passed through the plate member 20 and the spacer members 27-27 and threadably engaged to one and/or both of the circular plate members 20 and/or 22, preferably threadably engaging the plate member 22. The spacer members 27-27 are thus fixedly held between the two plate members 20-22 such that any one bolt member 25 disposed in circular plate member 20 passes through any one spacer member 27 and threadably secures to circular plate member 22 to fixedly hold the spacer member 27 therebetween and thereby offset the circular plate members 20-22. Thus, there is a space created between the circular plate members 20-22 for supporting the output assembly 26 (i.e. output means 16).

Figure 22:
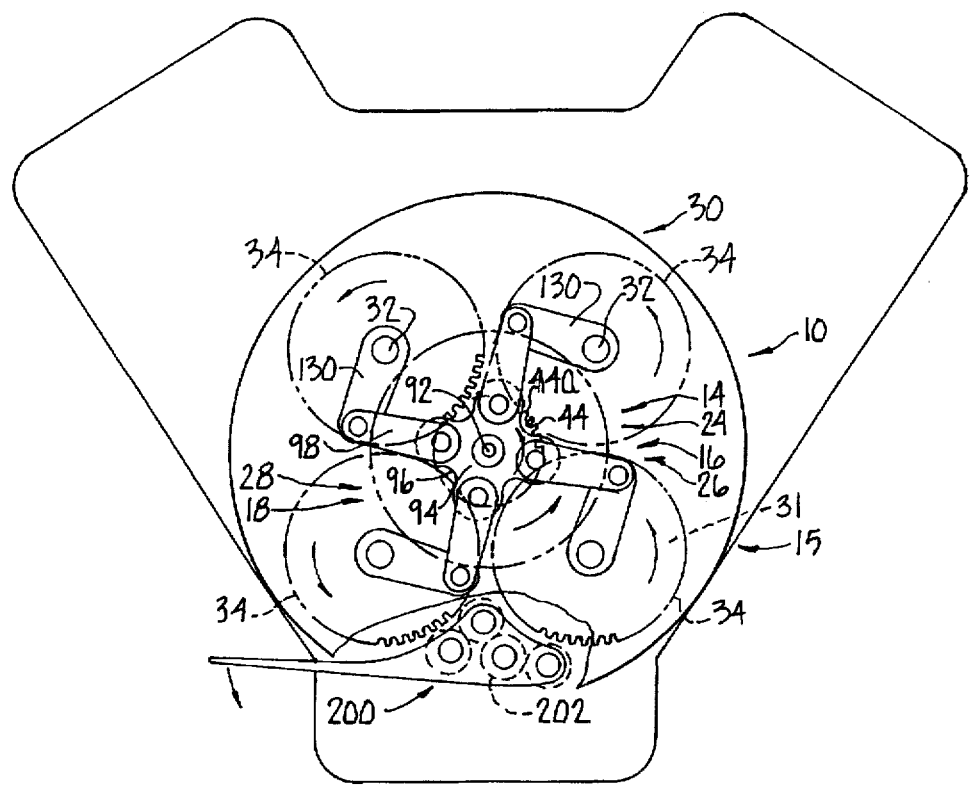
FIG. 22 is a side elevational view of the transmission of the present invention coupled to an engine member, with a direction selector gear assembly coupled to the transmission.

The output assembly 26 (i.e. output means 16), as seen in FIG. 4, for generating rotational output from rotational input supplied by the input assembly 24 (i.e. input means 14, which may comprise the engine member 15 as seen in FIG. 22) is coupled to and at least partially supported by circular plate member 20. The output assembly 26 (i.e. output means 16) may comprise any means suitable for being capable of converting reciprocating input rotation (i.e. alternating clockwise and counter-clockwise rotation) to a unidirectional output (i.e. in one direction only, being either exclusively clockwise or exclusively counterclockwise), such as in the embodiment depicted by FIG. 4 where the output assembly 26 comprises a plurality of overrunning clutch assemblies 30-30 and a summing gear member 44 coupled to the overrunning clutch assemblies 30-30. More particularly, each of the overrunning clutch assemblies 30, more specifically each of the gear rings (identified as "34" below) of the clutch assemblies 30, has and is circumscribed with a plurality of teeth 37 that engage and mesh with a plurality of teeth 44a of a summing gear member 44. It is appreciated that the summing gear member 44 may have a larger diameter than the gear rings (identified as 34 below), or that the summing gear member 44 may have a smaller diameter than the gear rings (identified as 34 below). In the embodiment of the invention depicted for example in FIGS. 1 and 4, the output assembly 26 may also include a sprocket (identified as "55" below) which is trained with a chain 9 that is in communication with an output destination which is to be rotatively driven (e.g. a drive axle, etc).

In the embodiment of the invention illustrated in FIG. 4, the combination of the clutch assemblies 30-30 and the summing gear member 44 are coupled to and/or drivenly connected to the regulating assembly 28 (i.e. regulating means 18) through one or more connecting rods (identified as 98 below) and crank arms (identified as 130 below), for generating rotational output from rotational input of the input assembly 24 (i.e. input means 14). More specifically, the regulating assembly 28 is coupled to the connecting rods which in turn are pivotally connected to or engaged to the crank arms that are integrally secured to central shafts (identified as 32 below) to partially rotate or reciprocate up and down less than 180 degrees to convert or transfer the up and down partially rotating or reciprocating motion on each crank arm (and on each central shaft secured thereto) into a rotary motion on each of the clutch assemblies 30 (i.e. on each gear ring identified as 34 below and which are mounted to a central shaft (identified as 32 below), of the clutch assemblies 30).

Each overrunning clutch assembly 30, as best shown in FIG. 3, comprises a central shaft 32 for receiving rotational input (i.e. input from the input means 14) via the regulating assembly 28, the connecting rods, and the crank arms (in the order stated), and has a gear ring 34 ratchetly disposed around and on the central shaft 32 such that when the central shaft 32 rotates in a direction less than 180 degrees, the gear ring 34 will rotate with the central shaft 32 in the same direction and when the central shaft 32 rotates in the opposite direction less than 180 degrees, the gear ring 34 will not rotate with the central shaft 32 in the opposite direction but will free wheel. Stated alternatively and with respect to the view in FIG. 3 and as will be further explained hereafter, when the central shaft 32 rotates in a desired direction (e.g. in a counter-clockwise rotation) less than 180 degrees, the gear ring 34 will lock on or otherwise bind to (or be bound onto) the central shaft 32 to rotate with the central shaft 32 in the desired direction (e.g. in the counter-clockwise rotation). When the central shaft 32 rotates in an opposite direction to the desired direction (e.g. in a clockwise rotation) and also less than 180 degrees, the gear ring 34 will not lock on or otherwise bind to (or be bound onto) the central shaft 32 and will swivel or free wheel on and/or about the central shaft 32. Stated alternatively further, if the gear ring 34 is rotated in a desired direction (e.g. in direction of "FREE <..." in FIG. 3) the central shaft 32 will not turn with the gear ring 34; and if the gear ring 34 is rotated in a direction opposite to the desired direction (e.g. in direction of "...>LOCK" in FIG. 3), the central shaft 32 becomes locked with and onto the gear ring 34 and rotates therewith.

The gear ring 34 comprises an outer surface 36 which has gear teeth 37 formed on the outer or circumferential surface 36 or secured otherwise thereto. The gear ring 34 also has an inner surface 38 which has a plurality of cutouts 40-40-40-40-40-40 (see FIG. 3) formed in the inner surface 38 which are adapted for receiving a corresponding number of cylindrical bearings 42-42-42-42-42-42 (i.e. one cylindrical bearing 42 per each cut-out 40). The plurality of cutouts 40 generally form a circular saw-tooth surface; thus, the inner surface 38 defines a generally saw-tooth surface. For the embodiment of the invention shown in FIG. 3, at least 6 cutouts 40-40-40-40-40-40 are formed in the inner surface 38 of the gear ring 34 for receiving the corresponding number of spherical or cylindrical bearings 42-42-42-42-42-42. It can be appreciated that the preceeding discussion of overrunning clutch assemblies 30 is meant merely as being exemplary for overrunning clutches, and that any suitable number of overrunning clutch assemblies 30 may be used without departing from the spirit and/or scope of the invention. Therefore, any number of cutouts 40/bearing 42 combinations may be employed. Likewise, any suitable one way clutch or overrunning clutch 30 or ratchet may be employed without departing from the spirit and/or scope of the invention.

Figure 41:
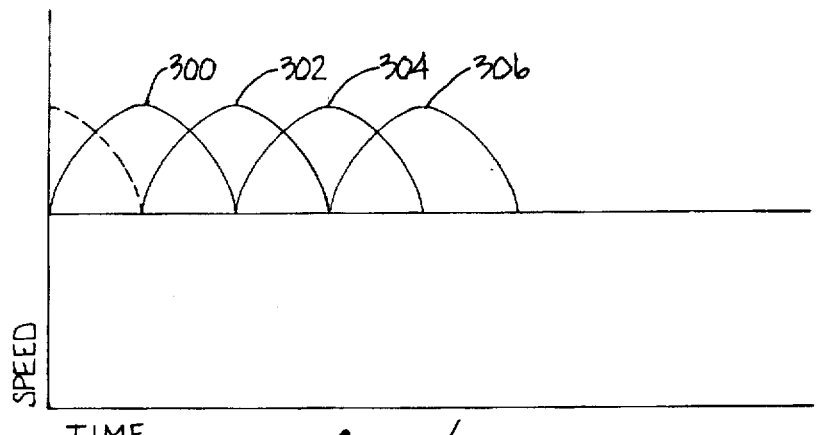
FIG. 41 is a graph of a rotational output produced by one embodiment of the transmission of the present invention having fixed connecting rods and depicting waveforms of output speed versus time and showing a sinusoidal output.

The overrunning clutches 30 (of the output assembly 26) of the present invention are suited for generating uni-directional (i.e. exclusively clockwise or exclusively counter-clockwise) rotational motion from a reciprocating rotational input (i.e. an input which reverses direction or systematically alternates between clockwise and counter-clockwise rotations). As will be discussed, the regulating assembly 28 (i.e regulating means 18) transforms (via the connecting rods and the crank arms) input rotation supplied by input means 14 to alternating or reciprocating motion on the central shafts 32 which is used by the output means 16 through gear rings 34 that turn or rotate in a desired direction to subsequently turn the summing gear member 44 in a desired direction. The summing gear member 44 turns the output means (i.e. a sprocket, identified as 55 below, of the output means 16) in a desired direction. As will be further explained below, any particular gear ring 34 is turned in a desired direction by its associated central shaft 32 being turned in the same desired direction due to or from a power (or down or working) stroke being relayed by the associated central shaft 32 (i.e. central shaft 32 becomes locked or bound up to gear ring 34) from an associated crank arm (i.e. an associated crank arm identified as 130 below and integrally secured to its associated central shaft 32 and pivotally secured to its associated connecting rod identified as 98 below) being in a power (or down or working) stroke due to action of its associated connecting rod (identified as 98 below) pulling or moving the particular associated crank arm (identified as 130 below). When the central shaft 32 is in an upstroke state (i.e. in a non-power or non-working stroke state), the central shaft 32 ratchets with and/or on the particular gear ring 34, thus not powering or rotating the particular gear ring 34 and allowing the same to free wheel and to continually turn in the desired direction from the action (or under the influence) of the summing gear member 44 continuing to turn in the desired direction, due to the summing gear member 44 being propelled or rotated by one or more other gear rings 34 that are being rotated by their associated central shaft 32 being in a power stroke. Thus, all gear rings 34 continually turn in the desired direction from the summing gear member 44 receiving one or more (i.e. one or more overlapping) power strokes (or down strokes or working strokes). As the number of the gear rings 34 (i.e. clutch assemblies 30) increases, the interval between ending power strokes and beginning power strokes (before same strokes reach an apex or peak) of different gear rings 34 decreases, thereby creating smaller intervals of pulsing (i.e. power pulsing) by the output (i.e. a waveform of the output may approximate overlapping positive sine curves, as shown in FIG. 41) and an according smoother output. Stated alternatively, the pulsing of any one gear ring 34, as it travels from the beginning of its power (or down or working) stroke through its peak and to the end of its down (or power or working) stroke, is characterized by a one-half cycle sine curve and the pulsing is relayed to the summing gear member 44. Further, at any particular time, there will be at least one (i.e. one or more) down stokes (or power strokes or working strokes) being produced and relayed to the summing gear member 44; and before any one gear ring 34 completes a down stroke (or power stroke or working stroke), at least one (i.e. one or more) other gear ring(s) 34 is (or are) commencing a down stroke (or power stroke or working stroke), such that there is no interruption at any time of a power stroke on the summing gear member 44, or such that the end of a power stroke for one gear ring 34 overlaps the beginning of a power stroke for another gear ring 34.

One method of the present invention is to utilize the plurality of gear rings 34 (i.e. of the according clutch assemblies 30) to construct approachingly smoother output. As will be seen, the combination of multiple clutch assemblies 30 and dynamically adjusted connecting rods (identified as 98 below and which will be discussed further below) substantially eliminate pulsing on the summing gear member 44 by the pulsing generated between intervals of down stroke (or power stroke or working stroke) peaks of the gear rings 34.

The uni-directional output (i.e. power output from a power stroke or a working stroke) generated by the overrunning clutch assembly 30 of the output assembly 26 (i.e. output means 16) is generated along the central shaft 32 in one direction only as previously mentioned. Feedback (e.g. a resistance from a weight of a vehicle, etc) through the gear ring 34 onto the central shaft 32 occurs to produce a feedback resistance. The feedback resistance is relayed from the output shaft 72 and the summing gear member 44, through the gear ring 34 (e.g. a "clockwise" feedback, or a feedback that resists the counter-clockwise movement of the central shaft 32, with respect to the view of FIG. 3) and onto the central shaft 32 and resists or attempts to retard rotation (i.e. a feedback resistance or load resistance) on or of or onto the gear ring 34, such that the resistance or retardance is transmitted or transferred through a crank arm to be identified as 130 below, through a connecting rod to be identified as 98 below, and into the regulating assembly 28 where it (i.e. the feedback or resistance) is ultimately applied against the input means 14 (i.e. input rotation or input power), all while simultaneously allowing for the reciprocating motion of the clutch assemblies 30 as long as the input means 14 (i.e. input assembly 24 which relays input power or rotation) is capable of overcoming the feedback or resistance. If the input means 14 (i.e. input rotation applied to input assembly 24) is not operating (e.g. an engine is shut off, etc.) or cannot overcome the resistance (e.g. not enough power, etc), at least one of the overrunning clutches 30 (i.e. one or more of the overrunning clutches 30) become locked as the resistance pulls against the regulating assembly 28 such that the output means 16 (i.e. output assembly 26) does not turn reverse or backwards; that is the summing gear 44 of the output assembly 26 is prevented from reversing or turning backwards (i.e. opposite to a desired output direction) due to the locking action of the crank arms (identified as 130 below) of the overrunning clutches 30 against the regulating assembly 28. The single direction output is one of the salient features of the present invention. Obviously, as previously discussed the converse is also true; if counter-clockwise rotation (respective to FIG. 3) is applied to the central shaft 32, the gear ring 34 is caused to rotate counter-clockwise (respective to FIG. 3) due to the locking action previously discussed whereas clockwise rotation applied to the central shaft 32 has no effect on the rotation of the gear ring 34. It is important to note that the load or feedback from the output is relayed to the overrunning clutches 30 in the same fashion that output is generated from the overrunning clutches 30.

When counter-clockwise rotation (i.e. a power stroke rotation or working stroke rotation) is applied to the central shaft 32 (again with respect to the view depicted by FIG. 3), the gear ring 34 turns due to the locking action caused by the bearings 42 becoming wedged in the cutouts 40 and causing the gear ring 34 to move in the same direction as the central shaft 32 (i.e. in a power or working stroke rotation direction). When the central shaft 32 is turned in the clockwise direction, the cutouts 40 allow the bearings 42 to roll freely within the cutouts 40 and the gear ring 34 does not become wedged to or locked onto the central shaft 32, thereby allowing the central shaft 32 to turn independently of the gear ring 34. Therefore, relative to the use of the overrunning clutch assembly 30 in the practice of the present invention, reciprocating or ratcheting motion (i.e. systematically alternating clockwise and counter-clockwise rotation in less than 180 degrees, or such that an arc of travel defined by a radial line (not shown) extending perpendicular to the axis of rotation (not shown) of the central shaft 32 has a total arc length of less than 180 degrees) may be applied to the central shaft 32 to ratchet the gear ring 34 in the counter clockwise direction (with respect to the view in FIG. 3). It is to be clearly understood that while a ratcheting/ reciprocating ability between the central shaft 32 and its associated gear ring 34 is presently being illustrated or depicted by the inner surface 38 having the plurality of cutouts 42 possessing a corresponding number of the bearings 42, the spirit and scope of the present invention includes that the ratcheting/reciprocating ability between the central shaft 32 and its associated gear ring 34 may be accomplished and produced by any type of ratcheting/reciprocating connection and/or arrangement between the central shaft 32 and its associated gear ring 34. Thus, and stated alternatively, the gear ring 34 and the central shaft 32 are connected to each other or ratchetly connected to each other such that when the central shaft 32 rotates in a direction (preferably rotating less than 180 degrees in a direction), the gear ring 34 will rotate with the central shaft 32 in the same direction and when the central shaft 32 rotates in the opposite direction (preferably rotating less than 180 degrees in the opposite direction), the gear ring 34 will not rotate with the central shaft 32 in the opposite direction but will free wheel and be able to continue rotating in the initial same direction. Stated alternatively, the central shaft 32 and its associated gear ring 34 are interconnected or inter-engaged such that when the central shaft 32 rotates in a desired direction (e.g. in a counter-clockwise rotation and preferably less than a 180 degree rotation), the gear ring 34 will lock on or otherwise bind to (or be bound onto) the central shaft 32 to rotate with the central shaft 32 in the desired direction (e.g. in the counter-clockwise rotation); and when the central shaft 32 rotates in an opposite direction to the desired direction (e.g. in a clockwise rotation) and also preferably less than 180 degrees, the gear ring 34 will not lock on or otherwise bind to (or be bound onto) the central shaft 32 and will not rotate in the opposite direction to the desired direction and is allowed to swivel or free wheel on and/or about the central shaft 32 in the initial desired direction (e.g. the counter-clockwise rotation) from momentum of being turned in the desired direction and/or from, as was previously set forth above, rotary action of the meshed summing gear member 44 continuing to move the gear ring 34 in the initial desired direction.

Thus, by rotating the central shaft 32 in the counterclockwise direction (i.e. in a power stroke or working stroke direction) to produce a corresponding counter-clockwise stroke or rotation (i.e. a power stroke or working stroke or rotation) on the gear ring 34, followed by a reciprocated clockwise rotation (i.e. a non power stroke or non working stroke or rotation) by the central shaft 32, the gear ring 34 continues or is caused to rotate in the counter-clockwise direction while allowing the central shaft 32 to rotate clockwise (respective to FIG. 3) without affecting the counter-clockwise rotation of the gear ring 34. As previously indicated, the gear rings 34 continue to rotate in the counter-clockwise direction (respective to FIGS. 2 and 3) since the gear rings 34 are continually meshed or coupled to the summing gear member 44 and since further the summing gear member 44 is continually pulsed by at least one (i.e. one or more) gear member(s) 34. The reciprocating motion of the central shaft 32 on the gear ring 34 to cause the gear ring 34 to rotate in one direction only is a characteristic of the overrunning clutch assemblies 30 of the output assembly 26 (i.e. output means 16) that is capitalized upon in the operation of the present invention. As will be seen, reciprocating motion may be applied to a desired number (e.g. generally and preferably at least three) of the overrunning clutch assemblies 30 to produce overlapping or sequentially overlapping generated power strokes by the clutch assemblies 30 for producing a summed output (i.e. a summed power output from a sum of a plurality of power or working strokes) from the clutch assemblies 30. It is to be understood however that any number of clutch assemblies 30 (i.e. a means for clutching) may be used in the practice of the present invention without departing from the scope and/or spirit of the present invention.

Figure 27:
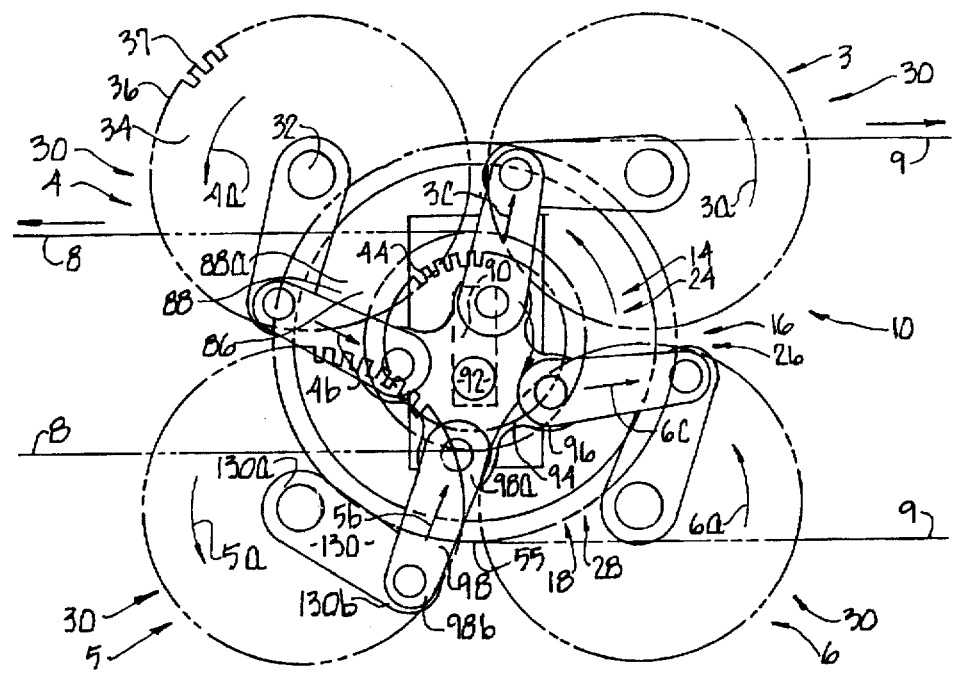
FIG. 27 is a side elevational view of a third stroke of the embodiment of the transmission illustrated in FIGS. 1 and 2 and subsequent to the second stroke indicated in FIG. 26, with the arrows indicating direction of travel for the respective clutch assemblies.

Stated alternatively and further still, a plurality of clutch assemblies 30 are disposed and arranged in the transmission 10 to be operated in an overlapping and/or overlapping sequential manner such that each clutch assembly 30 is generally overlappingly operated (i.e. one clutch assembly 30 commences a power operation before another clutch assembly finishes a power operation). Each clutch assembly 30 produces a two part stroke consisting of an up stroke (i.e. non-power stroke or non working stroke) carried out by ratcheting the central shaft 30 (see FIG. 3) within the gear ring 34, then subsequently turning or reciprocating or reversing the rotation of the central shaft 32 to produce a down-stroke (i.e. a power stroke or working stroke) by the central shaft 32, which is relayed to the gear ring 34. During the two part stroke (i.e. the non-power or non-working stroke followed by a reciprocal or reversed or a desired direction power or working stroke) the gear ring 34 initially free wheels (relative to the central shaft 32) in the non-power stroke, and then subsequently locks onto or becomes wedged to the central shaft 32 in the down stroke (or power stroke or working stroke) and turns with and is powered by the central shaft 32 as the central shaft 32 is caused to turn by its corresponding crank arm which is under the influence of a power or work force turning the central shaft 32 in the desired direction. Stated alternatively and further, the clutch assemblies 30 (overlapping and/or sequentially overlapping with respect to any two or more contiguous clutch assemblies 30) produce a stroke (i.e. a non-power or a non working stroke) by ratcheting (i.e. preferably rotating less than about 180 degrees) a first central shaft 32 of a first clutch assembly 30 (indicated as 3 in FIG. 25) initially in a ratcheting non-power direction (e.g. the central shaft 32 of one clutch assembly 38 is rotated preferably clockwise less than about 180 degrees respective to FIG. 3 to produce the up-stroke or non-power stroke) in the direction of arrow 3c in FIG. 28 and then reciprocated or-rotated in a desired power direction (i.e. a direction opposite to the ratcheting non-power direction) in the direction of arrow 3b in FIG. 25. Simultaneously and overlappingly, in the time that the first clutch assembly 3 completes its two part cycle or stroke (i.e. the combination of the up-stroke or non power stroke and the down-stroke or the power stroke) a second clutch assembly 30 (identified as 4 in FIG. 27) completes its down cycle (i.e. when the first clutch assembly 3 started its up-stroke or non-power stroke (as shown in FIG. 27 and indicated by arrow 3c) the second clutch assembly 4 was completing its power stroke or down stroke (as shown in FIG. 27 and indicated by arrow 4b)), and begins its up stroke or non-power stroke as in FIG. 25 in direction of the arrow 4c. The second clutch assembly 4 will perform and will duplicate the same two-part stroke (viz. the same up (non power)/down (power) stroke) of clutch assembly 3, excepting being delayed by an interval or period of time, the length of which would depend on the rotation speed of the regulating assembly 28 and the number of clutch assemblies 38 employed in the transmission 10. Thus, since the amount of time (i.e. interval) between down or power strokes of the clutch assemblies 30 is determined by how many clutch assemblies 30 are utilized in the particular embodiment of the present invention 18 (e.g. four clutch assemblies 30 in FIGS. 25–28), as the number of clutch assemblies 30 to be employed increases, the length or amount of time within and/or for said interval or period of time to produce sequentially and/or overlappingly sequential power (or working/down strokes) between any pair of clutch assemblies (e.g. clutch assemblies 3 and 4) decreases or lessens. The "lag" or overlapping interval of time (i.e. the length of time that one particular clutch assembly 30 is in a power or working stroke simultaneously with another particular clutch assembly 30 that is finishing a power or working stroke) between the stroking actions of the clutch assemblies 30 determines the degree or magnitude of overlap by the strokes of the clutch assemblies 30 exhibited by the transmission 10.

In continuing the sequence of cycles for the clutch assemblies 30 of the embodiment depicted in FIGS. 25–28, there is seen a third clutch assembly 30 is indicated by 5 and a fourth clutch assembly is indicated by 6. It is to be understood any number of clutch assemblies 30 may be utilized in any particular embodiment of the present invention, and that the embodiment and discussion for FIGS. 25–28 is to be construed as merely exemplary. Therefore, in the case where eight clutch assemblies 30 are used, there would for example be more overlapping strokes and a less interval of time between and among overlapping strokes (i.e. power strokes) than if four clutch assemblies 30 were used. Thus, it would be anticipated that at any given point in the transmission's 10 operation, there may be as few as one clutch assembly 30 in a power stroke (or non-power stroke), or a multiple number of clutch assemblies 30 engaged or operating in a power stroke (or non-power stroke), the multiple number being a function of the total number of clutch assemblies 30 employed.

Figures 25, 26:
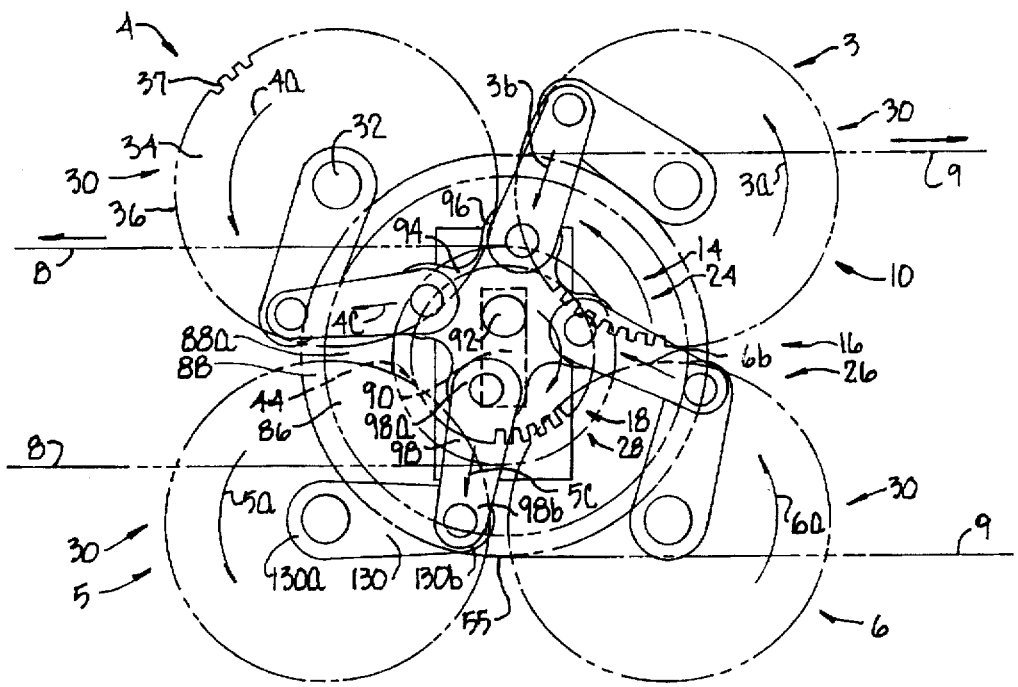
FIG. 25 is a side elevational view of a first stroke of the embodiment of the transmission illustrated in FIGS. 1 and 2, with the dashed line circles indicating gears coupled to the plurality of overrunning clutch assemblies and the ratio control assembly (i.e. respective output means and regulating means), and with the arrows indicating direction of travel for the respective clutch assemblies.
FIG. 26 is a side elevational view of a second stroke of the embodiment of the transmission illustrated in FIGS. 1 and 2 and subsequent to the first stroke indicated in FIG. 25, with the arrows indicating direction of travel for the respective clutch assemblies.

Continuing now to refer to the embodiment in FIGS. 25–28, as the second clutch assembly 4 commences its down stroke or power stroke as indicated in FIG. 26 by the arrow 4b, the third clutch assembly 5 is ending its non-power stroke as indicated by arrow 5c in FIG. 26. Soon the third clutch assembly 5 will begin its power stroke as indicated by arrow 5b in FIG. 27; concurrently therewith, the second clutch assembly 4 will be ending its power stroke, as shown by arrow 4b in FIG. 27, and the fourth clutch assembly 6 will be ending its non-power stroke, as indicated by arrow 6c in FIG. 27, to commence its (i.e. the fourth clutch assembly 6) power stroke (shown by arrow 6b in FIG. 25). The mechanism for instigating or causing the strokes and overlapping strokes is a center web member (to be identified as 94 below) which is caused to be moved in a radial fashion about and from the central axis 1 of the transmission 10 by a coupled index plate member (identified as 82 below) being slidably disposed in a block member (identified as 88 below) and being moved by an index plate lever (identified as 80 below) coupled to a movable ratio control rod (identified as 66 below). As an index plate member (identified as 82 below) that is coupled to a center web member (identified as 94 below), moves the center web member further away from the central axis 1 (viz. radially off-setting the center web member away from the central axis 1), the index plate member (which has also moved radially away from the central axis 1) is correspondingly moved radially off-center. As will be seen, the increasing radial off-set of the index plate member (identified as 94 below) translates into a corresponding increasing epicyclic orbit or motion on or of the center web member (identified as 94 below) which is parlayed or transferred to the connecting rods (identified as 98 below) pivotally coupled to the center web member (identified as 98 below). The connecting rods effectively transform the orbital or epicyclic motion on or of the center web member (identified as 94 below) to reciprocating (i.e. up/down) motion that is used by the crank arms identified as 130 below) to generate reciprocal rotational movement on the respective central shafts 32.

As the regulating assembly 28 revolves, the regulating assembly 28 (as will be more completely and further discussed below) relays or causes or transfers reciprocating motion through respective connecting rods (to be identified as 98 below) which are coupled or pivotally connected to respective associated crank arms (to be identified as 130 below) of clutch assembly 30 (e.g. clutch assembly 3 in FIG. 26). The motion of the regulating assembly 28 (as will be more thoroughly described below) is relayed through the respective connecting rods (identified as 98 below) to respective associated crank arms (identified as 130 below) of any clutch assembly 30 (e.g. clutch assembly 30 also indicated by 3 in FIGS. 25–28) to alternatively push respective associated crank arms (identified as 130 below) into a non-working or non-power stroke and alternatively pull the respective associated crank arms (identified as 130 below) into a power stroke or working stroke. It should be noted that during the entire process, as further previously indicated, the respective gear ring 34 of each clutch assembly 30 continues to turn in the desired direction (i.e. counter-clockwise with respect to FIGS. 25–28) from being meshed with the summing gear 44 that is rotating also in the desired direction.

Figure 11:
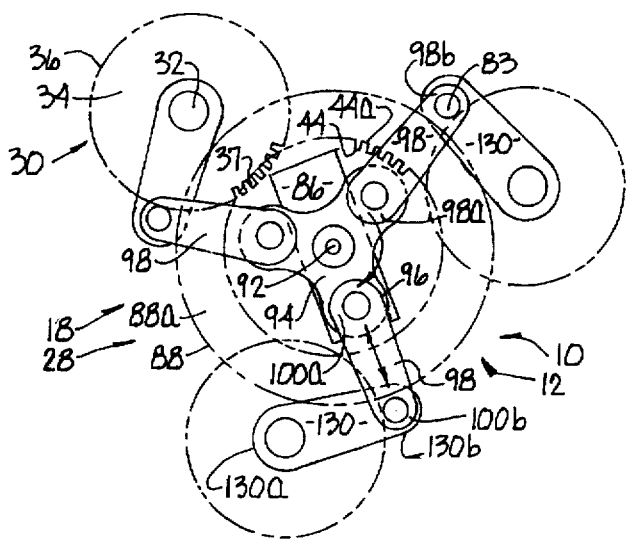
FIG. 11 is a front elevational view of an another embodiment of a plurality of (i.e. three) overrunning clutch assemblies having crank arms secured respectively thereto and coupled to a center web member of the transmission of the present invention.

More specifically, with reference to FIG. 11 wherein one embodiment of the transmission 10 of the present invention comprises three clutch assemblies 30-30-30, each of the three clutch assemblies 30-30-30 is operated to produce a stroke, such that the stroke of any one clutch assembly 30 is generally overlapped by a stroke of the clutch assembly 30 adjacent to it. As will be further discussed, the sequence or direction of overlapping for the strokes to be produced by the clutch assemblies 30-30-30 may be clockwise (with respect to the view in FIG. 11) or counter-clockwise. Stated alternatively, the sequence or direction of overlapping for acting on the clutch assemblies 30-30-30 may be carried out by acting on each clutch assembly 30-30-30 following or in a direction of either a clockwise sequence or overlap or a counter-clockwise sequence or overlap as will be further discussed below. In some applications, as few as two clutch assemblies 30-30 may be employed, however, smoother output is typically achieved with preferably at least three clutch assemblies 30-30-30 as shown in FIG. 11 and as will be further discussed below. Nevertheless, the number of clutch assemblies 30 utilized should not be construed to limit the scope and/or spirit of the invention, and it should be understood that as few as one clutch assembly 30 may be utilized within the spirit and scope of the present invention.

Figure 2:
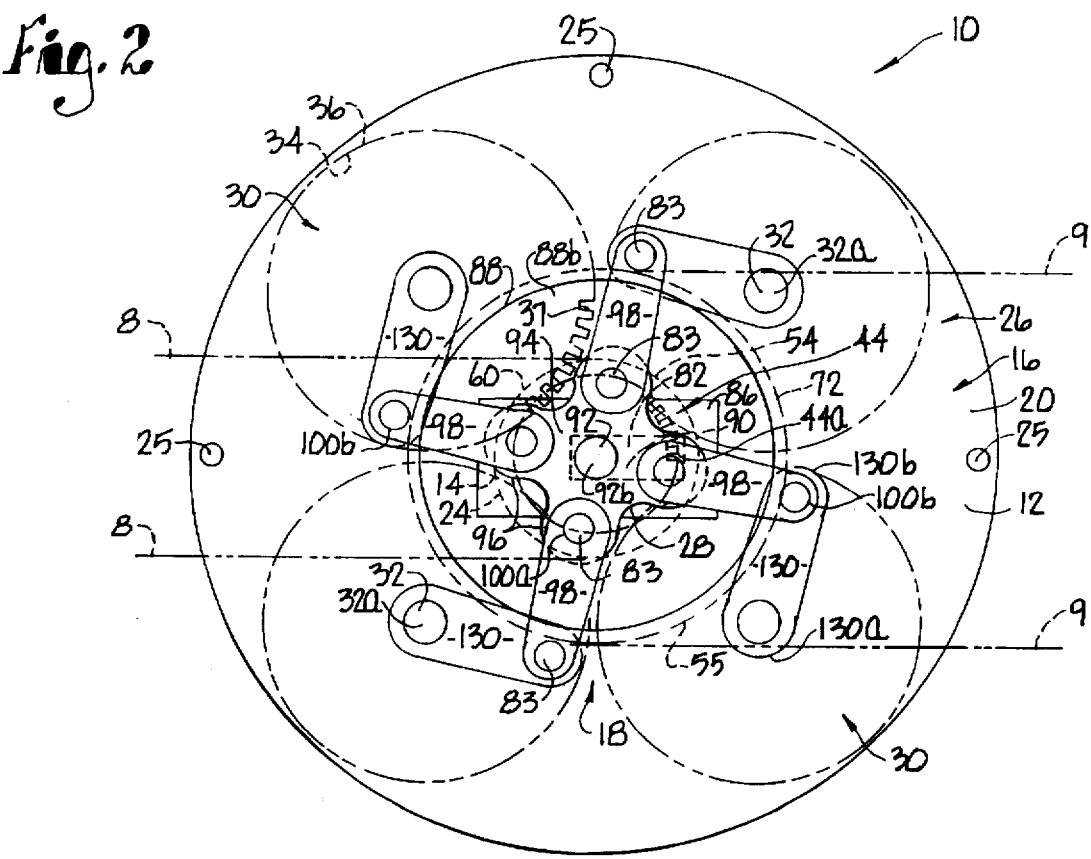
FIG. 2 is a front elevational view of the embodiment of the transmission of FIG. 1 disclosing a plurality of overrunning clutch assemblies (i.e. a portion of an output means) coupled to a center web member with connecting rod members for relaying rotational input to the plurality of clutch assemblies.
Figure 5:
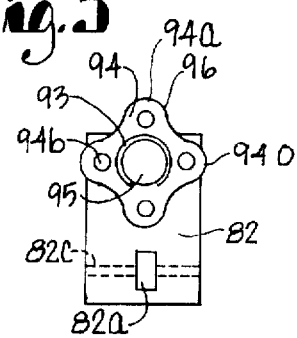
FIG. 5 is a top plan view of the regulating assembly (i.e. regulating means) removed from the transmission.
Figure 6:
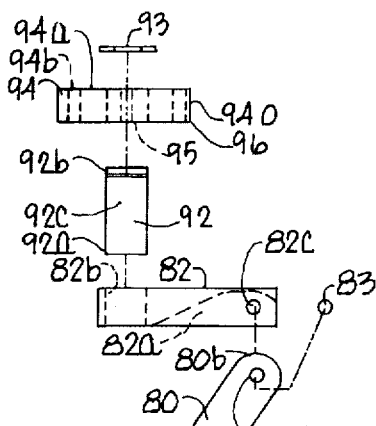
FIG. 6 is a segmented side elevational view of the regulating assembly (i.e. regulating means) of FIG. 5.
Figure 7:
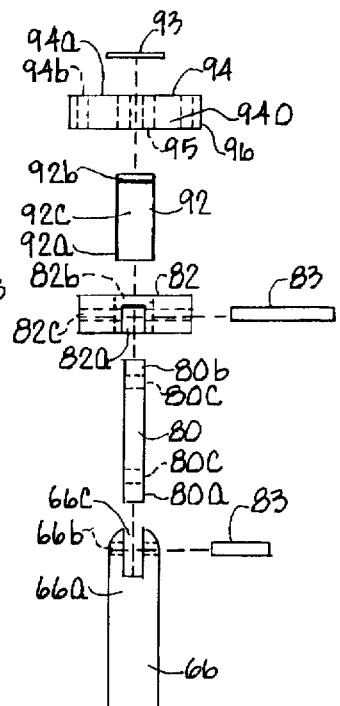
FIG. 7 is another segmented side elevational view of the regulating assembly (i.e. regulating means) of FIG. 6 after being rotated by approximately 90 degrees.
Figure 12:
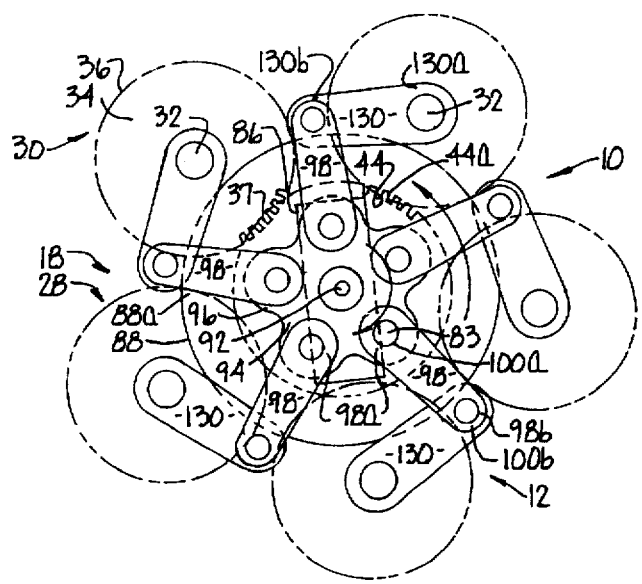
FIG. 12 is a front elevational view of yet another alternate embodiment of a plurality of (i.e. five) overrunning clutch assemblies having crank arms secured respectively thereto and coupled to a center web member of the transmission of the present invention.

As previously mentioned, the output assembly 26 (i.e. output means 16) is supported by the chassis or support assembly 12 of the transmission 10. Typically the output assembly 26 comprises, in one preferred embodiment, at least three clutch assemblies 30-30-30 (see FIG. 11) in the practice of the present invention. As mentioned, it is understood that any number of the overrunning clutch assemblies 30-30-30 may be used in the output assembly 26 in the practice of the present invention, such as the embodiment shown in FIG. 12, where five overrunning clutch assemblies 30-30-30-30-30 are used in the output assembly 26 (i.e. output means 16) to generate uni-directional rotational output from an input. FIG. 2 shows four overrunning clutch assemblies 30-30-30-30 employed in the practice of the present invention.

As seen in FIG. 4, the central shaft 32 of each clutch assembly 30-30 is supported by the chassis or support assembly 12 of the transmission 10. More specifically, the circular plate member 20 has a plurality of apertures 48-48 wherethrough the central shafts 32-32 of each clutch assembly 30-30 may pass. As previously mentioned, a preferred number of clutch assemblies 30 (e.g. two are visible in the view depicted by FIG. 4) is typically employed, therefore a plurality of apertures 48 corresponding to the number of clutch assemblies 30 is disposed in circular plate member 20. Accordingly, for the embodiment depicted in FIG. 11 where three clutch assemblies 30-30-30 are employed, three apertures 48 corresponding to the number of clutch assemblies 30-30-30 would be disposed in circular plate 20; likewise, in FIG. 12 where five clutch assemblies 30-30-30-30-30 are employed, five of the apertures 48 would be employed to accommodate a corresponding number of the central shafts 32-32-32-32-32 of the clutch assemblies 30-30-30-30-30. Preferably, the apertures 48 (see FIG. 4) are disposed in the circular plate 20 such that the apertures 48 are radially spaced from a central axis 1 of transmission 10 and such that the apertures 48 are typically equally spaced, both radially and circumferentially. Stated alternatively, the distance between each of the apertures 48 and the central axis 1 is preferably essentially equal and the apertures 48 are essentially spaced evenly apart. It is appreciated, however that the apertures 48 are not required to be equispaced, and generally asymmetrical spacing of apertures 48 (and therefore of the clutch assemblies 30) are within the scope/spirit of the present invention.

The central shafts 32 of the clutch assemblies 30 pass through corresponding apertures 48 and are engaged by a plurality of respective bearing members 46 disposed circumferentially in the apertures 48 for allowing the central shafts 32 of the clutch assemblies 30 to be reciprocatively supported by the circular plate member 20 and to rotate and/or reciprocate freely within the respective apertures 48. As can be seen in FIG. 4, the central shafts 32-32 of the respective clutch assemblies 30-30 are therefore preferably radially disposed around the central axis 1 of the transmission be and rotatably and reciprocatively supported by the respective bearing members 46-46 disposed in and supported by the circular plate member 20. Each of the central shafts 32-32 of the clutch assemblies 30-30 comprise opposed ends 32a-32a and 32b-32b, with the ends 32a-32a passing through the apertures 48-48 of circular plate member 20 such that the ends 32a-32a protrude and extend away from the chassis or support assembly 12. The opposite ends 32b-32b of each of the central shafts 32-32 pass through corresponding apertures 50-50 which are disposed in the circular plate member 22 and rotatively engage respective corresponding bearing members 52-52 for allowing central shafts 32-32 (including the associated ends 32b-32b) of the clutch assemblies 30-30 to be supported by and reciprocatively coupled to the circular plate 22 and to rotate and/or reciprocate freely within the aperture 50. Obviously, the circular plate member 22 would have a plurality of apertures 50-50 corresponding to the number of the apertures 48-48 disposed in circular plate 20. The apertures 50-50 are likewise disposed radially from the central axis 1 in the circular plate member 22 and preferably essentially equally spaced, both radially and circumferentially.

Thus, it can be seen that the chassis or support assembly 12 (see FIG. 4) of the transmission 10 comprises opposed circular plates 20 and 22 which have respective apertures 48-48 and 50-50 and corresponding bearings 46-46 and 52-52 respectively. Therefore, the apertures 50-50 are aligned with and opposed to the apertures 48-48 of the circular plate 20. It is readily seen that the opposed circular plate members 20-22 serve to suspend the central shafts 32-32 of the clutch assemblies 30 between the circular plates 20-22 by supporting the central shafts 32-32 of the clutch assemblies 30-30. The ends 32b-32b of the clutch assemblies 30-30 essentially terminate in bearings 52-52 to rotatively and reciprocatively couple the ends 32b-32b of the central shafts 32-32 to and into the circular plate 22. Ends 32a-32a of the clutch assemblies pass through bearings 46-46 such that the central shafts 32-32 are reciprocatively supported by the bearings 46-46 to reciprocatively couple the central shafts 32-32 to the circular plate 20. As will be seen, the ends 32a-32a of the clutch assemblies 30-30 protrude from the circular plate 20 for securing respectively thereto a corresponding plurality of crank arm members 130-130. Stated alternatively, the circular plate members 20 and 22 are aligned on common central axis 1 and the apertures 48-48 of the circular plate member 20 align with and share respective aperture axes (not shown) with the apertures 50-50 of the circular plate 22. As previously mentioned, there are as many apertures 48-48 and apertures 50-50 as there are clutch assemblies 30 utilized. Thus, for the embodiment pictured in FIG. 2 where four clutch assemblies 30-30-30-30 are employed in the transmission 10, four apertures 48-48-48-48 are disposed in the circular plate member 20 along with four of the bearing members 46-46-46-46, and four apertures 50-50-50-50 are disposed in the circular plate 22 along with four of the bearing members 52-52-52-52. Similarly, for the embodiment illustrated in FIG. 11 and as previously mentioned, there are three aperture/bearing combinations 48-48-48/46-46-46 for circular plate 20 and three aperture/bearing combinations 50-50-50/52-52-52 for circular plate 22.

As further previously mentioned and indicated, each clutch assembly 30 (see FIG. 4) has a corresponding crank arm member 130 secured to or bound to a respective end 32a of the central shaft 32 of the indicated clutch assembly 30. Each crank arm member 130 has a structure which generally defines a generally flat, rectangular plate member. The crank arm members 130 are secured to the central shafts 32 of the respective clutch assemblies 30 such that the crank arms 130 are generally normal to the central shafts 32 (i.e. generally axially normal with respect to the axis of the central shafts 32).

Figure 8:
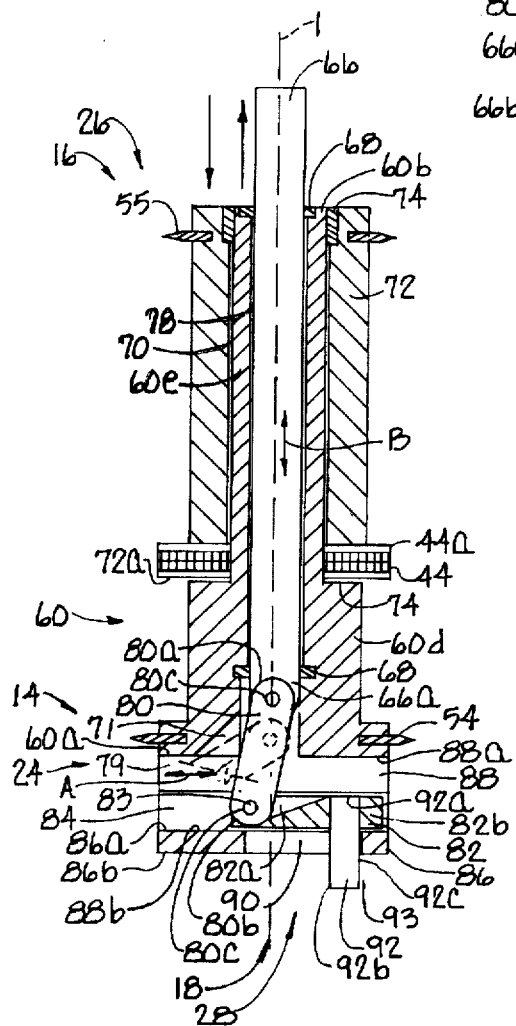
FIG. 8 is a cross sectional view of the input shaft (i.e. input means), the output shaft (i.e. output means) and the regulating assembly (i.e. regulating means) removed from the transmission for illustrating a ratio control rod member, an index plate lever, an index plate member, and a center web shaft member of the regulating assembly.
Figure 9:
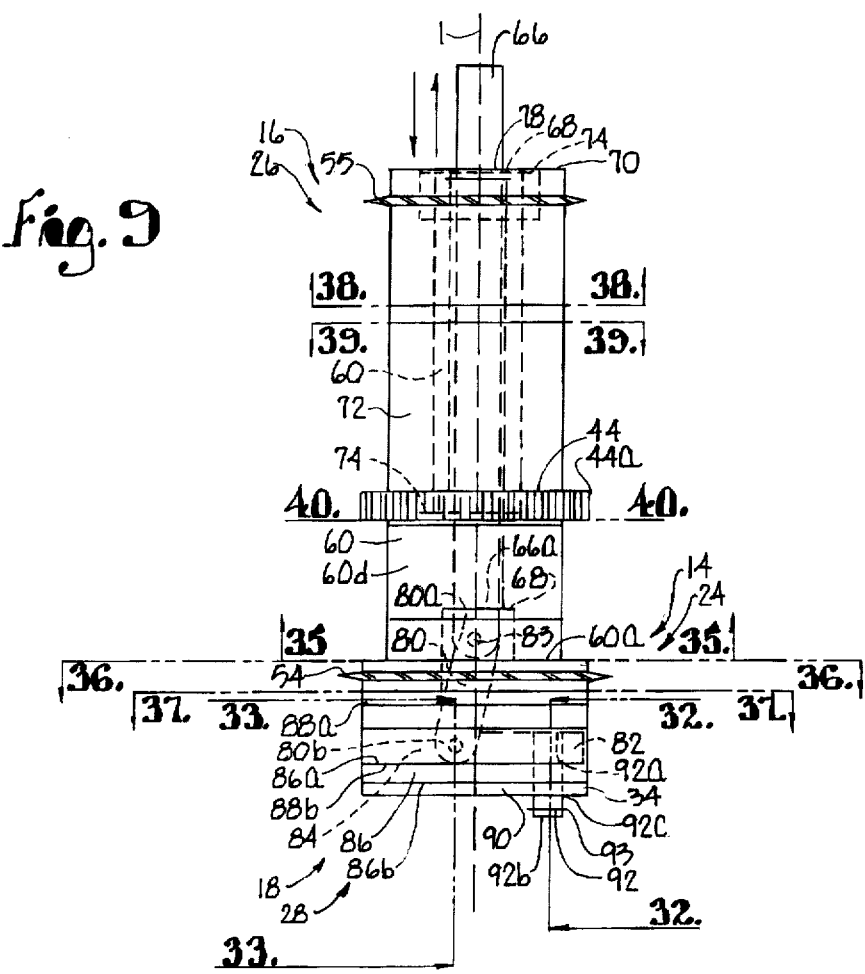
FIG. 9 is a top plan view of the input shaft (i.e. input means), the output shaft (i.e. output means) and the regulating assembly (i.e. regulating means) removed from the transmission for further illustrating the ratio control rod member, the index plate lever, the index plate member, and the center web shaft member (in dashed lines) of the regulating assembly.
Figure 13:
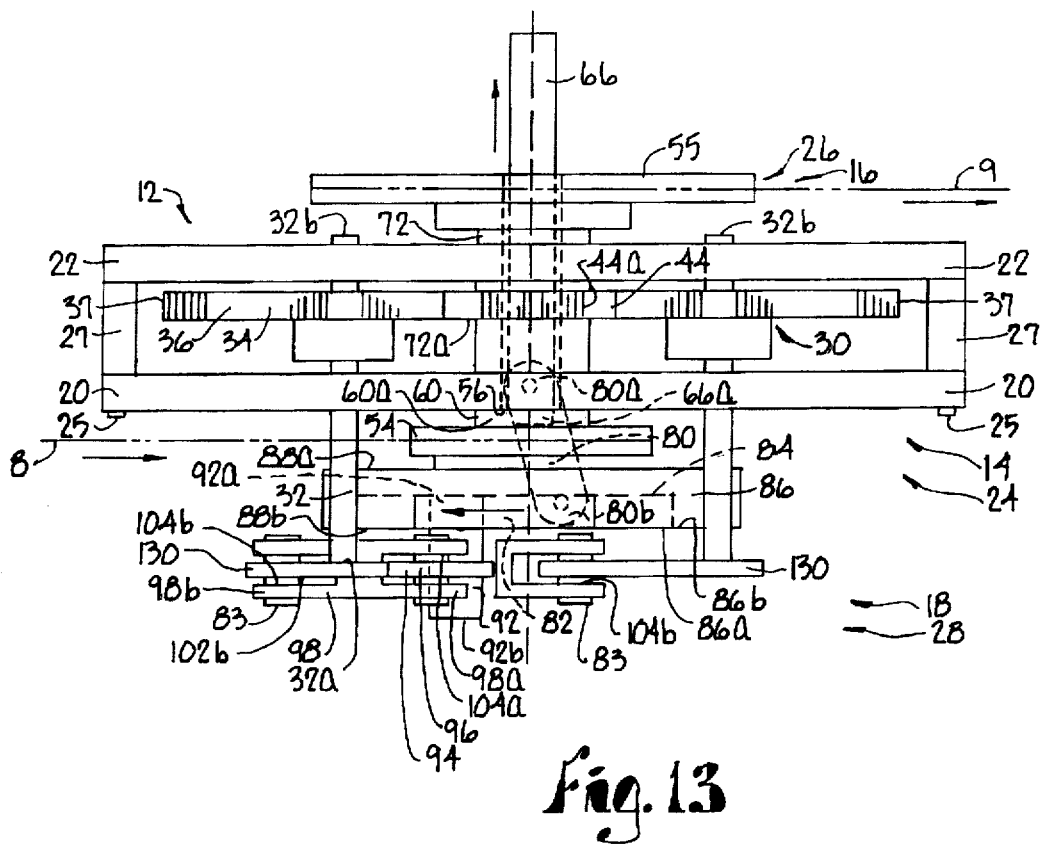
FIG. 13 is a top plan view of the transmission disclosing the ratio control rod of the regulating assembly (i.e. regulating means) substantially extended in direction of the arrow for moving the index plate lever into one extreme position and for correspondingly shifting or moving the index plate member into an extreme offset position or extremity posture.
Figure 14:
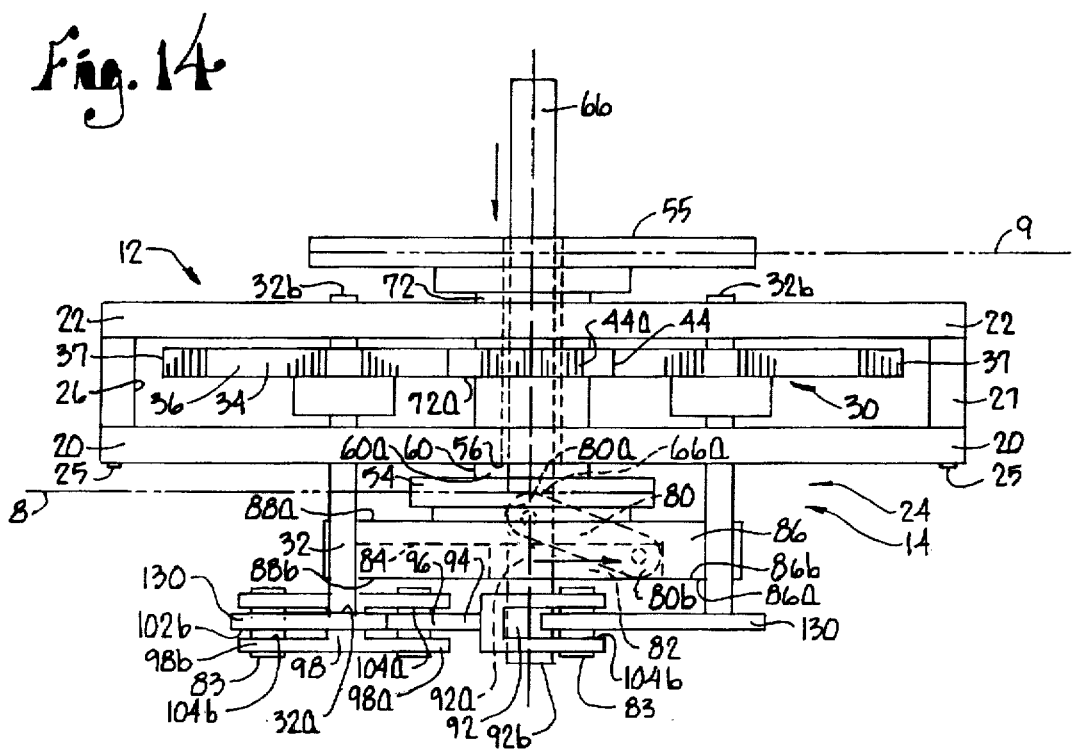
FIG. 14 is a top plan view of the transmission disclosing the ratio control rod of the regulating assembly (i.e. regulating means) substantially retracted in direction of the arrow for moving the index plate lever into another extreme position and for correspondingly shifting or moving the index plate member into another extreme offset position or extremity posture.

An aperture 56 (see FIGS. 4, 13 and 14) is disposed coaxially in circular plate 20 with respect to the central axis 1. The aperture 56 circumscribedly supports a bearing member 58 therein. A cylindrical input shaft 60 (i.e. a larger shoulder portion 60d of the input shaft 60) passes through aperture 56 and engages rotatively bearing member 58 such that the input shaft 60 may rotate freely within aperture 56, as shown in FIG. 4. As shown in FIGS. 8 and 9, the input shaft 60 is defined by the larger shoulder portion 60d and comprises a cylindrical section 60e that is integrally bound to the shoulder portion 60d and is rotatably supported within a generally cylindrical and generally hollow output shaft member 72. The summing gear member 44 connects to the output shaft member 72 such as to rotate therewith. The output sprocket 55 also connects to or is keyed to the output shaft 72 such as to also rotate therewith. The circular plate 22 has an aperture 62 disposed coaxially therein with respect to the central axis 1. The aperture 62 circumscribedly supports a bearing member 64 disposed therein. The cylindrical output shaft member 72 (with the input shaft 60 coaxial therewith) passes through aperture 62 and is rotatively supported by the bearing member 64 which allows the cylindrical output shaft 72 to rotate freely within the circular plate 22.

As indicated in the preceding, the cylindrical output shaft 72 is defined by a generally hollow or tube-like structure with an inside opening or aperture 70 that is generally coaxial with the input shaft 60, especially with the cylindrical section 60a of the input shaft 60. A pair of bearing members 74-74 is disposed on the inside opposite ends of the output shaft 72 (see FIG. 8) to be rotatably supported by the input shaft 60, more specifically to be rotatably supported by the cylindrical shoulder 60e of the input shaft 60 in a spatial relationship. The input shaft 60 has an inner tubular opening or bore or aperture 78 for slidably receiving a ratio control rod member 66 that is coupled to and rotates with the input shaft as will be further explained below. The ratio control rod member 66 is slidably supported by a pair of bearing members 68-68 which are secured inside opposite ends (i.e. ends 60a and 60b) of the input shaft 60 such that the ratio control rod may slidably telescope or move within the input shaft 60 and in a generally spaced relationship thereto. It can be seen from FIG. 4 and FIG. 8 that the output shaft 72 and the input shaft 60 are arranged such that they rotate independently and freely of each other, as they are offset or spaced by the bearing members 74-74.

As previously indicated, the input shaft 60 is coupled to the ratio control rod member 66 and rotates essentially in unison therewith. Thus, the ratio control rod member 66 is arranged to rotate independently and freely of the output shaft 72 while being rotatively and slidably supported by bearings or bushings 68-68 which are respectively disposed in and on the bore or aperture 78 of the input shaft 60. As is further apparent from FIG. 4 and FIG. 8, the output shaft 72 is rotatably engaged to and rotatively supported by bearing 62 of the circular plate 22 on the central axis 1, and the input shaft 60 is rotatively supported by bearing-member 58 on the central axis 1.

Figure 36:
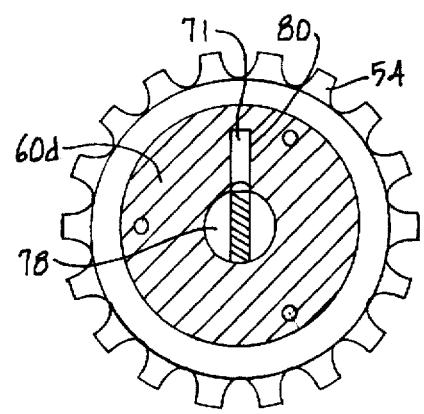
FIG. 36 is a vertical sectional view taken in direction of the arrows and along the plane of line 36—36 in FIG. 9.
Figure 37:
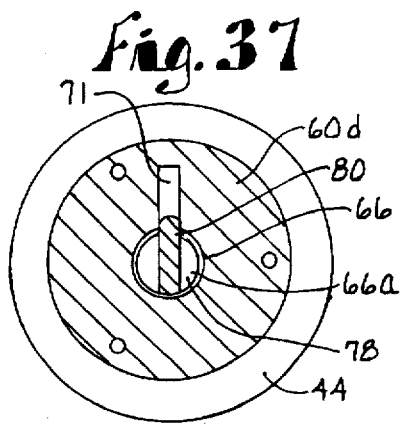
FIG. 37 is a vertical sectional view taken in direction of the arrows and along the plane of line 37—37 in FIG. 9.
Figure 38:
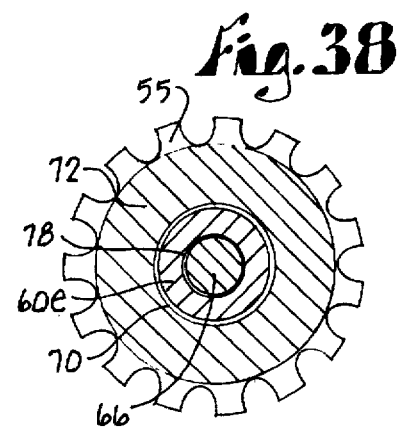
FIG. 38 is a vertical sectional view taken in direction of the arrows and along the plane of line 38—38 in FIG. 9.
Figure 39:
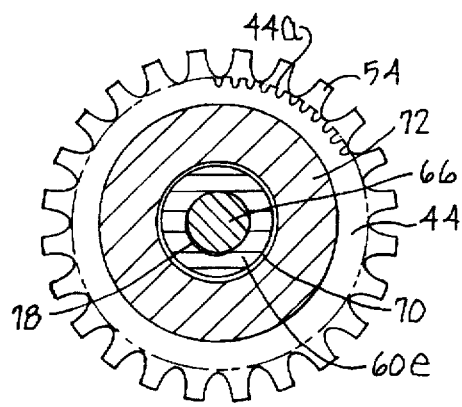
FIG. 39 is a vertical sectional view taken in direction of the arrows and along the plane of line 39—39 in FIG. 9.

Thus, it is evident that the ratio control rod member 66, the aperture 70, the bearing member 68, the output shaft 72, the bearing member 64, and the aperture 62 are all concentrically aligned. As in the case of the output shaft 72, the input shaft 60 comprises a structure that is generally tube-shaped or hollow, to allow the ratio control rod 66 to pass through an inner tubular opening or aperture 78 in the input shaft 60, such that end 66a of the ratio control rod resides therein. Similarly, the output shaft 72, as previously mentioned is generally tubular or hollow such that a portion of the input shaft 60 is supported by the bearings 74-74 (see FIG. 8). The input shaft 60 comprises large shoulder portion 60d and small shoulder portion 60e. As seen in FIGS. 38 and 39, the small shoulder portion 60e is rotatably disposed within the tubular aperture 70 of the output shaft 72 such that the small shoulder portion 60e is supported by the bearing members 74-74 (see FIG. 8). The large shoulder portion 60d of the input shaft 60 is formed with a recess or cutout 71 (see FIGS. 8, 36, and 37) which reciprocatively receives an index plate lever 80 (as indicated in FIG. 8 by arrow A and a dotted line representation of index plate lever 80) when the ratio control rod 66 moves in direction of the arrow B, as also shown in FIG. 8. The large shoulder portion 60d is supported by bearing 58 disposed in aperture 56 of the circular plate 20. Similarly, the ratio control rod 66 is disposed in the tubular opening or aperture 78 of the input shaft 60 such that the ratio control rod 66 is supported by the bearing members 68-68.

The index plate lever 80, as best shown in FIGS. 5–8, has an end 80a that is hingeably or pivotally secured to end 66a of the ratio control rod member 66. Another end 80b of the index plate lever 80 is pivotally secured to an index plate member 82 which forms part of the regulating assembly 28. The index plate member 82 (see FIG. 45) is formed with a recess or cutout 82a, apertures 82c-82c that structurally pass through the index plate member 82 and terminating in the recess or cutout 82a; and an aperture 82b. End 80b of the index plate lever 80 pivotally lodges within the cutout 82a when disposed therein and when pin 83 passes through one of the apertures 82c, through aperture 80c in end 80b of the index plate lever 80, and subsequently through the remaining aperture 82c of the index plate member 82 (see FIG. 4). A center web shaft 92 lodges within aperture 82b and protrudes therefrom to pivotally engage or pivotally couple a center web member (identified as 94 below) as shown in FIGS. 5–8.

The regulating assembly 28 is secured to, coupled to, or engageable to the end 60a of the input shaft 60 (i.e. to sprocket 54 that is bound to or keyed to the end 60a of the input shaft 60) and comprises a block member 88 (preferably generally cylindrical in geometric configuration) having opposed ends 88a-88b (see FIGS. 46–49). End 88a of the block member 88 is secured to end 60a of the input shaft 60. End 88b of the block member 88 connects to an index plate cover (identified as 86 below). The previously mentioned index plate member 82 of the regulating assembly 28 is slidably disposed in a longitudinal index plate channel or guide 84 within the block member 88, such that the index plate member 82 may freely slide therein along a plane that is generally normal to center axis 1 when moved by the index plate lever 80 being pushed or pulled by the ratio control rod 66.

As best shown in FIGS. 46–49, the block member 88 additionally includes an opening 88d which communicates with the channel or guide 84, and with the recess or cut-out 71 and aperture (or bore) 78 of the input shaft 60, such that the index lever 80 is capable of pivotally extending from the end 66a of the ratio control rod 66, through aperture 78 and the recess or cutout 71 (of the input shaft 60) with which it is aligned, and through the opening 88d of the block member 88 to subsequently pivotally engage the index plate member 82 within the block member's 88 associated channel or guide 84. In the view depicted in FIG. 8, the index plate member 82 along with its associated center web shaft member 92 are postured to relay and/or impart a large orbiting or epicyclic movement on or of a center web member (identified as 94 below). The farther that the axis of the center web shaft member 92 is distally displaced or moved away from the center axis 1, the greater is the orbiting or epicyclic movement on or of a center web member (identified as 94 below). Thus, when the axis of the center web shaft member 92 is essentially coaxial with the center axis 1, there is essentially no orbiting or epicyclic movement on or of the center web member (identified as 94 below). The greater the distance is between the axis of the center web shaft member 92 and the center axis 1, the greater is the orbiting or epicyclic movement on or of a center web member (identified as 94 below). Therefore, as the ratio control rod 66 is moved towards the block member 88 (i.e. from right to left with respect to the view in FIG. 8), the index lever 80 begins to move into the aligned recess or cut-out 71 (within the input shaft 60) and towards its dotted line representation in FIG. 8, which concomitantly moves the index plate member 82 axially within the channel or guide 84 and radially with respect to the center axis 1 (i.e. from bottom to top with respect to the view in FIG. 8). As the index plate member 82 moves axially accordingly, a center web member (identified as 94 below and which is rotatably mounted on or to center web shaft 92) also moves axially to decrease a radially off-set position from the center axis 1 and to decrease any orbiting or epicyclic movement on or of the center web member. When rotation is applied to the input shaft 60 and transferred to the block member 88 which is secured to or coupled to the input shaft 60, the radial off-set position translates and/or establishes on the center web shaft member 92 not only rotary power but also an orbiting or epicyclic movement, which orbiting or epicyclic movement is simultaneously relayed and/or imparted to a center web member (identified as 94 below). The center web shaft member 92 (along with its associated index plate member 82) may be moved radially outwardly and away from the center axis 1 by pulling the ratio control rod 66 away from the block member 88 (i.e. from left to right with respect to the illustration in FIG. 8). When the ratio control rod 66 is moved as immediately indicated, the index lever 80 begins to move from its top dotted line representation in FIG. 8 to its center solid line representation also in FIG. 8, which concomitantly moves the index plate member 82 axially within the channel or guide 84 and radially towards the center axis 1. As the index plate member 82 moves radially inward, the center web shaft member 92 also moves radially outwardly. The movement of the center web shaft member 92 (along with its associated index plate member 82) radially outwardly and away from the center axis 1 increases the lateral amount or the radial distance of and/or in the orbit or epicyclic movement of the center web shaft member 92 as the ratio control rod 66 is moved away from the block member 88. It should be understood that throughout the action of and simultaneously with the moving of the ratio control rod 66, the index plate lever 80, the index plate member 82 and its associated center web shaft member 92, all are rotating or revolving along with the cylindrical block member 88. While the present invention is being represented and explained as that by pulling the ratio control rod 66 away from the block member 88 [viz. away from the input shaft 60 or input assembly 24 (i.e. input means 14) and/or away from output shaft 72 or output assembly 26 (i.e. output means 16) and/or away from the support assembly 12], the orbiting or epicyclic movement on or of the center web member (identified as 94 below) is increased; the spirit and scope of the present invention includes the converse. Thus, the spirit and scope of the present invention would include increasing the orbiting or epicyclic movement on or of the center web member (identified as 94 below) by pushing the ratio control rod 66 towards the block member 88 [i.e. towards the input shaft 60 or input assembly 24 (i.e. input means 14) and/or towards output shaft 72 or output assembly 26 (i.e. output means 16) and/or towards the support assembly 12].

An index plate cover 86 is secured to end 88b of the cylindrical block member 88 to retain the index plate member 82, especially when being slidably moved within the channel or guide 84 of the block member 88 and generally normally with respect to not only the center axis 1, but also the input and output shafts 60 and 72 respectively. The index plate member 82 also moves generally parallel to the summing gear member 44 (see FIG. 8). Index plate cover 86 comprises opposed faces 86a-86b, with faces 86a-86b having a common longitudinal or aperture opening 90 disposed therein wherethrough a cylindrical center web shaft member 92 passes to rotatively engage a center web member 94, and such that face 86a is flushed with end 88b of the cylindrical block member 88 when secured thereto. The web member 94 includes a web bore 95 for rotatively receiving the web shaft member 92 such that the web shaft member 92 may rotate within the web bore 95 without rotating the center web member 94 itself. In some instances, it may be preferable to include a sliding counterweight member (not shown) to off-set the mass of the index plate member 82 and/or the center web member 92, for reducing vibration or the like. In utilizing the counterweight member (not shown), a counterweight lever (not shown) is hingeably secured to the ratio control rod member 66 such that the ratio control rod member 66 acts to move the index plate member/index plate lever 82/80 and the counterweight member/ counterweight lever within opposite directions in the channel or guide 84. It should be understood that any suitable counterweighting means may be employed to off-set the off-center revolving mass. Such use is included in the spirit and/or scope of the present invention.

The center web shaft member 92 (see FIGS. 5–7) comprises opposed ends 92a-92b and a center section 92c. End 92a is secured to the index plate member 82 by slidably passing through and/or snugly into an aperture 82b of the index plate member 82 for being affixed therein. A portion of the body section 92c of the center web shaft member 92 protrudes through longitudinal opening 90. A bearing member (not shown in the drawings) may be secured to and/or around the body 92c.

The center web member 94, as previously mentioned, is rotatively coupled to body 92c of the center web shaft member 92 such that the end 92b of the center web shaft member 92 extends slightly beyonda a top face 94a of the center web member 94 to provide room or space for a clip member 93 to be secured thereto to retain the web member 94. A bearing member (not shown in the drawings) may be circumferentially disposed in the web bore 95 to circumscribe the body section 92c of the center web shaft member 92. Center web member 94 further comprises a generally clover-leaf shape having a plurality flange or ear members 96 (see FIGS. 5–7) corresponding to the number of clutch assemblies 30 that are to be employed. A plurality of connecting rod members 98 pivotally connect to the plurality of ear members 96 and extend away or from an outer edge 940 of each ear member 96 while being pivotally coupled to the center web member 94. One ear member 96 corresponds to one clutch assembly 30. Therefore, if four clutch assemblies 30 are employed in a particular embodiment, such as the embodiment shown by FIG. 10, four ear members 96-96-96-96 are formed in the center web member 94 such that the ear members 96 are typically generally equispaced therearound. Likewise, if three clutch assemblies 30 are employed, such as shown in the embodiment of FIG. 11, three ear members 96-96-96 are formed in the web member 94 and generally equispacedly circumferentially surround the central structure of the center web member 94. It should be understood, as previously mentioned, that the number of clutch assemblies 30, the number of ear members 96, and the other associated parts should not serve to limit the spirit and/or scope of the present invention, and that any reasonable number of clutch assemblies 30, ear members 96, and the other associated parts are intended for the invention.

Each ear member 96 has an aperture 94b (see FIGS. 5–7) for hingeably securing thereto a connecting rod member 98. For one embodiment of the connecting rod 98 (see FIG. 4 and FIGS. 43–44), each connecting rod 98 has a substantially longitudinal body 98c with opposed bifurcated ends 98a-98b possessing corresponding respective apertures 100a-100b disposed therein such that the apertures 100a-100b are proximal to the respective ends 98a-98b. For the embodiment shown in FIG. 4 and in FIGS. 42–43, slotted openings 102a-102b are disposed in respective bifurcated ends 98a-98b such that a plane parallel with the slotted openings 102a-102b is perpendicular to an axis of the apertures 100a-100b. The slotted opening 102a, as may be evident, is adapted for slidably receiving therein one of the ear members 96 of the center web member 94 for pivotally connecting the web member 94 to the connecting rod member 98. A screw, pin, or the like 83, slidably passes through one of the apertures 100a, through aperture 94b of ear member 96, and through the other aperture 100a (see FIG. 43) to hold the ear member 96 such that the connecting rod member 98 is pivotally secured to the ear member 96, as well as to the center web member 92.

In another embodiment of the present invention, generally as shown in FIGS. 15–20 and FIGS. 50–54, more particularly in FIGS. 15–17, the connecting rod member 98 comprises a structure defining two opposed plate or shell (or housing) members 106a-106b. The opposed shells (or housings) 106a-106b are situated or postured so as to be longitudinally and slidably engaged to each other, and such that the shells 106a-106b may slidably lengthen or shorten to absorb or in response to force thereon exerted by the center web member 94, as will be further discussed. A cavity 108 is formed within the opposed shells 106a-106b wherein resides a dampening means 110 for retarding, resisting, or absorbing excess sliding motion of the opposed shells 106a-106b generated by or due to force that pulls the center web member 94 away from the crank arms (identified as 130 below) and force exerted by the crank arms (identified as 130 below) which resists the pulling of the center web member 94. The sliding action of the opposed shells 106a-106b serves to dynamically adjust the length of the connecting rod 98 (i.e. the sliding motion or action allows the connecting rod 98 to lengthen) in response to the pulling action of the center web member 94 (shown in FIG. 5) on or against the crank arms (identified as 130 below). Dampening means 110, as best seen in FIG. 15, is preferably a compression or elastic spring member 120 which will respectively compress or extend and subsequently essentially respectively extend or retract to its original position; however, any suitable dampening means 110 (i.e. spring-like member) may be employed in the present invention, such as by way of example only, a hydraulic piston, or any other means suitable for absorbing or retarding sliding motion on the connecting rod 98.

Figure 54:
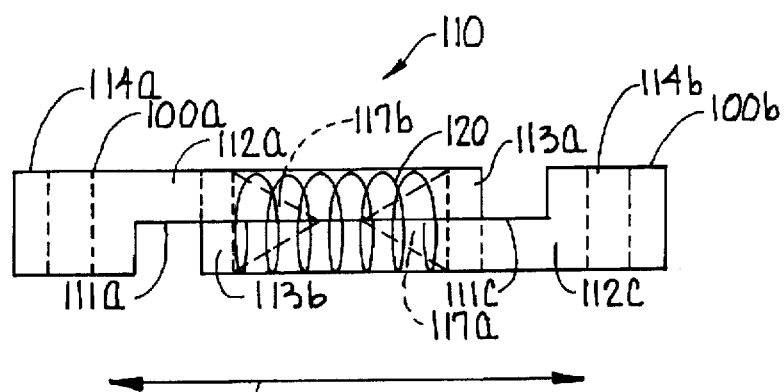
FIG. 54 is a side elevational view of extended shells of the dampened dynamically adjusting connecting rod of the transmission of the present invention and the dampening spring member (i.e. dampening means) in a compressed state with the arrows indicating paths of travel for the shells.

As shown in FIGS. 16–19 and FIGS. 50–54, the opposed shell 106a comprises opposed side walls 112a-112b; likewise the opposed shell 106b comprises opposed side walls 112c-112d. The opposed shell 106a further has an end wall 114a secured to the side walls 112a-112b and a top wall 116a interconnecting the end wall 114a and the side walls 112a-112b. Similarly the opposed shell 106b has a top wall 116b and an end wall 114b secured to the side walls 112c-112d. The end walls 114a and 114b, as best seen in FIG. 15 are generally cylindrical (except where they are secured to the side walls 112a-112b and 112c-112d respectively) and each end wall 114a-114b defines the respective aforementioned apertures 100a-100b and bearings 104a-104b for respectively securing to the center web member 94 and the crank arm (to be identified as 130 below). The side walls 112a-112b of the opposed shell 106a comprise respective top faces 111a-111b and the side walls 112c-112d of the opposed shell 106b comprise top faces 111c-111d. The top faces 111a-111b and 111c-111d of the respective opposed shells 106a-106b respectively are slidably engaged such that the faces 111a and 111c are slidably engaged along a common plane G (see FIG. 16) and faces 111b and 111d are engaged along common plane G. The opposed shells are retained with suitable retaining members (identified as 118) below to prevent the shells 106a-106b from moving in a direction other than parallel and along common plane G (i.e. the shells 106a-106b are held together to prevent the shells 106a-106b from coming apart, while allowing for sliding action as shown in FIG. 54). The opposed shell 106a further comprises an end or edge wall 113a secured to the side walls 112a-112b and the top wall 116a. The edge wall 113a has a lip member 117a (preferably conically shaped geometrically) which protrudes beyond faces 111a-111b such that the lip 117a extends into a cavity 108b defined between the side walls 112c-112d of the opposed shell 106b. Similarly, the opposed shell 106b further comprises an end or edge wall 113b secured to the side walls 112c-112d and the top wall 116b. The edge wall 113b has a lip member 117b (preferably conically shaped geometrically) which protrudes beyond faces 111c-111d such that the lip 117b extends into a cavity 108a defined between the side walls 112a-112b of the opposed shell 106a. The lip members 117a-117b are for retaining opposed ends of the spring member 120, as shown in FIG. 19.

As seen in FIG. 54, when the spring member 120 is disposed generally helically engageable on and between the lip members 117a-117b and the lip members 117a-117b are moved towards each other (i.e. end wall 114a of the opposed shell 106a is pulled away from the end wall 114b of the opposed shell 106b to cause the shells 106a-106b to slidably pull apart and lengthen), the spring member 120 compresses and generates a spring bias action potential which is exerted against the lip members 117a-117b to force the lip members 117a-117b apart as soon as the force moving the lips 117a-117b together is removed (i.e. the force pulling on the end wall 114a (e.g. center web member 94) is stopped and/or the force is equalized by moving the end wall 114b in the same direction as the pull on end wall 114a). The end walls 114a and 114b of the respective opposed shells 106a and 106b, in the embodiment shown in FIGS. 15–20, may define a structure that is generally cylindrical or circular or arcuate in horizontal cross-section, as previously indicated. Although this is the preferred embodiment, it is understood that the shape of the end walls 114a-114b, or any of the other parts of the dampened connecting rod 98 should not limit the spirit or scope of the present invention, and that any connecting rod 98 that is capable of longitudinally extending against a bias and retracting is intended. The apertures 100a and 100b are disposed in the respective end walls 114a and 114b for slidably receiving a retaining member (not shown, e.g. bolt, pin, screw, or the like) to secure the connecting rod 98 to the transmission. Accordingly, corresponding bearing members 104a-104b are disposed in the respective apertures 100a-100b such that the connecting rod 98 may rotate freely about the retaining members (not shown) such that the connecting rod 98 is rotatably disposed relative to the retaining members (not shown, i.e. bolt, screw, pin, etc), as previously indicated.

The cavities 108a-108b are formed between the opposed side walls 112ab-112cd and are arranged so as to have the cavities 108a-108b opposed to each other and such that the cavities 108a-108b may form one contiguous or uniform space or cavity 108. The securing means 118 for coupling opposed shells 106a-106b such that the respective faces 111a-111c and 111b-111d may longitudinally slide along common plane G may be any suitable means such as by way of example only, a screw member 118a threadably engaged to one of the shells 106a and slidably coupled to the other shell 106b, or a generally C-shaped bracket member (not shown) encircling the outer portion of the shells 106a-106b, or any other suitable means for coupling the shells 106a-106b.

Figure 50:
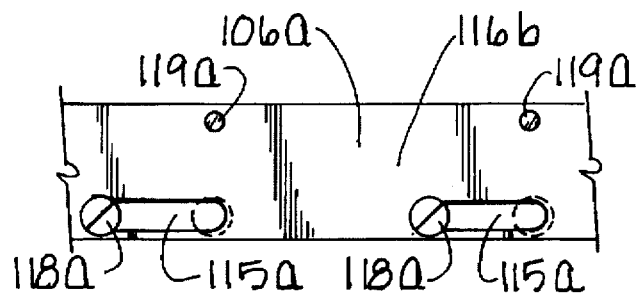
FIG. 50 is a partial top plan view of one of the shells of the dampened dynamically adjusting connecting rods of the transmission of the present invention.
Figure 51:
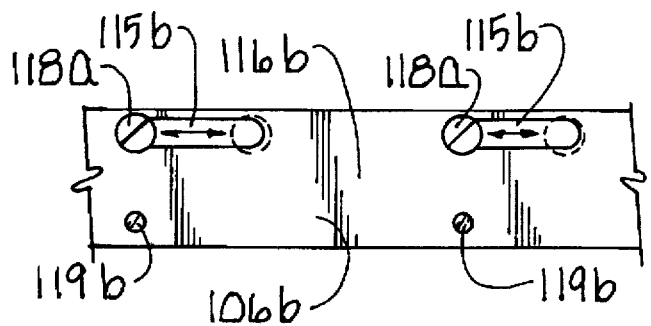
FIG. 51 is a partial top plan view of another of the shells of the dampened dynamically adjusting connecting rods of the transmission of the present invention with the arrows indicating direction of travel of screw members in longitudinal channels.
Figure 52:
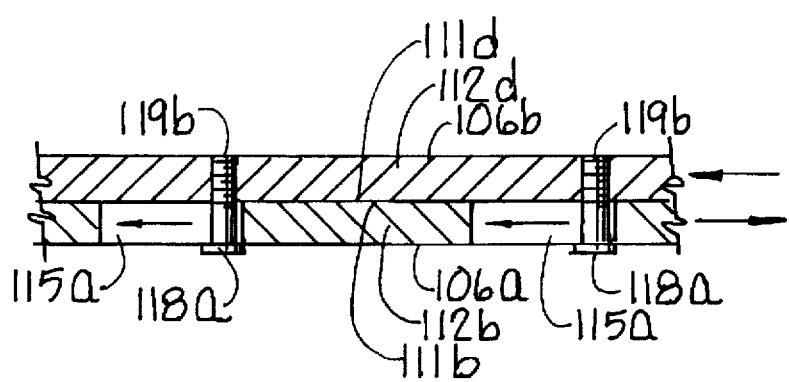
FIG. 52 is a partial cross sectional view of the opposed shells of the dampened dynamically adjusting connecting rods of the transmission of the present invention disclosing the longitudinal channels and the screw members disposed therein and with arrows indicating direction of travel of the screw members within the longitudinal channels.
Figure 53:
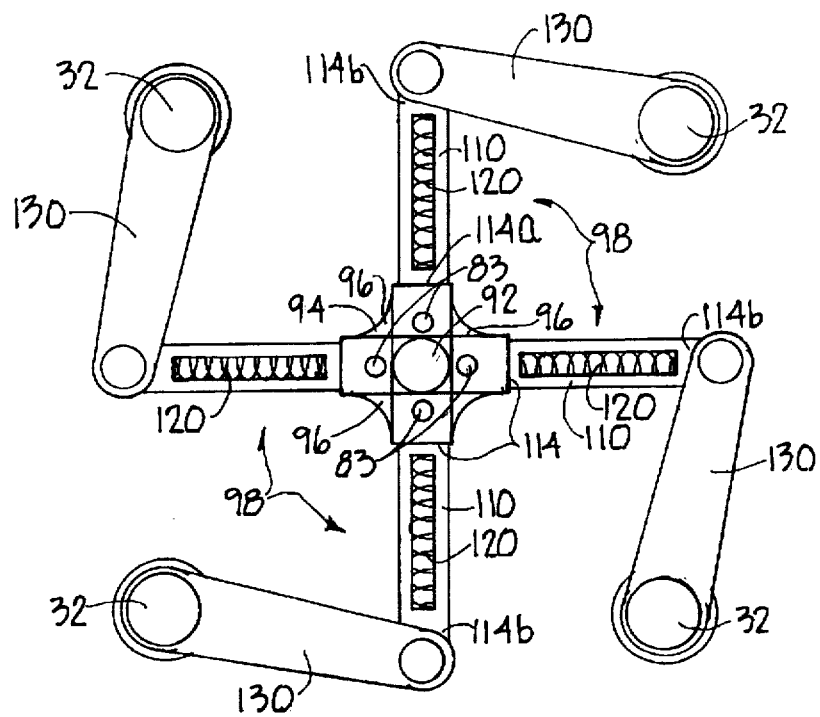
FIG. 53 is a front elevational view of four of the dampened dynamically adjusting connecting rods of the transmission of the present invention being coupled to four crank arms of four clutch assemblies and four ears of the center web member.

Preferably, as shown in FIGS. 50 and 51, the opposed shells 106a-106b each comprise a respective longitudinal opening or apertures 115a-115b for receiving a screw member 118a such that the screw member 118a may pass through and slidably engage the longitudinal apertures 115a-115b, and threadably engage opposed apertures 119b-199a. More specifically, as shown in FIG. 52, the screw member(s) 118a passes through the longitudinal opening(s) 115a of the opposed shell 106a and threadably engages aperture 119b which is disposed in the opposed shell 106b such that the aperture 119b is generally aligned with the longitudinal aperture 115a. The screw member 118a is threadably engaged to the aperture 119b such that the head of the screw member 118a flanges over longitudinal opening 115a to be slidably longitudinally retained by the longitudinal opening 115a and such that a structural portion (see FIGS. 51 and 52) of the screw member 118a may move longitudinally within the longitudinal opening 115a (see arrows in FIG. 51). Similarly, though not shown in FIG. 52, another screw member(s) 118a may passes through the longitudinal opening(s) 115b of the opposed shell 106b and threadably engages aperture 119a which is disposed in the opposed shell 106a such that the aperture 119a is generally aligned with the longitudinal aperture 115b. The screw member 118a is threadably engaged to the aperture 119a such that the head of the screw member 118a flanges over longitudinal opening 115b to be slidably longitudinally retained by the longitudinal opening 115b and such that a structural portion of the screw member 118a may move longitudinally within the longitudinal opening 115b. Thus the opposed shells 106a-106b are coupled such that the shells 106a-106b may lengthen or shorten as indicated of the arrow H in FIG. 54, and such that respective ends 114a-114b thereof may move apart or together relative to each other.

The sliding action of the opposed shells 106a-106b is one of the salient features of the present invention. As previously indicated, the revolving motion generated by the center web member 94 (see FIG. 4) generates reciprocating motion on the connecting rods 98 which is relayed to the crank arms (identified as 130 below) for producing rotary output on the gear rings 34. In the case there is resistance (i.e. a load) applied to the output shaft 72 (i.e. the output assembly 26), feedback is relayed through the summing gear 44 onto the gear rings 34, the central shafts 32 and to the crank arms (identified as 130 below). This feedback or resistance opposes or resists the pulling action of the connecting rod 98 on the associated crank arm (identified as 130 below). The connecting rod 98 described above therefore lengthens against the bias of dampening means 110 (i.e. spring 120) to absorb some of the resistance (i.e. the load) manifested on output shaft 72 (i.e. the output assembly 26). The connecting rod 98 lengthens until it reaches an excursion length (i.e. the general maximum length the connecting rod 98 may attain (e.g. screw member 118a (see FIG. 52) "bottoms out" or engages the side of the longitudinal aperture 115a or 115b, or spring member 120 becomes fully compressed (see FIG. 54))) at which time the connecting rod 98 pulls on the crank arm (identified as 130 below) to produce the power stroke (see FIG. 25) on the crank arm. As soon as the pulling force by the center web member 94 and/or the resistance force relayed through the output assembly 26 is reduced, the connecting rod 98 shortens as the dampening means 110 (i.e. spring 120) expands to return to a resting or minimal bias position.

As previously indicated, bearing members 104a-104b may be employed (see FIG. 15). The bearing members 104a-104b are disposed in the apertures 100a-100b of the respective shells 106a-106b, as previously mentioned, through which a retaining member (not shown, i.e. pin, bolt, or screw) passes to pivotally hold the connecting rod member 98 to the clutch arm (identified as 130 below) and the corresponding ear member 94 of the center web member 94 (see FIG. 53). The dampening means 110 may equally well comprise a hydraulic piston member (not shown) having ends thereof engaged to or coupled to the ends 113a-113b for regulating the connecting rod 98. The length of the connecting rod 98, in the case of the actively adjusted hydraulic piston member (not shown) is regulated by adjusting a quantity of hydraulic fluid contained in the hydraulic piston member (not shown) to dynamically adjust the length of the connecting rod 98 based on the load requirements on the transmission 10 at any moment. The hydraulic piston member (not shown) may be passively adjusted by being responsive to the action of the connecting rod 98, or actively adjusted by acting upon the connecting rod 98 to adjust the length of same by regulating an amount of hydraulic fluid. Opposed to such active adjustment of the connecting rod 98, the spring member 120 passively adjusts the length of the connecting rod 98 based on feedback through the clutch assembly 30. As previously mentioned, the adjustment of the length of the connecting rod 98 during operation is one of the salient features of the present invention, as the adjustment of the connecting rod 98 is made to essentially eliminate sinusoidal output characteristics typical of the transmission 10 when rigid or fixed connecting rods 98 are employed. It is understood that the dampening means 110 may be any suitable means to regulate the length of the connecting rod 98, and various means utilized are included in the spirit and/or scope of the invention.

Figure 10:
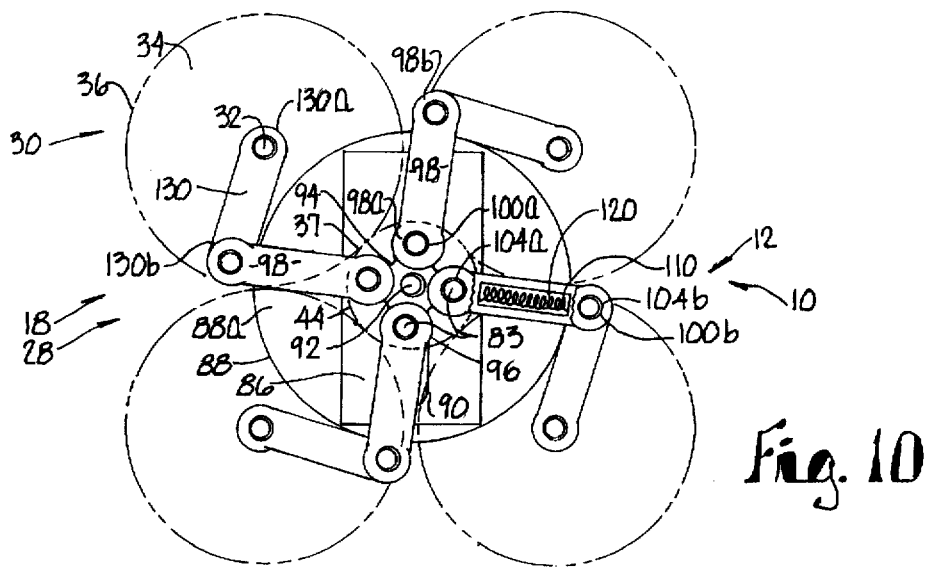
FIG. 10 is a front elevational view of the embodiment of the transmission of FIG. 1 disclosing a plurality of overrunning clutch assemblies including crank arms secured thereto and coupled to a center web member by dampened dynamically adjusting connecting rods for dynamically adjusting and simultaneously relaying input to the plurality of clutch assemblies, with one connecting rod having a top removed and disclosing a dampening means.

As previously mentioned, the clutch assemblies 30-30-30-30 have corresponding crank arm members 130-130-130-130 secured to respective ends 32a-32a-32a-32a, as shown in FIG. 2 and FIG. 10, such that the crank arm member 130 is secured to ends 32a-32a-32a-32a of the central shafts 32-32-32-32 and normal thereto. Each crank arm 130 comprises opposed ends 130a and 130b thereof such that end 130a is secured to end 32a of the central shaft 32 and end 130b is secured to the respective connecting rod members 98-98-98-98. As repeatedly mentioned previously, there are as many crank arm members 130-130-130-130 as there are clutch assemblies 30-30-30-30 and connecting rods 98-98-98-98. Each crank arm member 130 has reciprocating motion applied by the action of the connecting rod 98 pivotally coupled to same to cause the central shaft 32 of the clutch assembly 30 to reciprocatively rotate. As previously discussed, the reciprocal motion of the central shaft 32 relative to the gear ring 34 causes the gear ring 34 to move in one direction only. The reciprocating motion of the crank arm member 130 is generated by the planetary motion supplied to the connecting rod 98 as end 98a thereof is caused to reciprocate by the planetary motion of the center web 94, which will be further described in the following.

Any suitable method of coupling the connecting rods 98 (see FIG. 1) to the crank arms 130 and the center web 94 may be employed, such as couplings, bolts, pins, and the like or any other well known devices in the art. For example, a preferred method of coupling (see FIG. 43) the crank arms 130 to the connecting rods 98-98 is to secure connecting pin members 83 to the respective ends 130b of the crank arms 130 such that the pins 83 are typically normal to the crank arms 130. The pins 83 are in turn disposed in and secured to the respective bearings or bushings 104b (see FIG. 1) of the connecting rods 98 to rotatively couple the pins 83 to the connecting rods 98. It is understood however that the connecting rods 98 may be connected to the crank arms 130 by any suitable means.

The connecting rod 98, as shown in FIG. 1, may be coupled to the center web member 94 in a similar fashion. Another pin member 83 is secured to the ear 96 of the center web member 94 (see FIG. 43) which corresponds to the connecting rod 98 such that the pin 83 is normal to the ear member 96. The pin 83 is then disposed in and secured to bearing 104a of the connecting rod 98 to rotatively couple the pin 83 and the ear 96 of the center web member 94 to which it is secured to the connecting rod 98. Of course, as shown in FIG. 2, there is a corresponding pin 83-83-83-83 for each connecting rod 98-98-98-98 and ear 96-96-96-96 combination and pins 83-83-83-83 for each connecting rod 98-98-98-98 and crank arm 130-130-130-130 combination.

Figure 9A:
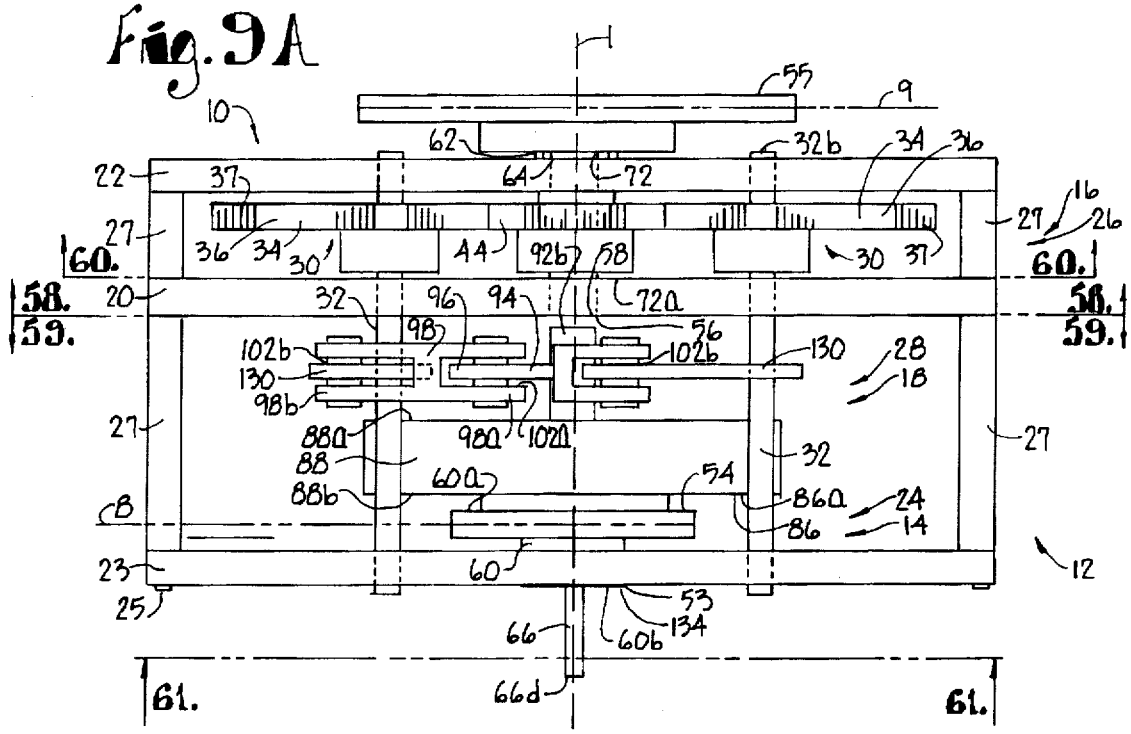
FIG. 9A is a top plan view of another embodiment of the transmission of the present invention with the regulating assembly (i.e. regulating means) having a plurality of overrunning clutch assemblies mounted between a pair of plate members, which form a portion of the chassis or support assembly, and including a regulating assembly situated such that the clutch assemblies face the input shaft and further including crank shafts with crank shaft ends which are reciprocatively supported on opposed ends (i.e. on a first and on a second portion) of the chassis or support assembly.
Figure 21:
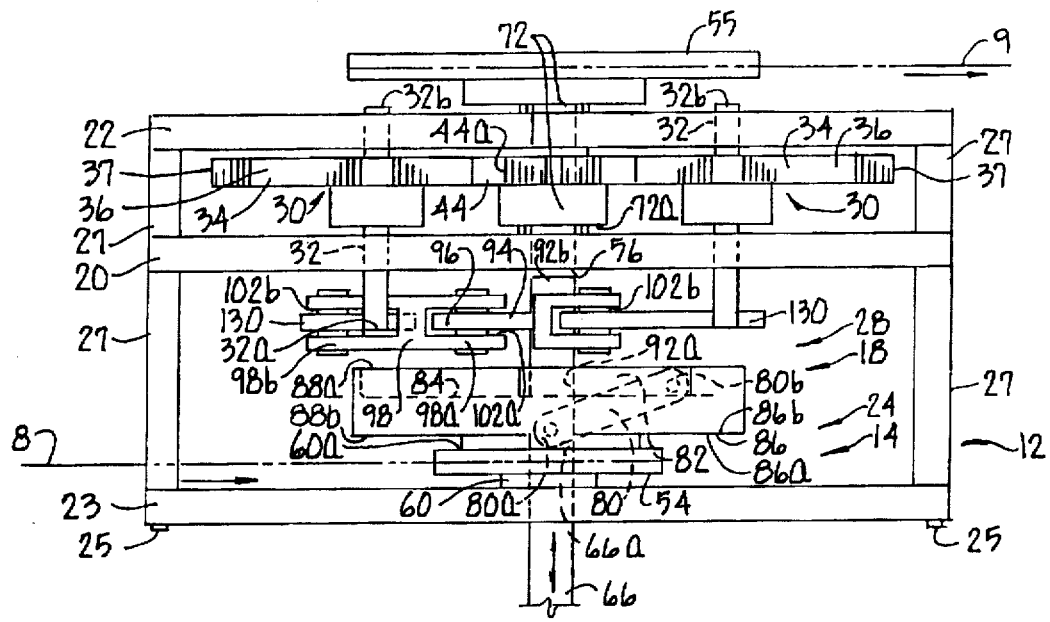
FIG. 21 is a top plan view of yet another embodiment of the transmission of the present invention with the regulating assembly (i.e. regulating means) having a plurality of overrunning clutch assemblies mounted between a pair of plate members, which form a portion of the chassis or support assembly, and having the regulating assembly situated such that the clutch assemblies face the input shaft.

It may be further appreciated that the transmission 10 may be assembled in a variety of manners. In an alternative embodiment, as shown in FIGS. 9A and 21, the transmission 10 comprises the circular plate members 20-22 and a third circular plate member 23. In this embodiment, the output assembly 26 (i.e. output means 16) including the clutch assemblies 30-30, is interposed between the circular plate members 20-22. The clutch shafts 32-32 of the clutch assemblies 30-30 are rotatably supported (i.e. coupled to bearings (not shown) which are disposed in apertures (not shown) in the circular plate members 20-22) by the circular plate members 20-22. In the embodiment of FIG. 9A, the clutch shafts 32 are also rotatably supported by the third plate member 23. Similarly, the output shaft 72 is rotatably supported (i.e. coupled to bearings (not shown) which are disposed in apertures (not shown) in the circular plate members 20-22) by circular plates 20-22. Circular plate 23, as shown in FIG. 21, similarly rotatably supports (i.e. coupled to a bearing (not shown) disposed in an aperture (not shown) for supporting input shaft 60) the input assembly 24 (i.e. input means 14). The regulating assembly 28 (i.e. regulating means 18) is coupled to the input assembly 24 (i.e input means 14) and the output assembly 26 (i.e. output means 16) such that the regulating assembly 28 (i.e regulating means 18) is indirectly supported by the circular plate 23 and the circular plate 20. As is evident from FIGS. 9A and 21, the input assembly 24 and the regulating assembly 28 are interposed between the circular plate 20 and the circular plate 23. The ratio control rod 66, as indicated in the previous embodiments, is slidably supported within the input shaft 60 and, in the instant embodiments of FIGS. 9A and 21, protrudes through an aperture 134 disposed in the circular plate 23 such that the aperture 134 is concentric with the central axis 1. It is understood that the transmission 10 is functionally similar to the previous embodiments. Particularly different in this embodiment however, is that the input shaft 60 does not partially reside within the output shaft 72 as in the embodiment in FIG. 1 and FIG. 4. More specifically, as shown in FIGS. 9A and 21, the input shaft 60 is solely rotatably supported by the third plate member 23. The third plate member 23 is provided with an opening wherethrough the ratio control rod 66 passes into the input shaft 60 to perform the same function as previously mentioned. The output shaft 72 is rotatably supported by plate members 22 and 20. The remaining elements (clutch assemblies 30, summing gear member 44, etc.) are all interengaged as shown in FIGS. 9A and 21. Such an alternative embodiment, such as that shown by FIGS. 9A and 21, is illustrative of one of the variety of manners for assembling the instant invention; accordingly, it is understood that a variety of assembled manifestations are intended and that departure from the particular assembled manifestations shown in the drawings are to be within the spirit and/or scope of the invention.

Figure 55:
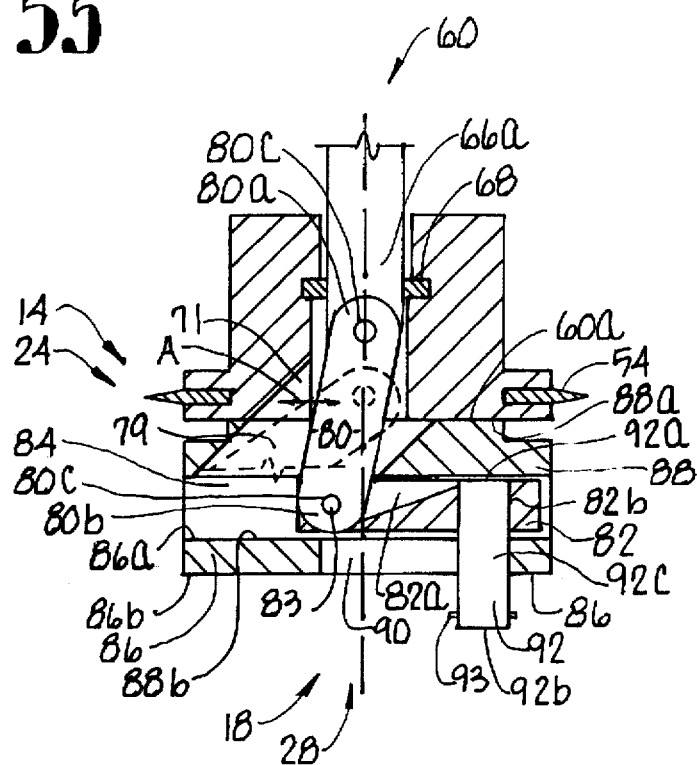
FIG. 55 is a partial cross sectional view of the input shaft (i.e. input means) and the regulating assembly (i.e. regulating means) removed from the transmission depicted in FIG. 9A for illustrating the ratio control rod member, the index plate lever, the index plate member, and the center web shaft member of the regulating assembly.
Figure 56:
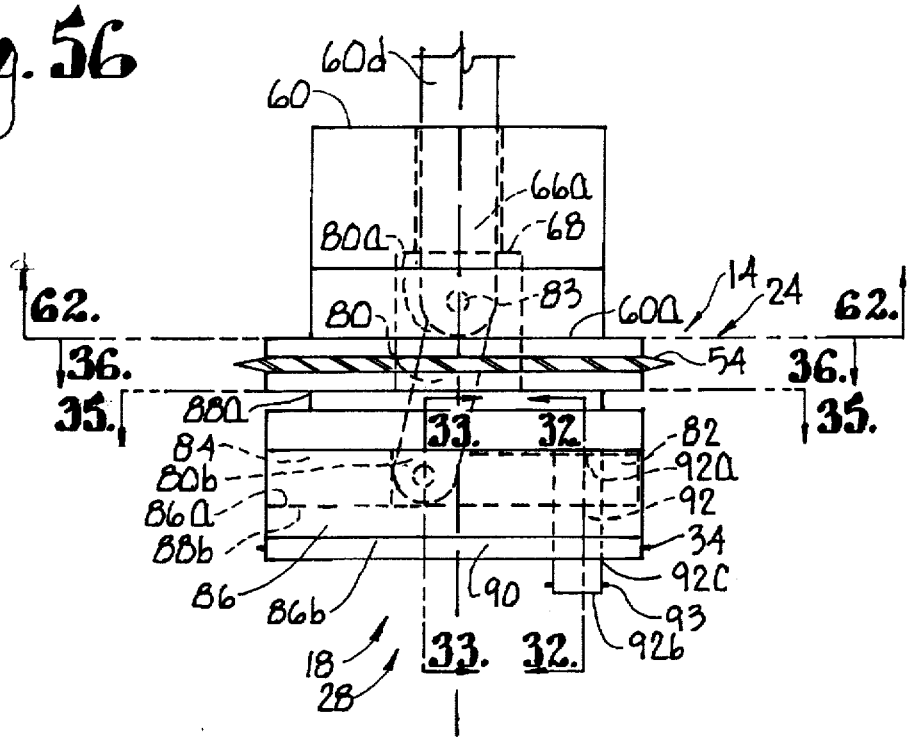
FIG. 56 is a partial top plan view of the input shaft (i.e. input means) and the regulating assembly (i.e. regulating means) removed from the transmission depicted in FIG. 9A for further illustrating the ratio control rod member, the index plate lever, the index plate member, and the center web shaft member (in dashed lines) of the regulating assembly.
Figure 57:
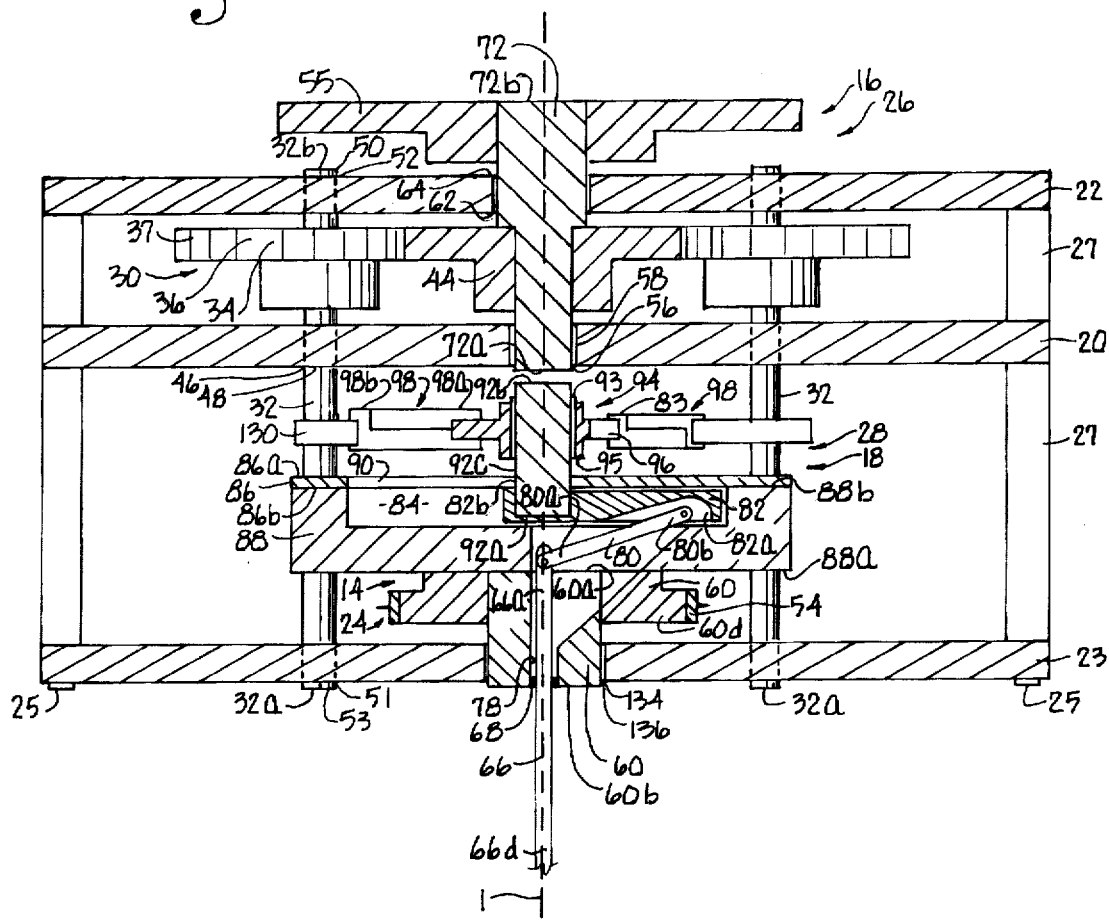
FIG. 57 is a cross sectional view of the transmission of FIG. 9A with the index plate member in a position corresponding to a substantially neutral or resting position (i.e. a central or centered position)
Figure 51A:
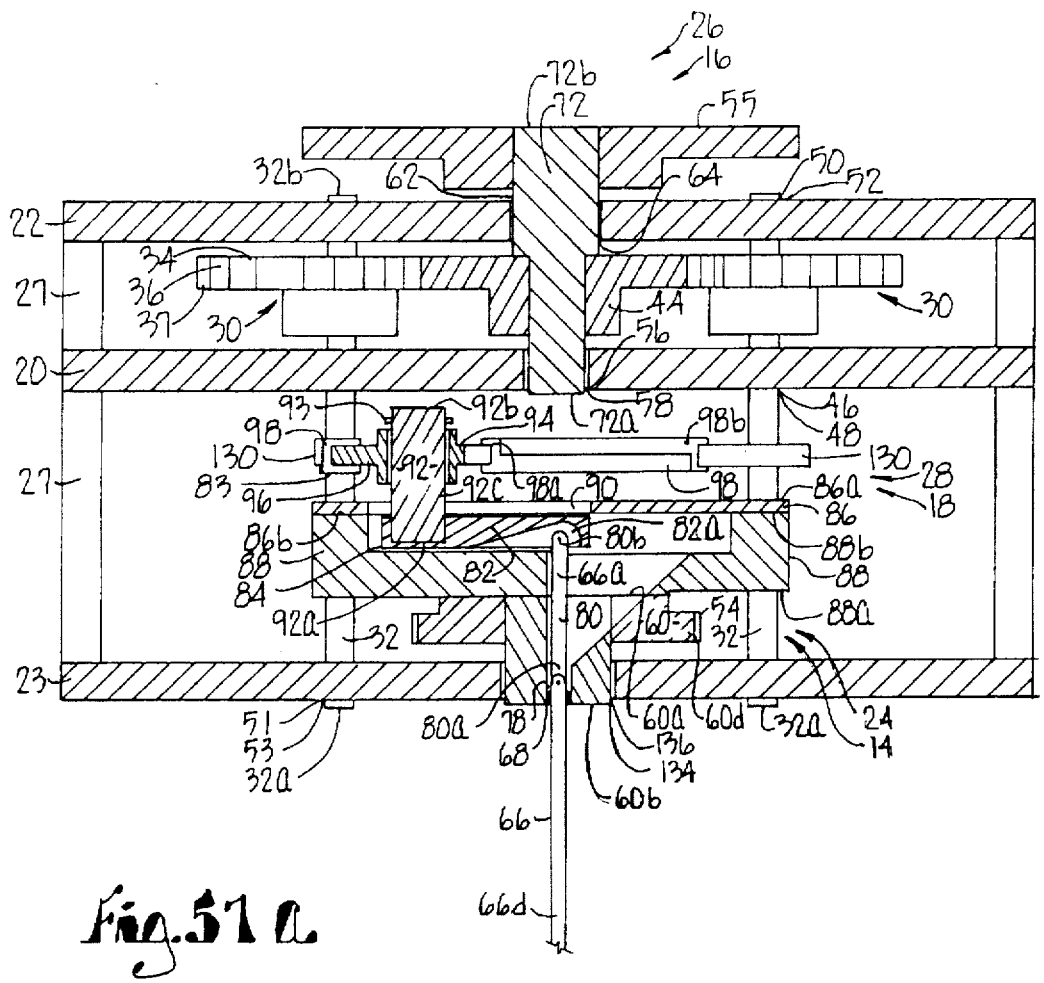
Figure 58:
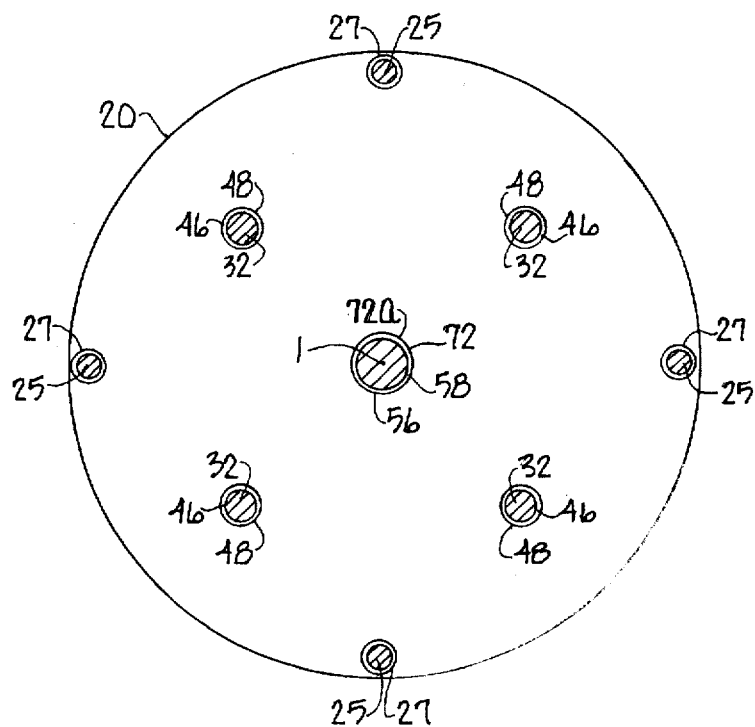
FIG. 58 is a vertical sectional view taken in direction of the arrows and along the plane of line 58—58 in FIG. 9A.
Figure 59:
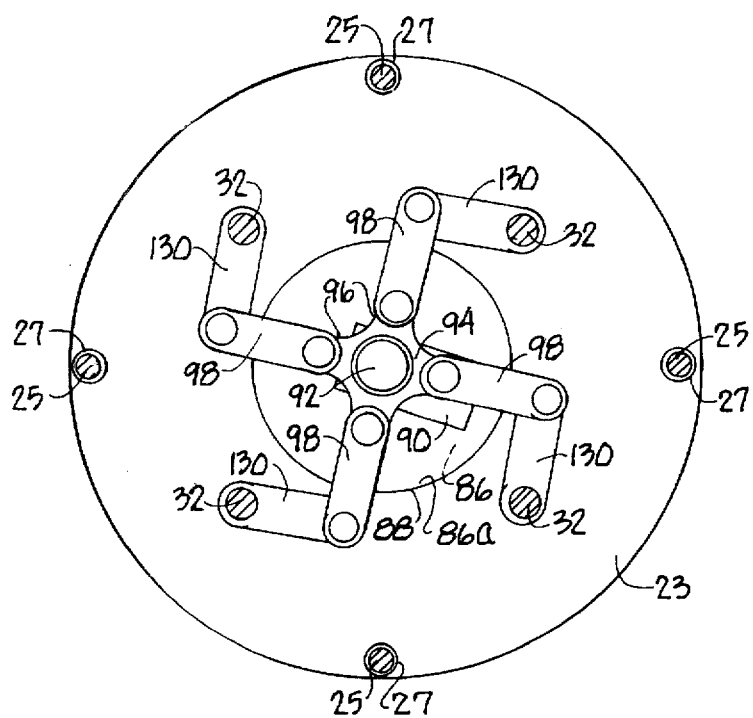
FIG. 59 is a vertical sectional view taken in direction of the arrows and along the plane of line 59—59 in FIG. 9A.
Figure 60:
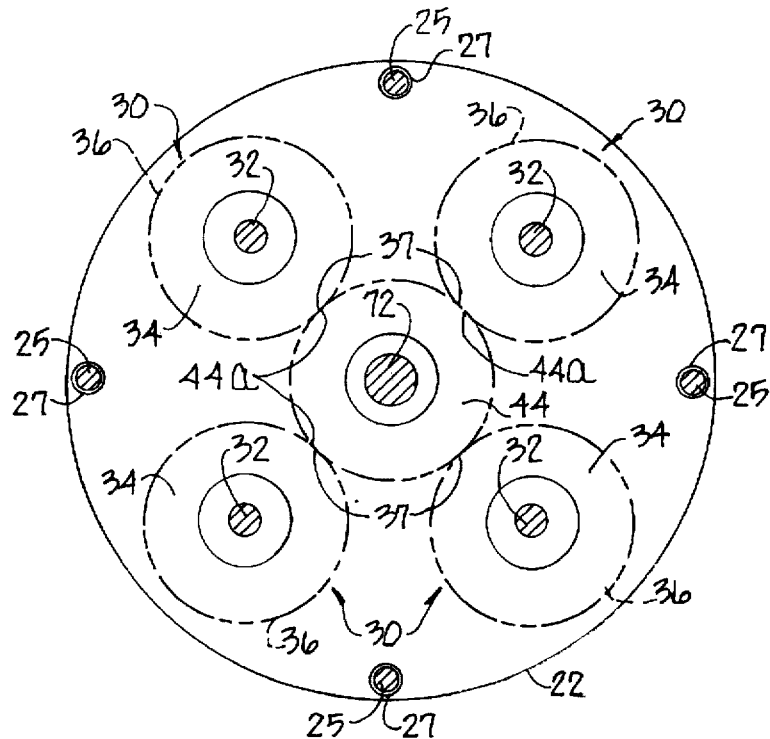
FIG. 60 is a vertical sectional view taken in direction of the arrows and along the plane of line 60—60 in FIG. 9A.
Figure 61:
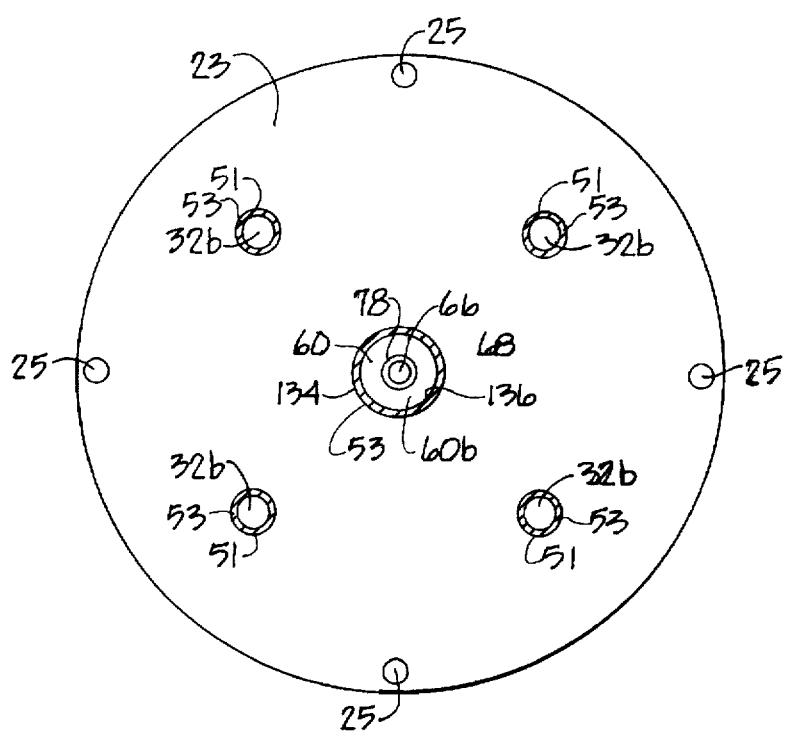
FIG. 61 is a vertical sectional view taken in direction of the arrows and along the plane of line 61—61 in FIG. 9A.

As previously indicated, the transmission 10 may be assembled in a variety of fashions, such as shown in FIG. 9A wherein three circular plates 22, 20, and 23 (in the order stated) are employed with circular plate 20 being a mid plate and opposed by circular plates 22 and 23. It is appreciated that for the embodiment in FIG. 9A, the position of the regulating assembly 28 and the ratio control rod 66 relative to within the transmission 10 are interchanged such that the connecting rod members 98, the crank arm members 130, the cylindrical block member 88, the index plate member 82, the center web shaft 92, and the center web member 94 are all housed or situated between the circular plates 20-23. It is preferable to rotatably support the central shafts 32 of the clutch assemblies 30 with the circular plates 20, 22 and 23 as much less play or lateral movement of the clutch assemblies 30 is exhibited. Further, the ratio control rod 66 is located in a position which is more suitable for operation of the transmission 10. As best shown in FIG. 57, in this embodiment of the transmission 10 of the present invention, the input assembly 24 is generally supported by the circular plate member 23, with the ratio control rod 66 passing through the center of the input assembly 24 to be rotatably supported by a bushing or bearing 68 conveniently situated therein, such that an exterior end 66d protrudes through the circular plate 23 for facilitating adjustment of the ratio of the transmission 10 with the ratio control rod. As best shown in FIG. 58, each of the central shafts 32 of the clutch assemblies 30 pass through the corresponding apertures 48 and are engaged by the respective bearing members 46 disposed in the apertures 48 for allowing the central shafts 32 of the clutch assemblies 30 to be reciprocatively and/or rotatively supported by the circular plate member 20 and to rotate and/or reciprocate freely within the respective apertures 48. As can be seen in FIG. 57 and 58, the central shafts 32 of the respective clutch assemblies 30 are therefore preferably radially disposed around the central axis 1 of the transmission 10 and are rotatably and reciprocatively supported by the respective bearing members 46-46 disposed in and supported by the circular plate member 20. Each of the central shafts 32 of the clutch assemblies 30 comprise opposed ends 32a and 32b, with the ends 32b passing through the apertures 48 of the circular plate member 20 such that the ends 32a protrude and extend away from the circular plate 20. The ends 32a of the central shafts 32 pass through the third circular plate 23, as will be discussed presently. The ends 32b of the central shafts 32 are received by corresponding apertures 50 which are disposed in the circular plate member 22 and rotatively engage respective corresponding bearing members 52 for allowing central shafts 32 of the clutch assemblies 30 to be supported by and reciprocatively coupled to the circular plate 22 and to rotate and/or reciprocate freely within the aperture 50. Obviously, the circular plate member 22 has a number of apertures 50 which corresponds to the number of apertures 48 disposed in the circular plate 20. The apertures 50 are also disposed radially from the central axis 1 in the circular plate member 22 and preferably essentially equally spaced, both radially and circumferentially. The circular plate 23 further still has a number of apertures 51 (see FIG. 61) which corresponds to the number of apertures 48 disposed in the circular plate 20. The apertures 51 are also disposed radially from the central axis 1 in the circular plate member 22 and preferably essentially equally spaced, both radially and circumferentially. A corresponding number of bearing members 53 are disposed in the apertures 51 of the circular plate 23 such that one aperture 51 has one bearing 53 received therein for rotatably supporting ends 32b of the respective central shafts 32 of the clutch assemblies 30. Similarly, the three circular plates 20, 22, and 23 all have respective aperture/bearing combinations for rotatably supporting the input shaft 60 and/or the output shaft 72. More specifically, aperture 134 (see FIGS. 9 and 57) is disposed coaxially in circular plate 23 with respect to the central axis 1. The aperture 134 circumscribedly supports a bearing member 136 therein. The cylindrical input shaft 60, in the instant embodiment of FIGS. 9 and 57, passes through aperture 134 and rotatively engages bearing member 136 such that the input shaft 60 may rotate freely within aperture 134, as shown in FIG. 57. As shown in FIGS. 55 and 56, the input shaft 60 in this embodiment does not have the larger shoulder portion 60d, as shown in the previous embodiment in FIGS. 8 and 9 for being supported by the output shaft 72, but rather has the input sprocket or gear member 54 formed thereof and terminates in the cylindrical block member 88 such that the input shaft 60 is directly and rotatively supported by the circular plate 23 (see FIG. 57). In this embodiment, the output shaft 72 is not generally hollow for supporting the input shaft 60. In the instant embodiment, the generally cylindrical output shaft 72 is rotatably supported by circular plates 20-22. More specifically, the cylindrical output shaft 72 passes through apertures 56-62 of the respective circular plates 20-22 and rotatively engages respective bearing members 58-64 which are circumscribedly secured therein such that the output shaft 72 may rotate freely within the apertures 56-62, as shown in FIGS. 9 and 57. The summing gear member 44 connects to the output shaft member 72 such as to rotate therewith and the output sprocket 55 also connects to or is keyed to the output shaft 72 such as to also rotate therewith, as shown in FIG. 57. The summing gear 44, as in the previous embodiments, is centrally located between all of the clutch assemblies 30 employed, as shown in FIGS. 57 and 60 (e.g. four clutch assemblies 30 in the particular manifestation of the embodiment depicted in FIGS. 57 and 60), and the output sprocket 55 is generally situated on the exterior side of the circular plate member 22. As is evident from FIG. 57, the ratio control rod member 66 in this embodiment is slidably supported by the least one annular bushing or bearing mender 68 which is secured inside the input shaft 60 such that the ratio control rod 66 may slidably telescope or move within the input shaft 60 and in a generally spaced relationship thereto. It can be seen from FIG. 55 and FIG. 57 that the output shaft 72 and the input shaft 60 are arranged such that they rotate independently and freely of each other, and unlike the embodiment shown in FIGS. 4 and 8, are not offset or spaced by the bearing members 74-74 shown in FIG. 8, as the input shaft 60 and the output shaft 72 are independently rotatably supported by respective circular plate 23 and circular plates 20-22.

The regulating assembly 28 of the embodiment of FIGS. 9A and 57 is nearly the same as the embodiment of FIG. 4, except that the ratio control rod 66 does not pass through an annular channel of the output shaft 72. Instead, and as best shown in FIGS. 57 and 57A, the ratio control rod 66, is supported by bushing/bearing member 68 in the input shaft 60 for being operatively coupled to the index plate 82 and protrudes through the aperture 78 (see FIG. 61) of the input shaft 60 and passes through the aperture 134 of the circular plate 23 for being operated upon as needed. A quick inspection of FIG. 9A and FIG. 4 reveals that in the former the input shaft 60 and the output shaft 72 are on opposite sides and has the regulating assembly 28) interposed therebetween with the central shafts 32 of the clutch assemblies 30 supported by the three circular plates 20-22-23; whereas, the latter has the input shaft 60 at least partially rotatably supported by the output shaft 72 with the regulating assembly 28 being arranged externally of circular plate 20, such that only the two circular plates 20-22 support the central shafts 32 of the clutch assemblies 30, the input shaft 60, and the output shaft 72.

It is evident from FIG. 57 that the ratio control rod member 66, the aperture 70, the bearing member 68, the output shaft 72, the bearing member 64, and the aperture 62 are all concentrically aligned, as in the previous embodiment of FIG. 4. As previously mentioned the input shaft 60 comprises a structure that is generally tube-shaped or hollow, to allow the ratio control rod 66 to pass through the inner tubular opening or aperture 78 in the input shaft 60, such that end 66a of the ratio control rod resides therein. A portion of the input shaft 60 is formed with a recess or cutout 71 (see FIGS. 55 and 56) which reciprocatively receives the index plate lever 80 (as indicated in FIG. 55 by arrow A and a dotted line representation of index plate lever 80) when the ratio control rod 66 moves in direction of the arrow B, as also shown in FIG. 55. The portion is supported by bearing 136 disposed in aperture 134 of the circular plate 23 (see FIG. 57). Similarly, the ratio control rod 66 is disposed in the tubular opening or aperture 78 of the input shaft 68 such that the ratio control rod 66 is supported by the bearing/bushing member 68.

Further similar to the previous embodiment of FIG. 4, the embodiment of FIG. 57 has the index plate lever 80, as best shown in FIGS. 57 and 57A, with end sea hingeably or pivotally secured to end 66a of the ratio control rod member 66. End 80b is pivotally secured to the index plate member 82 and the recess or cutout 82a is formed in the index plate member 82, as before. The center web shaft 92 lodges within aperture 82b and protrudes therefrom to pivotally engage or pivotally couple the center web member 94. The regulating assembly 28 is secured to, coupled to, or engageable to the end 60a of the input shaft 60 (i.e. to sprocket 54 that is bound to or keyed to or formed of the end 60a of the input shaft 60) and comprises the cylindrical block member 88 (preferably generally cylindrical in geometric configuration) having opposed ends 88a-88b as in the previous embodiment. End 88a of the block member 88 is secured to end 60a of the input shaft 60 and end 88b of the block member 88 connects to the index plate cover 86. The index plate member 82 of the regulating assembly 28 is slidably disposed in a longitudinal index plate channel or guide 84 within the block member 88, such that the index plate member 82 may freely slide therein along a plane that is generally normal to center axis 1 when moved by the index plate lever 80 being pushed or pulled by the ratio control rod 66, as indicated in FIG. 57A.

As previously mentioned, the connecting rod 98 preferably comprises the dampening means 110. In the case that dampening means comprises a hydraulic piston (not shown) as previously indicated, the hydraulic piston would comprise a hydraulic fluid inlet (also not shown) interconnected to a hydraulic line 126 which would be connected to a hydraulic regulator member 128 (see FIG. 23) for opening and closing a flow of hydraulic fluid to the hydraulic piston (not shown). The regulation of the regulator member 128 is achieved by a cam follower member 140 having an end 140a thereof riding in cam lobes 144 of a cam member 142 (see FIG. 23). A sequential hydraulic valve member (also not shown) regulates the flow of hydraulic fluid to the appropriate hydraulic fluid inlet of the hydraulic piston being regulated such that typically only one hydraulic piston is in communication with the hydraulic fluid at any given time (i.e. when the connecting rod under load is being shortened and/or lengthened). The cam follower member 140 is pivotally engaged to the chassis or support assembly 12 of the transmission 10 so as to function as a lever, such that as end 140a thereof is moved downward, an end 140b thereof is moved upwards. The cam member 142 comprises a flat circular disc member having the cam lobes 144 (see FIG. 24) therein in the form of indentations which is rotatively disposed on the input means 14 of the transmission 10 such that the sequential hydraulic valve member (not shown) turns synchronously therewith. There are as many lobes 144 formed in cam member 142 as there are clutch assemblies 30. Therefore, in the embodiment of FIG. 10, there would be four cam lobes 144-144-144-144 formed in cam member 142, since there are four clutch assemblies 30 in the transmission 10 of FIG. 10. As the cam member 142 rotates (see FIG. 23), end 140a of the cam follower rides along the surface of the cam member 142, causing end 140b thereof to move up according to the indentations or lobes 144 in the cam member 142. End 140b pushes on the regulator member 128, such that a valve member 128a thereof permits or interrupts fluid flow to the sequential hydraulic valve member according to the indentations or lobes 144 of the cam member 142, such that as the cam follower member 140 rides an indented portion or lobe 144, the valve member 128a is open, and thereby allows hydraulic fluid to pass thereby. Alternatively, as the cam follower member 144 passes over a non-indented portion of the cam member 142 the end 140b pushes valve 128a downward to block hydraulic fluid flow. When the hydraulic fluid is blocked, the hydraulic piston member would resist compression, and thereby prevent the connecting rod 98 from lengthening. This is one of the salient features of the present invention, as the cam lobe is preset to compensate for sinusoidal output associated with increasing and decreasing velocities of stroke on the crank arm member 130 by connecting rod 98.

Figure 23:
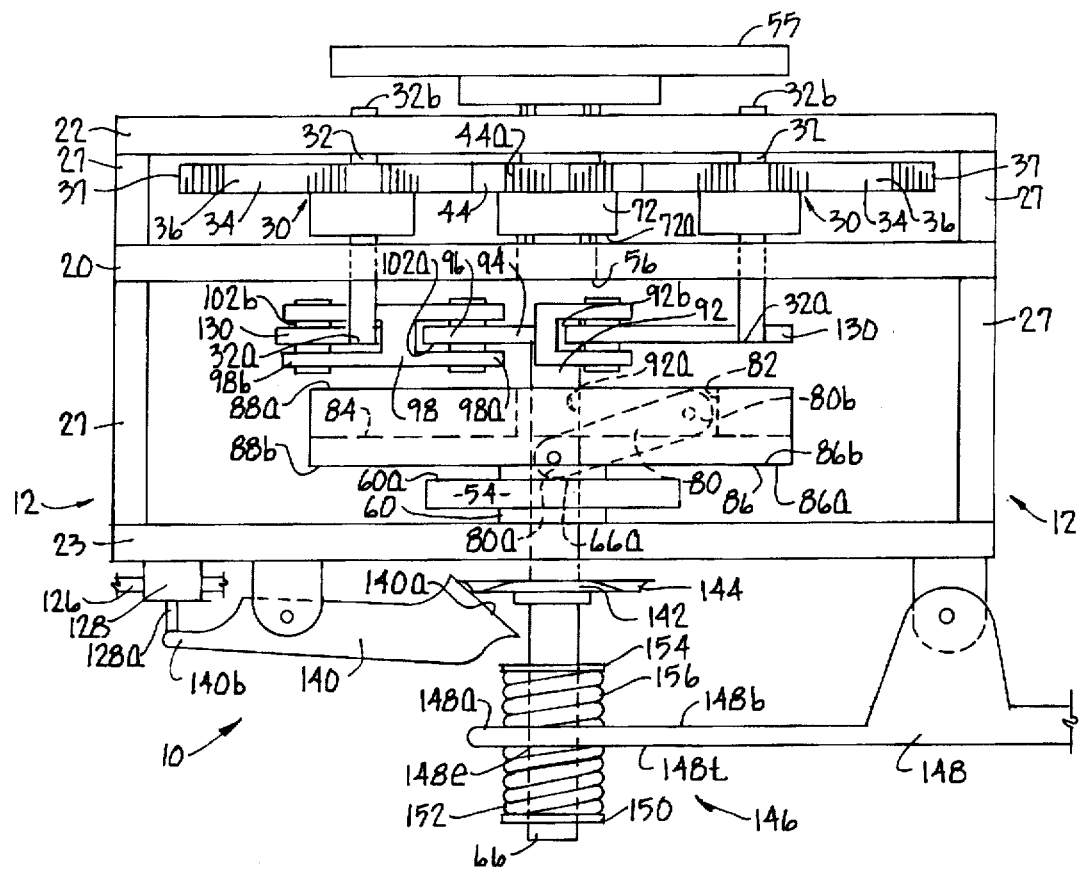
FIG. 23 is a top plan view of the embodiment of the transmission of FIG. 21 and having a spring biased ratio control rod and a hydraulic torque control assembly coupled thereto for providing hydraulic feedback to the transmission which includes a cam follower, a cam follower lever, and a hydraulic switch member.
Figure 24:
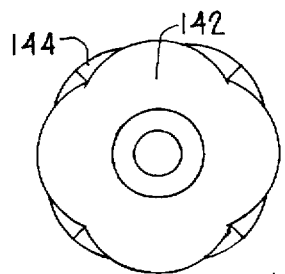
FIG. 24 is a top plan view of a cam follower of the torque control assembly of FIG. 17.

As further shown in FIG. 23, the ratio control rod 66 may comprise a torque control assembly, generally illustrated as 146. The torque control assembly 146 comprises a torque lever member 148 pivotally disposed to chassis or support assembly 12 of the transmission 10, and has an end 148e including an aperture 148a disposed around the ratio control rod 66, such that the ratio control rod 66 passes through the aperture 148a. A first spring rest shoulder 150 is secured to the ratio control rod 66 and a first ratio control spring 152 is disposed therebetween such that the first ratio control spring 152 is disposed around the ratio control rod 66 and between the first shoulder 150 and a top face 148t of the torque lever member 148. Likewise, a second spring rest shoulder 154 is disposed on the ratio control rod 66 and a second ratio control spring 156 is disposed between the second shoulder 154 and a bottom face 148b of the torque lever member 148. Thus, the ratio control rod 66 is springably biased by opposed springs 152-156. This opposed spring bias serves as a torque limiter for the transmission 10. As torque demand increases, feedback on the ratio control rod 66 is generated, causing same to return to a position corresponding to a zero output state. Spring 156 prevents the ratio control rod 66 from "creeping", or returning to a zero output state. Spring 152 serves as a torque limiter. As feedback through clutch assembly 30 on ratio control rod 66 exceeds the spring bias of spring 156, spring 152 forces the ratio control rod 66 inward, to reduce the output ratio of the transmission 10.

Figure 40:
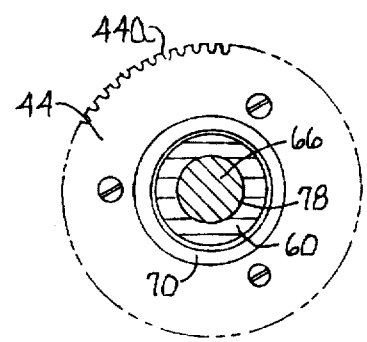
FIG. 40 is a vertical sectional view taken in direction of the arrows and along the plane of line 40—40 in FIG. 9.
Figure 42:
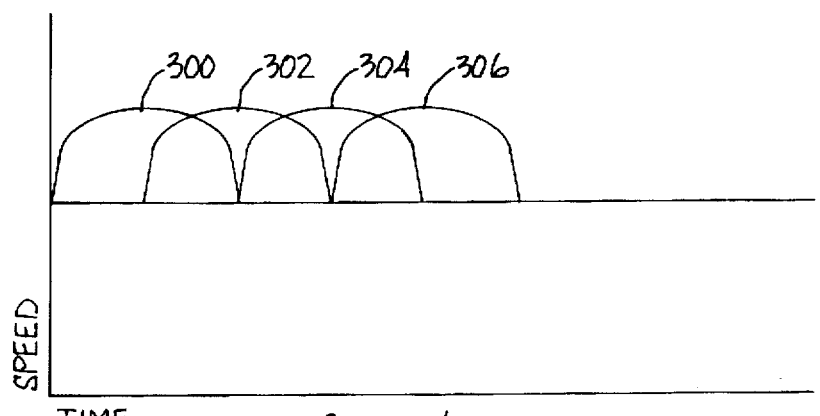
FIG. 42 is a graph of a rotational output produced by another embodiment of the transmission of the present invention having spring biased connecting rods and depicting waveforms of loaded output speed versus time and showing substantially flat output.

FIG. 41 characterizes the sum of the rotational outputs of the output assembly 26 for the embodiment of the transmission 10 shown in FIGS. 25-28 where the output assembly 26 comprises four overrunning clutch assemblies 30-30-30-30. The graph shown in FIG. 41 illustrates the sinusoidal nature of the output generated by the clutch assemblies 30-30-30-30. The graph of FIG. 42 illustrates the essentially smooth output generated by the clutch assemblies 30-30-30-30 of the transmission of FIG. 10 (i.e. the embodiment utilizing the dynamically adjusted connecting rods 98-98-98-98) when resistance is applied against the output assembly 26 (i.e. output means 16). As the regulating assembly 28 (i.e. regulating means 18) revolves, the center web member 94 is caused to orbit or rotate in an epicyclic fashion. Stated alternatively, as the cylindrical block member 88 of the regulating assembly 28 (see FIG. 10) rotates, the center web member 94, which is off-set from the axis of rotation (i.e. central axis 1) of the cylindrical block member 88 by the index plate member 82 (see FIG. 13), is caused to circularly move, orbit, or revolve about the axis of rotation of the cylindrical block member 88 (see FIG. 10). It should be understood that the center web member 94 does not rotate; rather, the center web shaft 92 rotates within the center web member 94, and the center web member 94 revolves or orbits in a circular path which is centered on the axis of rotation of the cylindrical block member 88 (i.e. central axis 1). Thus, as the center web 94 orbits the central axis 1 (i.e. the axis of rotation of the cylindrical block member 88), the connecting rods 98-98-98-98 coupled to the center web 94 relay reciprocating motion to the corresponding crank arms 130-130-130-130. The effect of the orbiting motion causes an increasing stroke velocity by the crank arms 130-130-130-130 on the shafts 32-32-32-32 of the clutch assemblies 30-30-30-30 as acted upon by the center web member 94/connecting rod 98-98-98-98 combination. The dampening means 110 tends to contract the connecting rods 98-98-98-98 as each crank arm 130-130-130-130 completes a stroke and serves to dynamically lengthen the connecting rod 98-98-98-98 as the crank arm 130-130-130-130 reaches the apex (i.e. the greatest velocity or peak of a sinusoid waveform) of its motion of travel (see FIG. 10 and 42). Stated alternatively, since the crank arms 130-130-130-130 travel in an arc, the velocity of the stroke expressed on the crank arms 130-130-130-130 by the respective connecting rods 98-98-98-98 is increasing as the crank arm 130-130-130-130 reaches its apex. Therefore, the connecting rods 98-98-98-98 are dynamically lengthened against a biasing or bias of the dampening means 110 (e.g. spring 120) by the as the crank arms 130-130-130-130 are reaching the apex of their respective strokes, in order to "slow down" or extend the time necessary to complete the stroke, thus countering the increasing velocity and substantially flattening or smoothing the sinusoidal character of the stroke produced (see FIGS. 40 and 41). It should be appreciated that resistance or load applied to the output assembly 26 (i.e. output means 16) is communicated through the gears 34-34-34-34 of the clutch assemblies 30-30-30-30. As a given clutch assembly 30 is producing a stroke (i.e. the shaft 32 of the given clutch assembly 30 is engaged or locked to the gear 34) resistance on the crank arm 130 tends to "hold back" or resist the pulling of the center web 94 as expressed through the connecting rod 98. This resistance causes the connecting rod 98 to lengthen against the bias of the dampening means 110 (e.g. spring 120) under such feedback or resistance. It is understood that increasing resistance or torque on the output assembly 26 (i.e. output means 16) causes a concomitant reaction by the connecting rod 98 such that the connecting rod 98 is increasingly lengthened against the bias of the dampening means 110 (e.g. spring 120). Additionally, sinusoidal rotational input applied to the transmission 10 (i.e. input applied to the input assembly 26) is smoothed by the dynamically adjusting connecting rods 98 under the same principle.

It may be appreciated that in use of the transmission 10, some applications require feedback from the output, such as given by example only, engine braking which occurs when the mass of an engine of a car is used to slow the car by dragging the output down. Thus, the transmission 10 may comprise, as shown in one embodiment in FIGS. 29 and 30 with the center web member 94 and the connecting rods 98 and crank arms 130 being removed for clarity, an engine feedback gear assembly, generally illustrated as 160 and/or a final drive lockup gear assembly 170. The engine feedback gear assembly 160 and the final drive lockup gear assembly 170 couple the input assembly 24 (i.e. input means 14) to the output assembly 26 (i.e. output means 16) for providing engine braking and/or grade retard (i.e. engine feedback gear assembly 160) or directly coupling the input assembly 24 (i.e. input means 14) to the output assembly 26 (i.e. output means 16) when a final drive ratio is set by the transmission 10 to reduce the number of moving parts within the transmission 10.

Figures 29, 30:
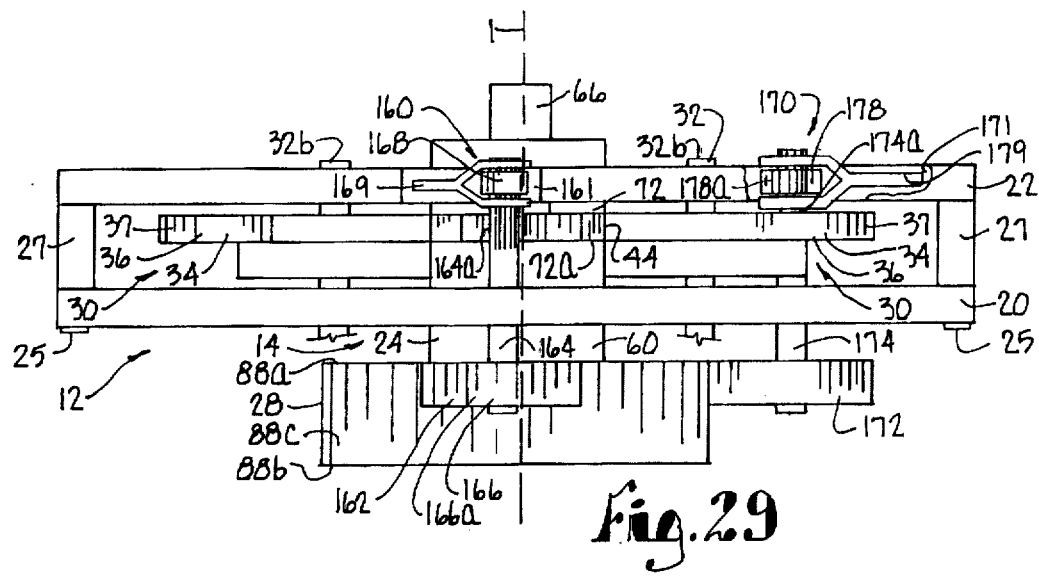
FIG. 29 is a partial top plan view of an embodiment of the transmission of the present invention illustrating a feedback gear assembly meshed with a gear circumference of the cylindrical block member and rotatably disposed in the chassis or support assembly for providing feedback to the input assembly (i.e. input means)
FIG. 30 is a front elevational view of the view depicted in FIG. 29.

As best shown in the embodiment of FIG. 29, the cylindrical block member 88 comprises a toothed arcuate outer surface or circumference 88c such that the outer surface 88c is capable of meshing or otherwise coupling with another overrunning clutch assembly 162 of the engine feedback assembly 160 or a gear member 172 of the final drive lockup gear assembly 170. The engine feedback gear assembly 160 comprises the overrunning clutch assembly 162 that meshes or otherwise couples the toothed or geared circumference 88c of the cylindrical block member 88 which is coupled to the shaft 164. As previously discussed for the overrunning clutch assemblies 30-30, overrunning clutch assembly 162 comprises a central shaft 164 (e.g. shaft 32 of FIG. 3) upon which a gear ring 166 (e.g. gear ring 34 of FIG. 3) is rotatably disposed. The gear ring 166 comprises a toothed or geared outer face 166a (e.g. teeth 37 of FIG. 3) and inner cutouts and bearings (not shown in FIG. 29, but are similar to cutouts 38 and bearings 42 of FIG. 3) for producing the single direction locking action characteristic of the overrunning clutches. Thus the gear ring 166 is disposed on shaft 164 such that the shaft 164 may rotate freely within the gear ring 166 in one direction (e.g. clockwise with respect to the view in FIG. 30) and lock or engage the gear ring 166 when rotated in the opposite direction (e.g. counter-clockwise with respect to the view in FIG. 30). It should be appreciated that in this particular usage, the gear ring 166 will not usually have occasion to rotate opposite to the shaft 164, however the gear ring 166 will have occasion to rotate in the same direction more slowly than the shaft 164 which has the same effect as a reversal in direction (i.e. the gear ring 166 locks with the shaft 164 when the rotational speed of the gear ring 166 falls below the speed of the shaft 164). This characteristic is used to cause the output assembly 26 (i.e. output means 16) to feedback rotational speed to the input assembly 24 (i.e. input means 14) to cause the input assembly 24 to maintain a rotational speed that is commensurate with that of the output assembly 26. Stated alternatively, when the relative rotational speed of the gear ring 166, which is coupled to the input assembly 24 (e.g. cylindrical block 88) falls below the rotational speed of the shaft 164, which is coupled to the output assembly 26 (e.g. summing gear member 44), the gear ring 166 (i.e. the overrunning clutch assembly 162) locks against the shaft 164 and causes the input assembly 24 (e.g. cylindrical block 88) to be "pulled" up to a rotational speed that is proportionally equivalent to the output assembly 26 rotational speed (the proportions are relative according to the particular ratios of the coupling components (i.e. shaft 164, the gear ring 166, the cylindrical block 88, and the summing gear member 44 as shown in FIGS. 29 and 30)). Shaft 164 is rotatably supported by the circular plate member 20 such that the shaft 164 may rotate freely therein (i.e. supported by a bearing member (not shown in the drawings) disposed in an aperture (not shown in the drawing)). One end of the shaft 164 comprises a splined end or geared end 164a for slidably receiving a coupling gear member 168. The gear member 168 has an inner geared surface 168a which is slidably engaged to the end 164a of the shaft 164 and an outer geared surface 168b which removably meshes or couples the summings gear 44 or one of the gear rings 34-34 of the clutch assemblies 30-30 (see FIG. 29). The inner teeth or geared surface 168a of the gear member 168 engage the splined portion 164a of shaft 164 such that rotation applied to the gear member 168 forces the shaft 164 of the overrunning clutch assembly 12 to correspondingly rotate. The gear member 168 may be moved laterally along the splined portion 164a of the shaft 164 such that the gear member 168 may mesh or couple the summing gear member 44 or be slidably de-coupled therefrom. A lever member 169 is coupled to the gear member 168 to manually slide the gear member 168 such that the gear member 168 couples or de-couples the summing gear member 44. As shown in FIGS. 29 and 30, the circular plate member 22 has a cut-out area 161 where the engine feedback gear assembly 160 resides. The cut-out area 161 allows the lever member 169 to slidably pass between the circular plate members 20-22 such that the gear member 168 may couple or mesh the summing gear member 44.

Similarly, the final drive lockup gear assembly 170 is arranged to engage the toothed portion 88c of the cylindrical block member 88 (or any suitable portion of the input assembly 24 (i.e. input means 14)) and the summing gear member 44 (or any suitable portion of the output assembly 26 (i.e. output means 16)). A shaft 174 is rotatably disposed in the circular plate 20 such that the shaft 174 may be supported by the circular plate 20 and rotate freely therein (i.e. supported by a bearing disposed in an aperture (not shown in FIGS. 29 and 30)). The gear member 172 is secured to a first end of the shaft 174 such that the gear member 172 meshes or couples the cylindrical or circular portion 88c of the cylindrical block member 88. One end of the shaft 174 comprises a splined end or geared end 174a for slidably receiving a coupling gear member 178. The gear member 178 has an inner geared surface 178a which is slidably engaged to the end 174a of the shaft 174 and an outer geared surface 178a which removably meshes or couples the summing gear member 44 or one of the gear rings 34-34 of the clutch assemblies 30-30 (see FIG. 29). The inner teeth or geared surface 178a of the gear member 178 engage the splined portion 174a of shaft 174 such that rotation applied to the gear member 178 forces the shaft 174 of the overrunning clutch assembly 172 to correspondingly rotate. The gear member 178 may be moved laterally along the splined portion 174a of the shaft 174 such that the gear member 178 may mesh or couple one of the gear members 34-34 (see FIG. 29) or be slidably de-coupled or disengaged therefrom. A lever member 179 is coupled to the gear member 178 to slide the gear member 178 such that the gear member 178 couples or engages or de-couples or disengages the summing gear member 44. As shown in FIGS. 29 and 30, the circular plate member 22 has a cut-out area 171 where the engine feedback gear assembly 160 resides. The cut-out area 171 allows the lever member 179 to slidably pass between the circular plate members 20-22 such that the gear member 178 may couple or mesh the gear 34.

As may be evident, the engine feedback gear assembly 160 and the final drive lockup gear assembly 170 serve to cause the transmission 10 to have a "feel" to the input source and to achieve higher efficiency when a desired final drive ratio is reached. FIGS. 29 and 30 effectively demonstrate two manners of providing feedback of the output assembly 26 through the transmission 10 to the input assembly 24, however, other methods of providing feedback to the transmission are possible, such as by way of example only, electronically monitoring the input rotations and output rotations and electro-mechanically (servo driven, microprocessor controlled adjusting devices) modifying the input rotation to output rotation ratio. Such a use of electronic feedback shall not unduly limit the spirit and scope of the invention and is fully intended in a preferred embodiment.

Although the transmission 10 generates rotational output that is preferably rotated in the same direction as the input, whether clockwise or counter-clockwise, it is desirable to easily reverse the output of the transmission 10 without reversing the input delivered to the transmission 10. For example, an engine 15 (see FIG. 22) typically generates output in one direction only (e.g. clockwise) and it is necessary to derive output from the transmission 10 which both rotates with the engine 15 and counter-rotates to the engine 15. The transmission 10 may thus comprises a direction selecting means 200 for supplying output from the transmission. The direction selecting means 200 may comprise any suitable means for generating a counter-rotation to a given rotation, such as by way of example only, a gear member that is meshed with or coupled to the output assembly 26 (i.e. output means 16). For example, as shown in FIG. 22, a gear cluster assembly 202 is shown to mesh with a gear ring 34 of one of the clutch assemblies 30-30-30-30. Due to the action of the summing gear member 44 on the gear rings 34-34-34-34 of the clutch assemblies 30-30-30-30, the gear rings 34-34-34-34 are preferably synchronized with the summing gear member 44. Therefore, as shown in FIG. 22, the direction selecting means 200 may derive output from the transmission 10 at any convenient point, such as any of the gear rings 34-34-34-34 of the clutch assemblies 30-30-30-30, the summing gear member 44, or a gear, sprocket, or the like coupled to the output shaft 72. It is understood that any suitable forward/reverse gear cluster assembly 202 (i.e. direction selecting means 200) may be utilized with the transmission 10 of the present invention without departing from the spirit and scope of the present invention.

Figure 31:
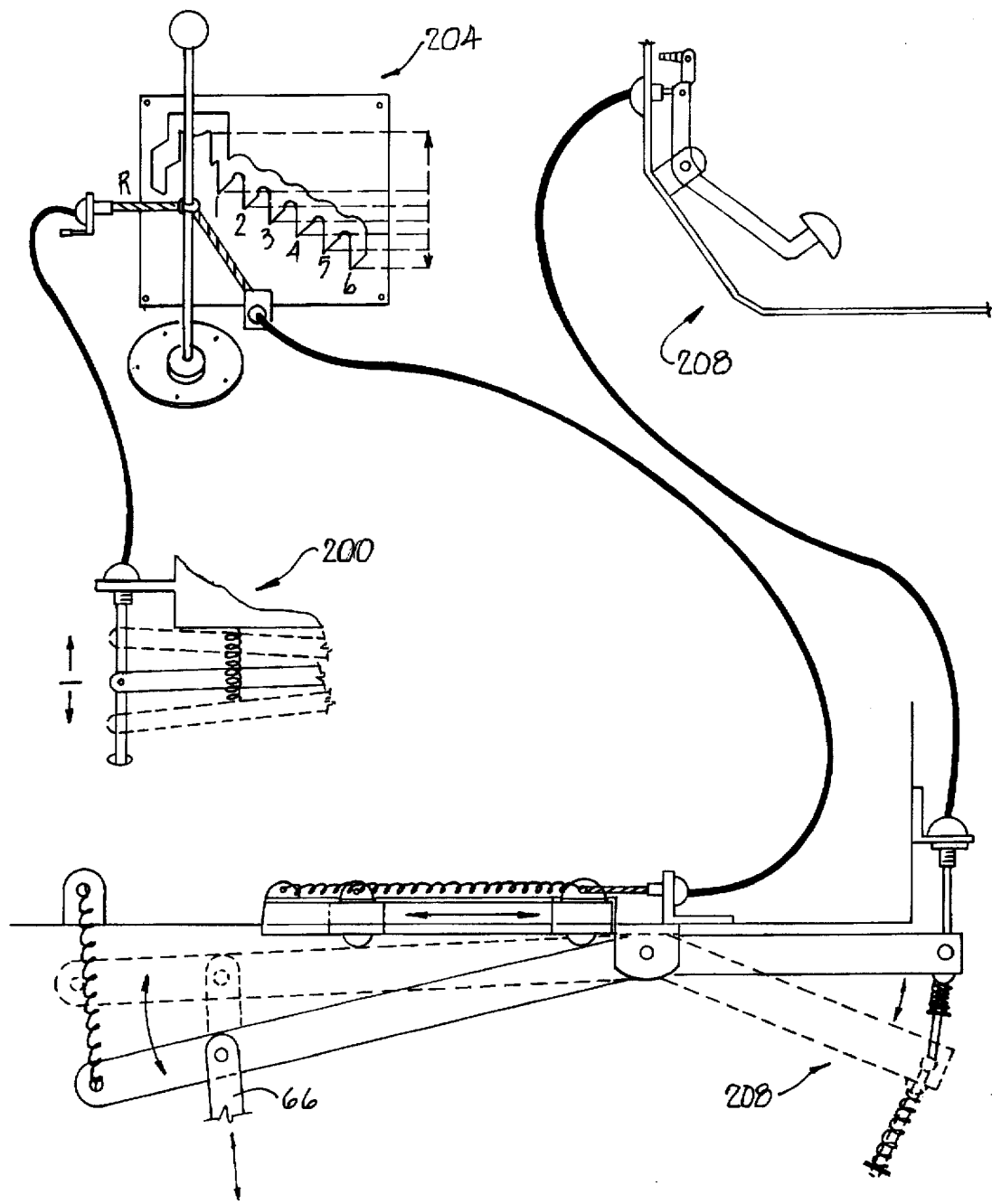
FIG. 31 is a schematic diagram of a control assembly for regulating the transmission of the present invention.
Figure 32:
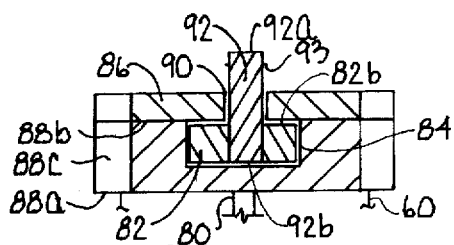
FIG. 32 is a vertical sectional view taken in direction of the arrows and along the plane of line 32—32 in FIG. 9.
Figure 33:
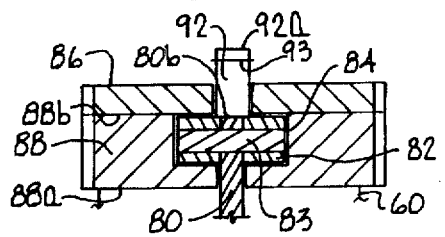
FIG. 33 is a vertical sectional view taken in direction of the arrows and along the plane of line 33—33 in FIG. 9.
Figure 35:
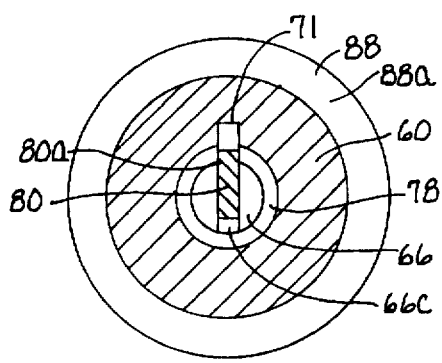
FIG. 35 is a vertical sectional view taken in direction of the arrows and along the plane of line 35—35 in FIG. 9.
Figure 34:
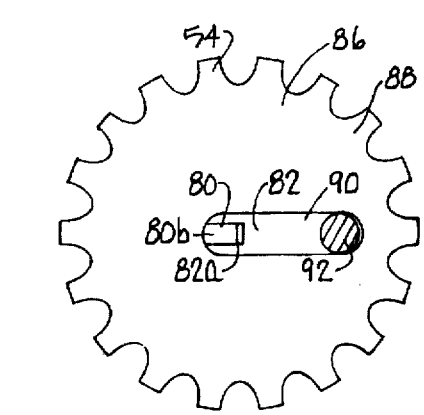
FIG. 34 is an elevational and partial vertical sectional view taken in direction of the arrows and along the plane of line 34—34 in FIG. 9.

It should be understood that in using the transmission 10 in an automobile, familiar controls may be provided, as shown in FIG. 31, for making the transmission 10 "feel" like a conventional transmission 10. Such controls are intended in the spirit and scope of the present invention. As shown in FIG. 31, the direction selecting means 200 is coupled to a gear selector assembly 204 which selects the position of the ratio control rod 66 (to adjust the output of the transmission 10) in pre-selected notches 206, as shown. A disengaging lever 208 is likewise coupled to the ratio control rod 66 and effectively moves the ratio control rod 66 to position according to zero output of the transmission, to emulate the action of a clutch in a standard transmission. It is intended that an electronically adjusted ratio control rod 66 is equally intended in the spirit and scope of the present invention. Various parameters of engine performance will be preset in a microprocessor control means for regulating the output of the transmission based on the preset parameters.

In an alternative embodiment of spring biasing the crank arm/connecting rod combination 130/98, as shown in FIG. 63, the crank arm 130 is biased in addition to or in place of the dampening and/or spring biasing of the connecting rods 98, (not shown in FIG. 63). As was previously mentioned, hydraulic dampening and/or spring biasing may be incorporated in the connecting rods 98 of the transmission 10 of the present invention (e.g. connecting rod 98 as shown in FIGS. 15-20) where desired. Spring biasing of the crank arms 130 is also possible (see FIG. 63), by rotatably disposing the crank arm 130 on the central shaft 32 by any suitable means, such as incorporating a bearing or bushing 408 between the crank arm 130 and the central shaft 32, so that the crank arm 130 is allowed to rotate independently of the central shaft 32. At least one keeper member 406 may be secured to the central shaft 32 to prevent the crank arm 130 from sliding laterally along the length of the central shaft 32, usually a pair of keeper members 406-406 is employed on opposite sides of an opening or aperture 132 of the crank arm 130 which engages the central shaft 32 to prevent the crank arm 130 from sliding laterally along the central shaft 32 (see FIG. 64). A helical spring member 400 having a pair of opposed ends 402-404 is circumferentially disposed around the central shaft 32 of the clutch assembly 30. One of the opposed ends 402 of the spring member 400 is fixedly secured and/or engaged to the central shaft 32 and the other 404 end is fixedly secured or engaged to the crank arm 130. This arrangement effectively couples the crank arm 130 to the central shaft 32 of the clutch assembly 30 for causing the central shaft 32 to move under the force of the crank arm 130; however, simultaneous restriction or reduction of the ability or effectiveness of the crank arm 130 to effect movement of the central shaft 32 is created or provided, as the central shaft 32 is only caused to move by the spring member 400. As the crank arm 130 rotates, the end 404 of the spring which is secured to the crank arm 130 rotates as well and causes the spring to bias (i.e. become stretched or compressed, depending on the direction of rotation), thereby creating an action potential. As the crank arm 130 continues to rotate further in the same direction (e.g. counter-clockwise with respect to the view of FIG. 63) the spring 400 becomes increasingly biased and reaches the limit of its elasticity. Once the spring 400 reaches the point it can no longer be biased (i.e. stretched or compressed to an action threshold) end 402 moves or rotates in the same direction as end 404. As end 402 rotates, the central shaft 32, which is secured thereto, is caused to rotate in the same direction (e.g. counter-clockwise with respect to the view of FIG. 63). Thus when the flexibility or torque limit of the spring member 400 is reached as the crank arm 130 rotates, the central shaft 32 is caused to rotate. It can be appreciated by those skilled in the art that this arrangement, like the arrangement of the dampened connecting rods 98 of FIGS. 15-20, accomplishes smoother output produced by the action of the central shafts 32 on their respective clutch assemblies 30 and affords torque limiting in the transmission 10. It can be seen that the opposite of the aforementioned sequence is also true; if force is applied to the central shaft 32 (e.g. "clockwise" resistance with respect to the view of FIG. 63) of the clutch assembly 30 (e.g. such load occurs when the output of the transmission 10 is placed under a load such as water viscosity against a propeller or the weight of an automobile) there is enhanced resistance of the central shaft 32 to be turned or rotated (e.g. counter-clockwise in this discussion). The spring 400 absorbs this resistance if the resistance is sufficient to cause the spring 400 to bias or flex until the crank arm 130 commences rotation (e.g. counter-clockwise rotation). Usually a spring 400 suitable for withstanding a degree of torque analogous to the duty rating of the clutch assembly 30 employed is selected for the biased crank arms 130. For the clutch assemblies 30 utilized in the transmission 10 of the present invention, such a spring 400 exhibits a degree of stiffness that renders the action of the crank arm 130 on the central shaft 32 as generally equivalent to the rigid crank arm 130/central shaft 32 combination which does not utilize a spring torsion arrangement. Thus, it can be appreciated that the spring member 400 is to posses a degree or torque resistance (i.e. the spring 400 does not begin to flex until such a degree of torsion is applied) such that the spring 400 is caused to flex as described above only when the clutch assembly 30 employed in the particular manifestation of the transmission 10 of the present invention is incapable of meeting the load demand placed upon it. Hence the spring member 400 effects torque limiting of the transmission 10 by absorbing any excess torque placed upon the output assembly 26 or the input assembly 24.

The amount of torsion of the spring may be effectively monitored by measuring how much rotation of each central shaft 32 independent of its corresponding crank arm 130 rotation is produced. Stated alternatively, an electronic measuring means incorporating an analog or digital counting device for quantifying an amount of rotation of the crank arm 130 relative to the corresponding central shaft 32 may quantify an amount of rotation of the crank arm 130 which does not produce a corresponding rotation on the central shaft 32. In an excessive load situation, either the entire spring travel of spring 400 is taken up, which can correspond to an excessively high output to input ratio selection. The electronic measuring means detects such a scenario by recording when too much rotation of any crank arm 130 relative to the corresponding rotation of its associated central shaft 32 and effecting a reduction of the selected gear ratio set by the ratio control rod 66 by adjusting the ratio control rod 66 to a lower setting with a servo motor, hydraulic piston, magnetic field flux, or the like, which is operatively coupled thereto.

Another effect of the spring member 400 which interengages or couples the crank arm 130 and the central shaft 32 of each clutch assembly 30 of the various embodiments of the transmission 10 of the present invention is to produce smooth transformation of input rotation to output rotation when the transmission 10 is loaded or placed under resistance (e.g. the weight of a car). Stated alternatively, the spring member 400 causes the output rotation produced by the transmission 10 of the present invention to be characterized by a substantially flat waveform when the output of the transmission 10 is coupled to a resistance. Usually in the course of capitalizing on a transmission, a load of sufficient resistance to a driving rotation requires a lower gear ratio output to the input which causes a load sufficient to slightly compress the spring 400 to be placed on the transmission. Thus, as each crank arm 130 of each clutch assembly 30 is caused to rotate in a power stroke under the force of the input rotation as earlier discussed, the spring 400 initially begins to flex, as the load on the transmission 10 (i.e. the load on the transmission 10 which is relayed and/or conveyed through all of the associated drive parts including the summing gear 44, the gear ring 34, and the central shaft 32) is initially too great for the input rotation to overcome. As the crank arm 130 is further rotated, the combined action potential stored in the spring 400 by the commenced rotation of the crank arm 130 and the continuing rotation of the crank arm 130 causes the central shaft 32 to rotate in the same direction as the crank arm 130. By the time the combined action of the spring bias action potential of spring 400 and the continuing rotation of the crank arm 130 cause the central shaft 32 to rotate, the crank arm 130 is generally reaching the end of its power stroke, where the described process repeats for the sequentially following clutch assembly 30. The result is a flattened or substantially smooth output rotation, as the peak of each crank arm 130 stroke is partially absorbed by the spring 400 and the subsequent decreasing speed portion of the stroke is augmented by the action potential which is stored in the spring 400 during the absorption phase.

Thus it can be seen that damping may occur within the connecting rods 98 and/or the crank arms 138. It may be further appreciated that springs utilized with the connecting rods 98 and/or the crank arms 130 may be further dampened with hydraulic pistons (not shown) for absorbing "overshoot" or "snubbing action" commonly exhibited by spring dampened assemblies due to kinetic motion of the springs.

Thus in summary, referring to FIG. 1, the transmission 10 comprises the pair of circular plate members 20-22 having the plurality of clutch assemblies 30-30 (at least three clutch assemblies 30 is preferred) suspended in apertures 48-50 thereof. The shafts 32-32 of the clutch assemblies 30-30 are rotatively suspended between the circular plate members 20-22. Crank arm members 130-130 are secured to the shafts 32-32 of the clutch assemblies 30-30. Connecting rod members 98-98 couple the crank arm members 130-130 to the ears 96-96 of the center web member 94. The center web member 94 is rotatively disposed on center web shaft 92, and center web shaft 92 is secured to index plate 82. Index plate 82 is slidably disposed in guide 84. The sliding action of index plate 82 is governed by the action of ratio control rod 66 on index lever 80 to cause the center web 94 to be increasingly offset from the central axis 1 as the index plate member 82 slides to cause the center web shaft 92 and the center of the center web member 94 off-center from central axis 1, for causing the connecting rods 98-98 to increasingly reciprocate in connection with center web 94 as the center web 94 is caused to epicyclically revolve or orbit around central axis 1.

Turning now to the drawings for operation and use of the current invention, there is seen in FIG. 10 a preferred embodiment of the transmission 10 of the present invention. The transmission 10 comprises the overrunning clutch assemblies 30-30-30-30 supported by the chassis or support assembly 12 which have gear rings 34-34-34-34 thereof equispaced and meshed with the centrally located summing gear member 44. The summing gear member 44 is coupled to the output shaft 72 and the summing gear member 44 and the output shaft 72 form a portion of the output assembly 26 for supplying rotational output from the transmission 10. The input assembly 24 comprises the input shaft 60 for establishing and/or supplying rotational input to the transmission 10 and the cylindrical block member 88 of the regulating assembly 28 is secured thereto. The cylindrical block member 88 has the sliding index plate member 82 and the center web shaft 92 secured to the index plate member 82 for establishing an adjustable off-set orbiting revolution of the center web shaft 92 directly proportional to the input rotation, such that the center web shaft 92 orbits or epicyclically revolves about the central axis i (i.e. the axis of rotation of the cylindrical block member 88). The index plate member 80 is slidably moved in the index plate guide 84 by sliding the ratio control rod 66 within the input shaft 60. As shown in FIG. 8, as the ratio control rod 66 is slidably pulled from the input shaft 60, the index plate lever 80 effects a corresponding sliding movement of the index plate member 82 within the cylindrical block member 88 to increase the amount of off-set of the center web shaft 92 which is secured to the index plate member 82. The center web member 94 is rotatively secured to the center web shaft 92 such that the center web shaft 92 may rotate within the center web member 94 and simultaneously cause the center web member 94 to move in a planetary fashion about the cylindrical block member 88.

Input rotation is applied to the input assembly 24 by any suitable means, such as coupling the rotary output of an engine to the sprocket 54 (which is secured to the input shaft 60) to cause the input assembly 24 and the regulating assembly 28 to turn. A desired adjustment of the regulating assembly 28 is effected by sliding the ratio control rod member 66 within the input shaft 60 to correspondingly axially slide the index plate member 82 and the center web shaft member 92 to a desired position. The center web member 94 is thus caused to revolve about the central axis 1 while mounted on the center web shaft 92. As can be seen in FIGS. 25-28, the center web member 94 does not rotate on the shaft 92, rather the shaft 92 rotates within the center web 94 to cause the center web member 94 to move about the cylindrical block member 88 in a circular or orbital fashion, or to orbit (at the same speed as the cylindrical block member 88) about the central axis 1 without turning on its own axis. As the center shaft 92 is moved further from the central axis 1 (i.e by sliding the index plate member 82 within the index plate guide 80 with ratio control rod 66), an increasing larger circle defines the travel of the center web member 94 as it revolves about the central axis 1 (i.e. the axis of rotation of the cylindrical block member 88). It is the circular path of the center web member 94 that establishes the rotation from which reciprocal motion is derived.

The connecting rods 98-98-98-98 have ends 98a-98a-98a-98a thereof pivotally secured to the center web member 94. The orbital motion of the center web member 94 causes ends 98b-98b-98b-98b to oscillate by the action of being moved in the circular path of the center web member 94. The reciprocal motion is generated by the connecting rods 98-98-98-98 which, in having ends 98a-98a-98a-98a following a first half of a circular path, first pull the respective ends 98b-98b-98b-98b and crank arms 130-130-130-130 to which they are attached downward (of course this process occurs overlappingly sequentially, as will be discussed) and subsequently pushing the ends 98b-98b-98b-98b and the crank arms 130-130-130-130 to which they are attached upward as the ends 98a-98a-98a-98a complete the second half of the circular path.

When the orbiting center web member 94 causes the connecting rods 98-98-98-98 and the crank arms 130-130-130-130 to oscillate, the down-stroke of each crank arm 130 causes the corresponding gear ring 34 of the clutch assembly 30 secured to the crank arm 130 to turn and the gear ring 34 in turn transmits the down-stroke to the summing gear member 44/output shaft 72. Each overrunning clutch assembly 30-30-30-30 then contributes partial rotational output overlappingly sequentially by the action of the crank arms 130-130-130-130/connecting rods 98-98-98-98 to generate the strokes which are transmitted to the summing gear member 44. The length of each stroke of each crank arm 130-130-130-130 is determined by the amount of off-set of the center web shaft 92 from the central axis 1, as the circular path followed by the ends 98a-98a-98a-98a of the respective connecting rod 98-98-98-98 is increased as the center web shaft/center web member 92/94 is increasingly moved away from the central axis 1. A larger circular path of the center web member/center web shaft 94/92 corresponds to increased reciprocal excursion of the connecting rods 98-98-98-98 since the path of travel for ends 98-98a-98a-98a increases. This in turn causes an increased arc length for the travel of the corresponding crank arms 130-130-130-130, so that as the amount of center web shaft 92 off-set increases, each clutch assembly 30-30-30-30 produces a more rotational output, due to increased stroke output expressed by the crank arms 130-130-130-130 and the summed output expressed by the summing gear member 44 correspondingly increases in magnitude. It should be noted however, that the total arc length of the respective crank arm's 130-130-130-130 travel is less than 180 degrees. It can be seen in FIG. 25 that the crank arm/connecting rod combination 130/98 are "folded" onto each or, stated alternatively, form an angle. If the arc length of travel of the crank arms 130-130-130-130 equals or exceeds 180 degrees, the crank arm/connecting rod combination 130/98 would define a straight line, and the revolving action of the center web member 94 could be bound up if the crank arm/connecting rod combination 130/98 "fold up" in the wrong direction.

As previously mentioned, the amount of off-set of the center web shaft 92 along with its associated center web member 94 is controlled by the action of the ratio control rod 66 (see FIGS. 1 and 8) on the index plate member 80. As the ratio control rod 66 extends, the center web shaft 92 is pulled increasingly off-center by the action of the index plate member 80 being increasingly off-set by the levering action of the ratio control rod 66. It should be understood that the ratio control rod 66/index plate member SO/center web shaft 92 combination may be arranged such that a retracting the ratio control rod 66 causes the center web shaft 92 to move off-center of central axis 1. Such a change is an obvious choice of design and should not be construed to limit the spirit and/or scope of the invention. Further, it is understood that the direction of the rotational input expressed on the cylindrical block member 88 by the input assembly 24 should not limit the spirit and/or scope of the invention; and it is understood that the rotational directions are not exclusive: output may rotate in same direction (i.e. clockwise and clockwise) as the input or opposite, depending on the nature of the one way clutches.

Figure 28:
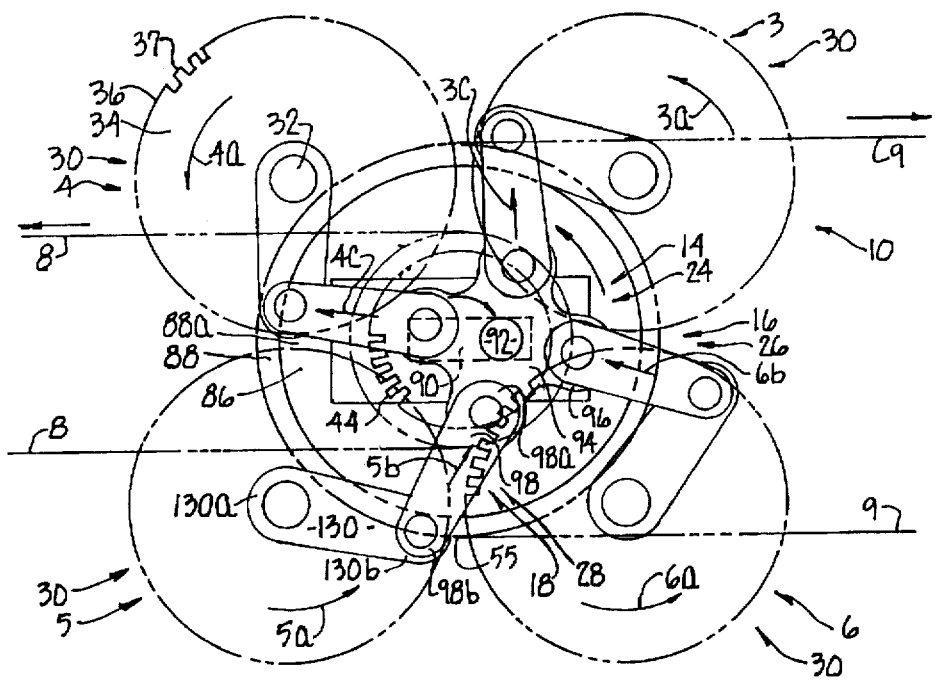
FIG. 28 is a side elevational view of a fourth stroke of the embodiment of the transmission illustrated in FIGS. 1 and 2 and subsequent to the third stroke indicated in FIG. 27, with the arrows indicating direction of travel for the respective clutch assemblies.

The inter-engaging action of the center web member 94 via the connecting rods 98 on each crank arm 130-130-130-130 of the clutch assemblies 30-30-30-30 is shown in the embodiment depicted in FIGS. 25-28. A series or sequence of strokes is produced on the clutch assemblies 30-30-30-30 to generate a portion of the total summed output by the summing gear member 44. As indicated previously, the gear rings 34-34-34-34 of the clutch assemblies 30-30-30-30 are constantly turning due to the turning of the summing gear member 44, and one or more (depending on the number of clutch assemblies 30 used in the particular embodiment of the transmission 10 (i.e. four clutch assemblies 30-30-30-30 in FIGS. 25–28)) clutch assemblies 30-30 is (are) contributing to the output at a given time. As shown in FIG. 25, one of the clutch assemblies 30, as indicated further by 3, is in a stroking position. The connecting rod 98 in this position is typically in a lengthened state varying with the load or resistance presented to the output assembly 26 of the transmission 10, if the connecting rod 98 is the dampened embodiment previously described. As the cylindrical block member 88 rotates counterclockwise (with respect to the view of FIGS. 25 and 26) the center web member 94 moves from an upper (or top) position (see FIG. 25) to a left position, as shown in FIG. 26, and causes the crank arm 130 of clutch assembly 3 to be acted upon through connecting rod 98 to produce a counter-clockwise (as shown by arrow 3a) stroke or rotation along shaft 32 which is transferred or relayed or conferred to the gear ring 34 and which is relayed accordingly to the summing gear member 44 for causing the summing gear member 44 to rotate clockwise. In the case that dynamically adjusting connecting rods 98 are employed, connecting rod 98 coupled to clutch assembly 3 extends against the bias of a dampening means 110 (i.e. spring 120) and reduces the velocity of the stroke produced by the pulling of the center web member 94 on the crank arm 130 by or through absorbing some of the velocity as it tends to pull apart. Simultaneously, the crank arm 130 of the clutch assembly 30 which follows the clutch assembly 3 in counter-clockwise sequence, indicated by 4, is placed in a power or work stroke prone position to be acted upon as the center web member 94 continues to rotate (i.e. counter-clockwise with respect to FIGS. 26 and 27). When the center web member 94 approaches a lower (or bottom) position, as shown in FIG. 27, the second clutch assembly 4 produces a stroke (indicated by arrow 4a) which is transmitted through its gear 34 to the summing gear member 44. Simultaneously, the clutch assembly 30 which follows in the counter-clockwise sequence, identified as 5, is placed in a power or work stroke-ready state. As the center web member 94 continues to revolve counter-clockwise (around the central axis 1 of the cylindrical block member 88, not shown) to a right position as shown in FIG. 28, the crank arm 130 of clutch assembly 5 is acted upon through connecting rod 98 and produces a power stroke (indicated by arrow 5a) through its gear ring 34 to the summing gear member 44. At the same time the last clutch assembly 30 (for the embodiment pictured in FIGS. 25–28), indicated by 6, is place in a power stroke ready position to be executed when the center web member 94 revolves counter-clockwise to the upper (or top) position shown in FIG. 25. As the center web member 94 rotates counter-clockwise to the top position shown in FIG. 25, the clutch assembly 6 produces its stroke (indicated by arrow 6a) which is transferred to the summing gear member 44 by the gear ring 34 and the clutch assembly 3 is concomitantly powered or work stroke-readied to repeat the process.

It should be appreciated that clockwise rotation may be applied to the input assembly 24 (i.e. input means 14) such that the cylindrical block member 88 rotates clockwise. In this case, as shown in FIG. 28, clutch assembly 3 is shown in a stroke ready position. As the center web member 94 revolves clockwise, to the lower (or bottom) position shown in FIG. 27, the crank arm 130 of the clutch assembly 6 is seen as it commences being acted upon by the connecting rod 98/center web member 94 combination. As the center web member 94 continues to revolve clockwise about the axis of rotation (i.e. central axis 1, not shown in FIGS. 25–28) of the cylindrical block member 88 to the right position shown in FIG. 26, a counter-clockwise stroke (indicated by the arrow 6a) is produced by the action of the crank arm 130 of clutch assembly 6 being pulled by the center web member 94. The process continues for the remaining clutch assemblies 30 in the overlappingly sequential order of clutch assembly 5, clutch assembly 4, and clutch assembly 3. It can be seen that the output produced by the gear rings 34-34-34-34 of the clutch assemblies 30-30-30-30 (i.e. clutch assemblies 3,4,5,6) is counter-clockwise; and the output of the summing gear member 44 and the output shaft 72 secured thereto is clockwise for the embodiment pictured in FIGS. 25–28 regardless of the direction of rotation of the input rotation supplied to the input assembly 24 (i.e. input means 14). This is one of the salient features of the present invention. It should be further noted that, although shown in counter-clockwise rotation, the clutch assemblies 30-30-30-30 (i.e. clutch assemblies 3,4,5,6) may be designed to produce clockwise rotation along their respective shafts 32-32-32-32. Stated alternatively, the clutch assemblies 30 may be designed such that the central shaft 32, upon receiving clockwise rotation (refer to FIG. 3) binds, locks, or otherwise engages the gear ring 34 and causes the gear ring 34 to turn accordingly, and upon receiving counter-clockwise rotation, the central shaft 32 does not bind, lock or otherwise engaged the gear ring 34, and the gear ring 34 is not caused to rotate sympathetically with the central shaft 32, but rather continues to turn clockwise, not turn, or turn counter-clockwise more slowly than the central shaft 32. The design of the clutches 30 for providing either locked clockwise or locked counter-clockwise rotation is a matter of choice in design and shall not limit the spirit and/or scope of the present invention.

Thus by the practice of the present invention there is provided a method of modifying an established input rotation to produce a modified output. The method comprises establishing an input rotation on the input means 14; producing orbital or planetary motion solely from the input means 14 expressed in an orbiting component (i.e. center web member 94 of regulating means 18); producing a first stroke in accordance with a specific waveform 300 (see FIGS. 41 and 42); transmitting the stroke to the output means 16 (e.g. shaft 72 or summing gear member 44); producing a second stroke in accordance with another specific waveform 302 which is out of phase with the first specific waveform; transmitting the stroke to the output means 16; producing another stroke or intermediate rotation in accordance with another waveform 304 which is out of phase with the waveforms 300 and 302; and transmitting the stroke to the output means 16. The first, second, and third strokes are overlappingly sequentially produced; therefore their attendant waveforms are not entirely in phase. In the embodiment of the transmission of FIG. 11, the waveforms of the output of the strokes are out of phase by about 120 degrees. In the embodiment of FIG. 10, a fourth stroke according to waveform 306 is produced and the waveforms are out of phase by about 90 degrees. Obviously, in the embodiment of FIG. 12, there are five strokes and five waveforms which are out of phase by about 72 degrees. It can be seen that the number of strokes that may be produced is limited only by the size of the transmission 10 and the number of clutch assemblies 30-30 (see FIG. 4) utilized. As many as 100 or more of the clutch assemblies 30-30 could be employed without departing from the spirit and/or scope of the present invention. Further by the practice of the present invention, there is provided the apparatus or transmission 10 for modifying input rotation to produce modified rotational output. The apparatus may modify input rotation in continuously variable increments. Further still by the practice of the present invention, there is provided an orbital motion generating arrangement. The practice of the present invention also provides for a method for modifying an input rotation to produce a modified substantially smooth rotational output and a method for smoothing an input rotation characterized by sinusoidal or pulsed rotation.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A transmission, comprising:

a support assembly;

an input means supported by said support assembly for establishing an input rotation to the transmission;

an output means supported by said support assembly for establishing an output rotation relative to support assembly for establishing an output rotation relative to and proportional to said input rotation; and a regulating means supported by said supporting assembly and coupled to said input means and to said output means for regulating an amount of input rotation delivered by said input means and imparted to said output means;

said regulating means including a spring biased ratio control rod slidably passing into said input means, a block member, an index member coupled to said ratio control rod and slidably disposed in said block member, a web member coupled to said index member, a connecting rod pivotally coupled to said web member, a crank shaft supported by said support assembly, a spring loaded crank arm pivotally coupled to said crank shaft and pivotally coupled to said connecting rod, and a gear member mounted on said crank shaft, said spring biased ratio control rod and said spring loaded crank arm limiting torque applied to the transmission.

2. The transmission of claim 1 wherein said crank shaft is pivotally connected to said crank arm; a helical coil spring member having a first spring end and a second spring end; said first spring end, said crank shaft having said helical coil spring circumferentially disposed therearound and having said first spring end of said helical coil spring secured to said crank shaft; said crank arm having said second spring end secured thereto for intercoupling said crank shaft and said crank arm through said helical coil spring member such that movement of said crank arm flexes said helical coil spring member to effect movement of said crank shaft through said helical coil spring.

3. The transmission of claim 2 wherein said connecting rod comprises a dampening means for biasing a length of a slidably moving portion of said connecting rod to limit torque applied to the transmission.

4. The transmission of claim 2 additionally comprising a summing gear member meshing with said gear member.

5. The transmission of claim 4 wherein said input means comprises an input shaft rotatably supported by the support assembly, and said output means comprises an output shaft rotatably supported by the support assembly; and wherein said input shaft is rotatably supported by a first portion of said support assembly and said output shaft is rotatably supported by a second portion of said support assembly.

6. The transmission of claim 1 wherein said input means comprises an input shaft rotatably supported by the support assembly, and said output means comprises an output shaft rotatably supported by the support assembly and generally coaxial with respect to the input shaft.

7. The transmission of claim 6 wherein said input shaft includes an input shaft bore wherein said ratio control rod slidably passes.

8. The transmission of claim 7 wherein said output shaft is rotatably disposed around the input shaft.

9. A transmission, comprising:

an input means supported by a support assembly for establishing an input rotation to the transmission;

an output means supported by said support assembly for establishing an output rotation relative to and proportional to said input rotation; and a regulating means supported by said supporting assembly and coupled to said input means and to said output means for regulating an amount of input rotation delivered by said input means and imparted to said output means;

said regulating means including a movable, spring biased ratio control rod in said input means, an index member coupled to said ratio control rod and responsive to movement thereof, a web member coupled to said index member, a connecting rod pivotally coupled to said web member and including a dampening means for biasing said connecting rod, a crank shaft supported by said support assembly, a crank arm pivotally coupled to said crank shaft and to said connecting rod, and coupling means on said crank shaft for operatively coupling said crank shaft to said output means, said spring biased ratio control rod and said connecting rod limiting torque applied to the transmission.

10. A transmission as claimed in claim 9 wherein said crank arm is spring loaded to limit torque applied to the transmission.

* * * * *